US008172671B2

(12) United States Patent
Walker et al.

(10) Patent No.: US 8,172,671 B2
(45) **Date of Patent: *May 8, 2012**

(54) METHOD AND APPARATUS FOR FACILITATING PLAY OF A GAMING DEVICE

(75) Inventors: Jay S. Walker, Ridgefield, CT (US); James A. Jorasch, New York, NY (US); Daniel E. Tedesco, Huntington, CT (US); Geoffrey M. Gelman, Boston, MA (US); Stephen C. Tulley, Fairfield, CT (US); Steven M. Santisi, Ridgefield, CT (US); Norman C. Gilman, North Haledon, NJ (US)

(73) Assignee: Walker Digital, LLC, Stamford, CT (US)

( * ) Notice: Subject to any disclaimer, the term of this patent is extended or adjusted under 35 U.S.C. 154(b) by 1705 days.

This patent is subject to a terminal disclaimer.

(21) Appl. No.: 10/908,957

(22) Filed: Jun. 2, 2005

(65) Prior Publication Data

US 2006/0025207 A1 Feb. 2, 2006

Related U.S. Application Data

(63) Continuation-in-part of application No. 10/420,066, filed on Apr. 21, 2003, now Pat. No. 8,021,229.

(60) Provisional application No. 60/581,557, filed on Jun. 21, 2004, provisional application No. 60/581,562, filed on Jun. 21, 2004.

(51) Int. Cl.
*A63F 13/00* (2006.01)

(52) U.S. Cl. ................................ 463/25; 463/13; 463/20

(58) Field of Classification Search .................... 463/25, 463/13, 20

See application file for complete search history.

(56) References Cited

U.S. PATENT DOCUMENTS

| | | | | |
|---|---|---|---|---|
| 4,467,424 | A | 8/1984 | Hedges et al. | 364/412 |
| 4,636,951 | A | 1/1987 | Harlick | 364/412 |
| 4,659,087 | A * | 4/1987 | Shen et al. | 273/274 |
| 4,669,731 | A | 6/1987 | Clarke | 273/143 R |
| 4,764,666 | A | 8/1988 | Bergeron | 235/380 |
| 4,880,237 | A | 11/1989 | Kishishita | 273/138 A |
| 4,991,848 | A | 2/1991 | Greenwood et al. | 273/143 R |
| 5,069,453 | A | 12/1991 | Koza et al. | 463/17 |
| 5,112,050 | A | 5/1992 | Koza et al. | 463/17 |
| 5,123,649 | A | 6/1992 | Tiberio | 273/143 R |
| 5,178,389 | A | 1/1993 | Bentley et al. | |
| 5,178,390 | A | 1/1993 | Okada | 273/143 R |
| 5,275,400 | A | 1/1994 | Weingardt et al. | 273/85 CP |
| 5,287,269 | A | 2/1994 | Dorrough | |
| 5,290,033 | A | 3/1994 | Bittner et al. | 463/25 |

(Continued)

OTHER PUBLICATIONS

Davy, K, "Big Ichigeki! Pachi-Slot Taikouryku Universal Museum—Reader Review", Copyright 1995-2001, Game FAQs.

(Continued)

*Primary Examiner* — David L Lewis
*Assistant Examiner* — William H McCulloch, Jr.
(74) *Attorney, Agent, or Firm* — Fincham Downs, LLC; Magdalene M. Fincham

(57) ABSTRACT

Systems and methods are provided allowing a player to play a gaming device and receive a predetermined number of outcomes in exchange for a payment. The gaming device generates at least the predetermined number of outcomes, and adjusts a balance of the player device based on the outcomes. The player can continue playing regardless of whether the balance is less than zero.

15 Claims, 15 Drawing Sheets

U.S. PATENT DOCUMENTS 5,377,975 A 1/1995 Clapper, Jr. ..................... 463/16
5,401,023 A 3/1995 Wood
5,401,024 A 3/1995 Simunek ................... 273/138 A
5,429,361 A 7/1995 Raven et al. .............. 273/138 A
5,457,306 A 10/1995 Lucero
5,511,781 A 4/1996 Wood et al.
5,536,008 A 7/1996 Clapper, Jr. ..................... 463/16
5,551,692 A 9/1996 Pettit et al. ................ 273/143 R
5,569,082 A 10/1996 Kaye ............................... 463/17
5,570,885 A 11/1996 Ornstein
5,580,311 A 12/1996 Haste, III ........................ 463/17
5,595,538 A 1/1997 Haste, III ........................ 463/17
5,609,337 A 3/1997 Clapper, Jr. ................ 273/138.2
5,613,912 A 3/1997 Slater .............................. 463/25
5,621,200 A 4/1997 Irwin et al. .................... 235/375
5,634,012 A 5/1997 Stefik et al. ................... 395/239
5,638,443 A 6/1997 Stefik et al.
5,647,592 A 7/1997 Gerow .......................... 273/139
5,657,899 A 8/1997 Stoken ............................ 463/17
5,715,403 A 2/1998 Stefik et al.
5,735,432 A 4/1998 Stoken et al. ..................... 211/1
5,741,183 A 4/1998 Acres et al. ..................... 463/42
5,743,800 A 4/1998 Huard et al.
5,749,784 A 5/1998 Clapper, Jr. ..................... 463/17
5,758,875 A 6/1998 Giacalone, Jr. ........... 273/143 R
5,766,075 A 6/1998 Cook et al. ...................... 463/25
5,768,382 A 6/1998 Schneier et al.
5,770,533 A 6/1998 Franchi ........................... 463/42
5,772,509 A 6/1998 Weiss ............................. 463/16
5,800,268 A 9/1998 Molnick ......................... 463/40
5,810,360 A * 9/1998 Srichayaporn ................ 273/292
5,816,917 A 10/1998 Kelmer et al. .................. 463/16
5,830,067 A 11/1998 Graves et al. ................... 463/40
5,833,538 A 11/1998 Weiss
5,855,515 A * 1/1999 Pease et al. ..................... 463/27
5,882,261 A 3/1999 Adams
5,910,048 A * 6/1999 Feinberg ......................... 463/25
5,915,588 A 6/1999 Stoken et al.
5,970,143 A 10/1999 Schneier et al. ................ 380/23
5,984,779 A * 11/1999 Bridgeman et al. ............ 463/16
6,001,016 A 12/1999 Walker et al. ................... 463/42
6,012,983 A 1/2000 Walker et al. ................... 463/20
6,050,895 A 4/2000 Luciano et al.
6,068,552 A 5/2000 Walker et al.
6,077,163 A 6/2000 Walker et al.
6,146,270 A 11/2000 Huard et al.
6,168,522 B1 1/2001 Walker et al.
6,193,606 B1 2/2001 Walker et al.
6,203,428 B1 3/2001 Giobbi et al. ................... 463/16
6,206,782 B1 * 3/2001 Walker et al. ................... 463/25
6,213,877 B1 4/2001 Walker et al.
6,217,448 B1 4/2001 Olsen
6,244,957 B1 6/2001 Walker et al. ................... 463/20
6,299,533 B1 10/2001 Parra et al. ...................... 463/17
6,306,038 B1 10/2001 Graves et al.
6,315,662 B1 11/2001 Jorasch et al. .................. 463/20
6,319,125 B1 11/2001 Acres
6,319,127 B1 * 11/2001 Walker et al. ................... 463/26
6,331,144 B1 12/2001 Walker et al.
6,336,636 B1 1/2002 Smart
6,343,989 B1 2/2002 Wood et al. ..................... 463/23
6,371,852 B1 4/2002 Acres
6,389,538 B1 5/2002 Gruse et al. ....................... 705/1
6,402,148 B1 6/2002 Saruwatari .................... 273/292
6,409,602 B1 6/2002 Wiltshire et al.
6,508,710 B1 1/2003 Paravia et al.
6,511,377 B1 1/2003 Weiss
6,527,638 B1 3/2003 Walker et al. ................... 463/25
6,565,434 B1 5/2003 Acres
6,582,306 B1 6/2003 Kaminkow
6,589,115 B2 7/2003 Walker et al.
6,605,001 B1 8/2003 Tarantino
6,634,942 B2 10/2003 Walker et al.
6,685,563 B1 2/2004 Meekins et al.
6,709,331 B2 3/2004 Berman .......................... 463/16
6,712,695 B2 3/2004 Mothwurf et al.
6,722,983 B2 4/2004 Kaminkow et al.
6,726,563 B1 4/2004 Baerlocher et al.
6,733,389 B2 5/2004 Webb et al.
6,769,983 B2 8/2004 Slomiany
6,793,578 B2 * 9/2004 Luccesi et al. .................. 463/20
6,800,030 B2 10/2004 Acres
6,832,958 B2 12/2004 Acres et al.
6,846,238 B2 1/2005 Wells ............................. 463/39
6,878,063 B2 4/2005 Manfredi et al.
6,896,616 B2 5/2005 Weiss
6,965,868 B1 11/2005 Bednarek
6,969,317 B2 11/2005 Walker et al.
6,997,807 B2 2/2006 Weiss
7,063,617 B2 * 6/2006 Brosnan et al. ................. 463/25
7,070,501 B2 7/2006 Cormack et al.
7,076,652 B2 7/2006 Ginter et al. .................. 713/153
7,140,964 B2 * 11/2006 Walker et al. ................... 463/25
7,156,739 B2 1/2007 Walker et al.
7,179,168 B1 2/2007 Tulley et al.
7,192,349 B2 3/2007 Baerlocher et al.
7,213,005 B2 5/2007 Mourad et al. .................. 705/64
7,229,353 B2 6/2007 Seeling
7,306,518 B2 12/2007 Hughs-Baird et al.
7,329,185 B2 2/2008 Conover et al.
7,401,032 B1 7/2008 Golden et al.
7,416,485 B2 8/2008 Walker et al.
7,419,427 B2 9/2008 Boushey
7,496,943 B1 2/2009 Goldberg et al.
7,503,851 B2 3/2009 Walker et al.
7,625,282 B2 12/2009 Baerlocher et al.
7,658,673 B2 2/2010 Baerlocher et al.
7,690,991 B2 4/2010 Black
7,722,456 B2 5/2010 Walker et al.
7,722,458 B2 * 5/2010 Walker et al. ................... 463/25
7,722,460 B2 5/2010 Walker et al.
7,785,196 B2 8/2010 Baerlocher et al.
7,815,503 B2 10/2010 Walker et al.
7,824,259 B2 * 11/2010 Walker et al. ................... 463/17
7,828,645 B2 11/2010 Walker et al.
7,841,936 B2 11/2010 Berman et al.
7,862,416 B2 * 1/2011 Walker et al. ................... 463/12
7,862,424 B2 * 1/2011 Walker et al. ................... 463/25
7,862,426 B2 1/2011 Walker et al.
7,871,327 B2 1/2011 Walker et al.
7,874,906 B2 1/2011 Tulley et al.
7,874,908 B2 1/2011 Walker et al.
7,874,911 B2 1/2011 Walker et al.
7,874,914 B2 * 1/2011 Walker et al. ................... 463/25
7,878,901 B2 2/2011 Walker et al.
7,887,414 B2 2/2011 Walker et al.
7,905,774 B2 3/2011 Walker et al.
7,905,775 B2 3/2011 Walker et al.
7,914,375 B2 * 3/2011 Walker et al. ................... 463/25
7,934,990 B2 * 5/2011 Walker et al. ................... 463/25
7,955,169 B2 * 6/2011 Walker et al. ................... 463/16
7,955,171 B2 6/2011 Jorasch et al.
7,955,172 B2 * 6/2011 Walker et al. ................... 463/25
7,963,844 B2 * 6/2011 Walker et al. ................... 463/25
8,070,577 B2 12/2011 Walker et al.
8,075,388 B1 12/2011 Bennett
2001/0031654 A1 * 10/2001 Walker et al. ..................... 463/1
2002/0058542 A1 5/2002 Roethel et al. .................. 463/13
2002/0112171 A1 8/2002 Ginter et al.
2002/0125641 A1 9/2002 Moody ......................... 273/292
2002/0147040 A1 * 10/2002 Walker et al. ................... 463/25
2003/0027629 A1 * 2/2003 Pimienta ......................... 463/25
2003/0069071 A1 * 4/2003 Britt et al. ....................... 463/42
2003/0073494 A1 * 4/2003 Kalpakian et al. .............. 463/42
2003/0144053 A1 7/2003 Michaelson
2003/0148807 A1 8/2003 Acres
2003/0157978 A1 8/2003 Englman
2003/0162588 A1 * 8/2003 Brosnan et al. ................. 463/25
2003/0162589 A1 * 8/2003 Nguyen et al. .................. 463/25
2003/0220138 A1 * 11/2003 Walker et al. ................... 463/25
2003/0224854 A1 12/2003 Joao ............................... 463/40
2004/0147308 A1 * 7/2004 Walker et al. ................... 463/25
2004/0242319 A1 * 12/2004 Walker et al. ................... 463/25
2005/0187012 A1 * 8/2005 Walker et al. ................... 463/25
2006/0025207 A1 2/2006 Walker et al.
2006/0035701 A1 * 2/2006 Walker et al. ................... 463/20
2006/0040730 A1 * 2/2006 Walker et al. ................... 463/20

| | | | | |
|---|---|---|---|---|
| 2006/0046840 | A1 | 3/2006 | Walker et al. | |
| 2006/0252511 | A1 | 11/2006 | Walker et al. | |
| 2006/0252512 | A1 | 11/2006 | Walker et al. | |
| 2006/0252513 | A1 | 11/2006 | Walker et al. | |
| 2006/0252514 | A1 | 11/2006 | Walker et al. | |
| 2006/0252517 | A1 | 11/2006 | Walker et al. | |
| 2006/0252518 | A1 | 11/2006 | Walker et al. | |
| 2006/0287040 | A1 | 12/2006 | Walker et al. | |
| 2006/0287071 | A1 | 12/2006 | Walker et al. | |
| 2006/0287074 | A1 | 12/2006 | Walker et al. | |
| 2006/0287075 | A1 | 12/2006 | Walker et al. | |
| 2007/0004503 | A1 | 1/2007 | Walker et al. | |
| 2007/0004504 | A1 | 1/2007 | Walker et al. | |
| 2007/0087818 | A1 | 4/2007 | Walker et al. | |
| 2007/0155482 | A1 | 7/2007 | Walker et al. | |
| 2007/0155483 | A1 | 7/2007 | Walker et al. | |
| 2007/0155484 | A1 | 7/2007 | Walker et al. | |
| 2007/0191094 | A1 | 8/2007 | Walker et al. | |
| 2007/0213123 | A1 | 9/2007 | Walker et al. | |
| 2007/0293306 | A1 | 12/2007 | Nee et al. | |
| 2008/0182655 | A1 | 7/2008 | DeWaal et al. | |
| 2008/0200242 | A1 | 8/2008 | Ginsberg et al. | |
| 2008/0274792 | A1 | 11/2008 | Walker et al. | |
| 2008/0305862 | A1 | 12/2008 | Walker et al. | |
| 2011/0014963 | A1 | 1/2011 | Walker et al. | |
| 2011/0256923 | A1* | 10/2011 | Walker et al. .................. | 463/25 |

OTHER PUBLICATIONS

"Station Announces Formation of GameCast Live, LLC and Release of Remote Play eSlots for In-Room Gaming Applications", PR Newswire, Jun. 6, 2001, Section: Financial News.

Website: "GameCast Live—PowerPoint Presentation", (http //www gamecastlive com/presentation/toronto2_files/frame htm), download date: Jan. 20, 2003.

Ritchie, Lauren "Orange Man Sought In Betting Probe", Orlando Sentinel Tribune, May 30, 1990 at p. B2, 3pp.

Mayo, Michael, "Win-Or-Lose-Cruise, You Can Bet Sports Legally Around Here—Just Wait Till The Boat Is 3 Miles Out", Sun-Sentinel, Dec. 28, 1994 at p. 1C, 3pp.

Cave, Kathy, "The Lake Effect", Milwaukee Journal Sentinel, Mar. 27, 1996 at p. 8, 2pp.

Busch, Melanie, "Tulsa Firm Explores Internet Gaming", Tulsa World, Aug. 1, 1996, Section: Business, p. E1, 3pp.

"Electronic Bingo System", Network Gaming International Corporation, (http://network-bingo com/bingo htm), download date: Nov. 13, 1996, 5pp.

"MGAM Signs Agreement With Lac Vieux Desert Chippewa Tribe", Business Wire, May 18, 2001, 2pp.

Brochure, "Flying Bet Roulette" DEQ Casinos Ltd.., undated, 2pp.

"GameCast Live—PowerPoint Presentation", (http //www gamecastlive com/presentation/toronto2_files/frame htm), download date: Nov. 24, 2002, 12pp.

"GameCast Live—Press Release", (http //www gamecastlive com/press_june_6 html), download date: Nov. 24, 2002, 2pp.

"Welcome—i2corp.com", (http //www i2corp com/), download date: Nov. 24, 2002, 1pg.

"Games—i2corp.com", (http //www i2corp com/games/index cfm), download date: Nov. 24, 2002, 2pp.

"The Home Gambling Network—Welcome", (http //www homegamblingnetwork com), download date: Nov. 24, 2002, 1pg.

"The Home Gambling Network—Players", (http //www homegamblingnetwork com/player php3), download date: Nov. 24, 2002, 2pp.

"Multimedia Games, Inc.—Home", (http www betnet com/), download date: Nov. 24, 2002, 1pg.

Newsletter sent via email: "The CR Newsletter", do_not_email@crnewsletter.com, email sent Jan. 20, 1998, 1 pg.

Website: "Online blackjack, poker, slots, and more—Casino Vegas Royale", (http www casinovegasroyale com/insurance shtml), Copyright 2002, 1 pg.

Website: "Who Says You Can't Win From Losing? 49er and Three Diamonds Casino Offer 'Free Insurance' for Online Play in Jul.", (http //www smartplayers net/insurance htm), Jun. 14, 2003, 1pg.

Brochure: "Introducing iView", Bally Gaming Systems, Copyright 2004, 2 pp.

Website: "Bettors Insurance", (http //www bettorsinsurance com/index asp?asp?id=881035&), Copyright 2004, 1 pg.

Website: "Welcome—CasinoActive.Net Offers New Gambling Idea", (http //www bokmaker com/default asp?ACT=5&content=30&id=1), download date: Jul. 26, 2004, 1 pg.

Website: "Gamblers Insurance", (http www u1casino com/rules_gamblers php), download date: Jul. 26, 2004, 1 pg.

Website: "Online Sports Betting—Sportsbet Bookmaker", (http //www sportsbetbookmaker com/aboutus shtml), download date: Jul. 27, 2004, 1 pg.

Website: "SDS Product Group Snapshot", Bally Gaming Systems, (http www ballygaming com/sds/sds_products1 asp), download date: Aug. 9, 2004, 2 pp.

Website: "Cash Back Bonus", (http //www optimalgambling com/casinos/cash-back-bonus-online-casinos htm), download date: Sep. 27, 2004, 1 pg.

Beckett, Rick, "Gambling Insurance?", iWon—Casino, (http //iwon gamblingtimes com/writers/rbeckett/rbeckett _winter2001 html), download date: Sep. 27, 2004, 2 pp.

"GameCast Live—About the Product", (http //www gamecastlive com/about_the product html), download date: Nov. 24, 2002, 1 pg.

Website: "Insuring Your Online Wagers", (http // www winneronline com/articles/November2001/gambling insu . . .), Nov. 28, 2001, 1 pg.

U.S. Appl. No. 08/766,576, entitled "Secure Improved Remote Gaming System", filed Dec. 6, 1996.

U.S. Appl. No. 09/218,258, entitled "System and Method for Automatically Initiating Game Play on an Electronic Gaming Device", filed Dec. 6, 1996.

Office Action dated Jun. 20, 2007, U.S. Appl. No. 11/423,037, Filing Date Jun. 8, 2006 15 pp.

Office Action dated Oct. 9, 2007, U.S. Appl. No. 10/636,520, Filing Date Aug. 7, 2003 21 pp.

Notice of Allowability dated Aug. 10, 2001, U.S. Appl. No. 09/518,760, Filing Date Mar. 3, 2001 2 pp.

Office Action dated May 9, 2001, U.S. Appl. No. 09/518,760, Filing Date Mar. 3, 2001 10 pp.

Notice of Allowability dated Dec. 6, 1999, U.S. Appl. No. 08/880,838, Filing Date Jun. 23, 1997 7 pp.

Office Action dated Oct. 6, 1999, U.S. Appl. No. 08/880,838, Filing Date Jun. 23, 1997 6 pp.

Office Action dated Apr. 6, 2004, U.S. Appl. No. 10/001,089, Filing Date Nov. 2, 2001 10 pp.

Office Action dated Jul. 11, 2005, U.S. Appl. No. 10/001,089, Filing Date Nov. 2, 2001 24 pp.

Notice of Allowability dated Sep. 28, 2006, U.S. Appl. No. 10/001,089, Filing Date Nov. 2, 2001 9 pp.

Office Action dated Sep. 12, 2003, U.S. Appl. No. 10/001,089, Filing Date Nov. 2, 2001 8 pp.

Notice of Allowability dated Nov. 3, 2005, U.S. Appl. No. 10/985,131, Filing Date Nov. 10, 2004 6 pp.

Grochowski, John, "Computers Help Players Learn Winning Strategy", Chicago Sun-Times, Jun. 30, 1995, Section: Weekend Plus, Gaming, p. 13, NC, 2 pp.

Grochowski, John, "Slot Tourney prospers under Indiana rules", Chicago Sun-Times, Apr. 6, 1997, Section: SHO, CASINOS, p. 15, NC, 1 pg.

Hawley, David, "Those one-armed bandits; Slot-machine tournaments lure throngs to Midwest casinos", The Houston Chronicle, Apr. 9, 1996, Section: Houston, p. 3, 3 pp.

Pledger, Marcia, "Going for the gold at slot tournaments", Las Vegas Review-Journal, Dec. 24, 1995, p. 5L, 4 pp.

Website, "Extending the Casino Floor", GameCast Live, (http //www gamecastlive com/presentation/toronto_files/slide0012 htm), download date: Jun. 6, 2001, 12 pp.

Website, "GameCast Live—PowerPoint Presentation", (http //www gamecastlive com/presentation/toronto2_files/frame htm), download date: Jan. 20, 2003, 12 pp.

Office Action dated Sep. 22, 2006, U.S. Appl. No. 10/420,066, Filing Date Apr. 21, 2003 10 pp.

Office Action dated Jul. 13, 2007, U.S. Appl. No. 10/420,066, Filing Date Apr. 21, 2003 15 pp.

"GameCast Live —Home", (http //www gamecastlive com), download date: Nov. 24, 2002, 12 pp.
Notice of Allowability for U.S. Appl. No. 10/001,089 mailed Jun. 28, 2006, 6 pp.
Office Action for U.S. Appl. No. 11/425,041 mailed Sep. 17, 2007, 6 pp.
Office Action for U.S. Appl. No. 11/425,044 mailed Sep. 17, 2007, 5 pp.
Notice of Allowance for U.S. Appl. No. 11/425,037 mailed Dec. 30, 2010, 4 pp.
Office Action for U.S. Appl. No. 11/425, 037 dated Jun. 1, 2010, 9 pp.
Office Action for U.S. Appl. No. 11/425,037 mailed Apr. 29, 2008, 9 pp.
Notice of Allowance for U.S. Appl. No. 11/423,043 mailed Jul. 13, 2010, 9 pp.
Office Action for U.S. Appl. No. 11/423,043 dated Dec. 21, 2009, 10 pp.
Office Action for U.S. Appl. No. 11/423,043 mailed Jul. 20, 2009, 5 pp.
Office Action for U.S. Appl. No. 11/423,043 mailed Oct. 6, 2008, 7 pp.
Notice of Allowance for U.S. Appl. No. 11/423,055 mailed Apr. 11, 2011, 7 pp.
Notice of Allowance for U.S. Appl. No. 11/423,055 mailed Oct. 25, 2011, 4 pp.
Notice of Allowance for U.S. Appl. No. 11/423,055 mailed Dec. 17, 2010, 4 pp.
Office Action for U.S. Appl. No. 11/423,055 mailed Aug. 4, 2010, 10 pp.
Office Action for U.S. Appl. No. 11/423,055 mailed Dec. 8, 2009, 16 pp.
Notice of Allowance for U.S. Appl. No. 10/636,520 mailed Sep. 30, 2010, 8 pp.
Office Action for U.S. Appl. No. 10/636,520 mailed Nov. 18, 2009, 13 pp.
Office Action for U.S. Appl. No. 10/636,520 mailed Jan. 15, 2009, 11 pp.
Office Action for U.S. Appl. No. 10/636,520 dated Jul. 9, 2008, 14 pp.
Notice of Allowance for U.S. Appl. No. 10/636,520 mailed Sep. 30, 2010, 8 pp.
Office Action for U.S. Appl. No. 11/423,037 mailed Dec. 9, 2008, 13 pp.
Notice of Allowance for U.S. Appl. No. 10/986,529 mailed Oct. 27, 2011, 6 pp.
Notice of Allowance for U.S. Appl. No. 10/986,529 mailed Jul. 22, 2011, 8 pp.
Office Action for U.S. Appl. No. 10/986,529 mailed Dec. 20, 2010, 8 pp.
Office Action for U.S. Appl. No. 10/986,529 mailed Feb. 2, 2009, 12 pp.
Office Action for U.S. Appl. No. 10/986,529 mailed Jun. 9, 2008, 11 pp.
Office Action for U.S. Appl. No. 10/986,529 mailed Oct. 9, 2007, 11 pp.
Examiner's Answer for U.S. Appl. No. 11/425,037 mailed Sep. 16, 2009, 14 pp.
Fallstrom, Bob, "Winter wonderland Symphony of Trees is sure to be a dazzling delight", Herald & Review, Nov. 17, 1992, 5 pp.
DEQ Casino Flying Bet Roulette, http://www.deq/com/ang/flying.html, download date: Nov. 24, 2002, 1 pg.
Website: "Guaranteed Play" is one product certain to grab attention from both casinos and their customers, DETNEWS/Casino Guide/ Grochowski, (http:info detnews com/casino/ newdetailscfm?column=grochowski&myrec=358), download date: Jun. 9, 2008, 2 pp.
Office Action for U.S. Appl. No. 10/420,066, dated Sep. 22, 2006, 11 pp.
Office Action for U.S. Appl. No. 10/420,066, dated Jul. 13, 2007, 12 pp.
Office Action for U.S. Appl. No. 10/420,066, dated Jan. 8, 2008, 7 pp.
Office Action for U.S. Appl. No. 10/420,066, dated Oct. 17, 2008, 10 pp.
Office Action for U.S. Appl. No. 10/420,066, dated Oct. 1, 2010, 11 pp.
Notice of Allowance for U.S. Appl. No. 10/420,066, dated Mar. 18, 2011, 12 pp.
Office Action for U.S. Appl. No. 11/428,638, dated Oct. 4, 2010, 12 pp.
Office Action for U.S. Appl. No. 11/428,638, dated Mar. 16, 2011, 12 pp.
Office Action for U.S. Appl. No. 11/428,638, dated Sep. 14, 2011, 11 pp.
Office Action for U.S. Appl. No. 11/428,642, Oct. 6, 2010, 9 pp.
Office Action for U.S. Appl. No. 11/428,642, May 13, 2011, 13 pp.
Interview Summary for U.S. Appl. No. 11/428,642, Jul. 11, 2011, 4 pp.
Notice of Allowance for U.S. Appl. No. 11/428,642, dated Aug. 5, 2011, 8 pp.
Office Action for U.S. Appl. No. 11/691,015, dated May 7, 2010, 5 pp.
Office Action for U.S. Appl. No. 11/691,015, dated Sep. 2, 2010, 8 pp.
Notice Allowance for U.S. Appl. No. 11/691,015, Dec. 20, 2010, 8 pp.
Office Action for U.S. Appl. No. 11/691,015, Feb. 17, 2011, 4 pp.
Office Action for U.S. Appl. No. 11/691,065, dated Apr. 27, 2010, 12 pp.
Office Action for U.S. Appl. No. 11/691,065, dated Aug. 19, 2010, 11 pp.
Notice of Allowance for U.S. Appl. No. 11/423,055 mailed Feb. 2, 2012, 7 pp.

* cited by examiner

600

| | PLAYER IDENTIFIER 610 | NAME 620 | ADDRESS 630 | FINANCIAL ACCOUNT IDENTIFIER 640 | DEMOGRAPHIC 650 | CREDITS 660 | LIFETIME COIN IN 670 |
|---|---|---|---|---|---|---|---|
| 680 | P11123 | SAM BROWN | ANYPLACE, USA | 1111-1111-1111-1111 | MALE, AGE 23 | 68 AT $0.25 EACH | $600 |
| 685 | P222234 | LINDA JONES | SOMEPLACE, USA | 2222-2222-2222-2222 | FEMALE, AGE 47 | 0 | $14400 |

FIG. 6

700

| | GEMING DEVICE IDENTIFIER 710 | NAME 720 | MANUFACTURER 730 |
|---|---|---|---|
| 740 | G333333 | DIAMOND MINE | ABC CORP. |
| 745 | G444444 | CRAZY DEUCES | XYZ CORP. |

FIG. 7

800

895

| CONTRACT IDENTIFIER 810 | PLAYER IDENTIFIER 820 | INITIAL PLAYER BANKROLL 830 | DESCRIPTION 840 | COST 850 | RESULT 860 | AMOUNT OWED THE PLAYER 870 | AMOUNT OWED THE INSURER 880 |
|---|---|---|---|---|---|---|---|
| C111 | P222333 | N/A | 2000 PULLS, $0.25 PER PULL, PLAYER KEEPS NET WINNINGS | $20.00 | CONTRACT ENDS WITH PLAYER AT - $45 | 0 | $20.00 - $45.00 - $25.00 |
| C222 | P444555 | N/A | 1 HOUR OF PLAY, $1.00 PER PULL, PLAYER KEEPS GROSS WINNINGS | $100.00 | CONTRACT ENDS WITH PLAYER AT + $97 | $97 | $100.00 |
| C333 | P666777 | $2,000 | 1,000 PULLS PER WEEK, $2.00 PER PULL, OCCURRING BETWEEN 8-9PM TUESDAYS FOR 12 WEEKS OR UNTIL PLAYER LOSES BANKROLL | N/A | PLAYER LOST BANKROLL | 0 | N/A |
| C444 | P888999 | $100 | 90 MINUTES OF PLAY, $0.50 PER PULL | N/A | PLAYER ENDS UP WITH $120 | $120 | N/A |
| C555 | P111000 | $200 | $0.63 PER PULL, DOUBLE BETS FOR TWO PULLS AFTER ANY WIN, STOP AFTER JACKPOT, LOSS INSURED BEYOND $200 | $20.00 | 2 MINS. REMAINING, PLAYER AT + $213 | TBD | TBD |
| TOTAL OWED THE INSURER: $75.00 890 | | | | | | | |

FIG. 8

METHOD AND APPARATUS FOR FACILITATING PLAY OF A GAMING DEVICE

CROSS-REFERENCE TO RELATED APPLICATIONS

This application claims the benefit of priority of U.S. Provisional Patent Application Ser. No. 60/581,557, filed on Jun. 21, 2004 in the name of Walker et al. and entitled METHOD AND APPARATUS FOR EMPLOYING FLAT RATE PLAY.

This application also claims the benefit of priority of U.S. Provisional Application Ser. No. 60/581,562, filed Jun. 21, 2004 in the name of Walker et al. and entitled METHOD AND APPARATUS FOR PACKAGE PLAY INTERFACE.

This application is also a continuation-in-part of U.S. patent application Ser. No. 10/420,066, filed Apr. 21, 2003 in the name of Walker et al. and entitled METHOD AND APPARATUS FOR EMPLOYING FLAT RATE PLAY; which application claims the benefit of priority of U.S. Provisional Patent Application Ser. No. 60/374,385, filed Apr. 19, 2002, entitled GAMING DEVICE METHODS AND APPARATUS EMPLOYING FLAT RATE PLAY.

The entirety of each of the above applications is incorporated by reference herein for all purposes.

BRIEF DESCRIPTION OF THE DRAWINGS

FIG. 6 is a table illustrating an exemplary data structure of a player database for use in at least one embodiment.

FIG. 7 is a table illustrating an exemplary data structure of a gaming device database for use in at least one embodiment.

FIG. 8 is a table illustrating an exemplary data structure of a contract database for use in at least one embodiment.

DETAILED DESCRIPTION OF THE INVENTION

Figure 1A:
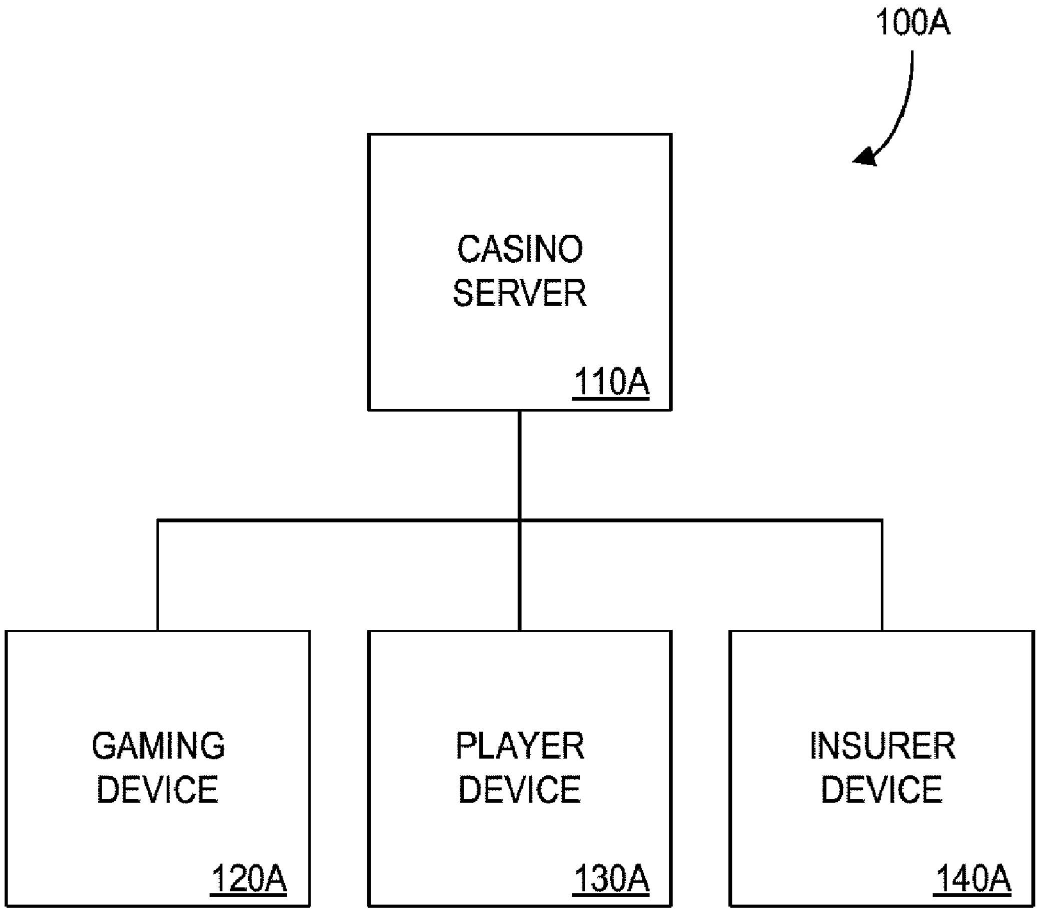
FIG. 1A is a block diagram of a system consistent with at least one embodiment.

Applicants have recognized that it would be advantageous to keep players playing an appealing gaming device, rather than risk having such players stop playing and, e.g., play other gaming devices at competing locations.

Applicants have also recognized that players would find game play with a known up-front cost to be appealing, and such up-front costs and corresponding opportunity costs can be managed.

Applicants have also recognized that players would find longer play with generally lower up-front costs to be appealing.

In various embodiments, a casino can significantly increase the usage of its gaming devices by retaining players and increasing average utilization of gaming devices. Moreover, a casino need not significantly alter its operations to do so.

In various embodiments, a player may experience the excitement of a relatively large number of plays (outcomes) for a relatively low cost, and/or limit or eliminate his risk of losses.

In various embodiments, a player need no longer be present at a gaming device to enjoy the gaming experience.

Several embodiments disclosed herein allow a player to make a relatively large number of plays at a gaming device for a relatively low price. Thus, in various embodiments, the present invention permits casinos and/or gaming device manufacturers to offer players the ability to realize "bulk" discounts by purchasing a plurality of plays (outcomes) for a price less than the sum of the prices charged for each individual play. For example, in one embodiment, a slot machine may be configured to offer customers the ability to either (1) bet on any individual play (e.g. a spin of the slot reels that resolve to present an outcome) by depositing $0.25, or (2) bet on 100 plays (e.g. spins) by depositing $20, reflecting a $5 savings off the individual-play price.

Further, in one or more embodiments, a player may pay in advance for a set of outcomes of the gaming device, and the player would then receive a balance at the gaming device which could be used for outcomes, or plays. Such a balance might not be withdrawn as funds until, e.g., after at least a predetermined number of outcomes are generated by the gaming device.

In such an embodiment, amounts of wagers the player makes could be deducted from the balance, and amounts of winnings could be added to the balance. Once the player has finished the predetermined number of outcomes, the player could withdraw as funds ("cash out") the remaining balance. Alternatively, the player may receive some payment that is based on the remaining balance.

According to an embodiment, the player may continue to play even when the balance of the gaming device is zero or negative. If so, even if the balance is negative after the predetermined number of outcomes is generated, the player need not reimburse the gaming device for the "negative amount". Thus according to that embodiment, by purchasing the predetermined number of outcomes, the player enjoys the number of outcomes without the risk of any loss. For example, the player may pay for only the cost of the predetermined number of outcomes.

Various other embodiments are described in detail herein, and still other embodiments will be apparent to those of skill in the art upon a review of the present disclosure.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. Those skilled in the art will recognize that the disclosed invention(s) may be practiced with various modifications and alterations. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Neither the Title (set forth at the beginning of the first page of this patent application) nor the Abstract (set forth at the end of this patent application) is to be taken as limiting in any way as the scope of the disclosed invention(s).

The terms “an embodiment”, “embodiment”, “embodiments”, “the embodiment”, “the embodiments”, “one or more embodiments”, “some embodiments”, “one embodiment” and the like mean “one or more (but not all) embodiments of the disclosed invention(s)”, unless expressly specified otherwise.

The terms “including”, “comprising” and variations thereof mean “including but not limited to”, unless expressly specified otherwise.

The enumerated listing of items (which may or may not be numbered) does not imply that any or all of the items are mutually exclusive, unless expressly specified otherwise. Likewise, the enumerated listing of items (which may or may not be numbered) does not imply that the items are comprehensive of any category, unless expressly specified otherwise.

The terms “a”, “an” and “the” mean “one or more”, unless expressly specified otherwise.

The term “plurality” means “two or more”, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments(s).

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Each process/method includes one or more steps, and therefore a reference to a “step” of a method has an inherent antecedent basis.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media in a number of well-known manners. In some embodiments, hard-wired circuitry or custom hardware may be used in place of, or in combination with, software instructions for implementation of the processes of the present invention. Thus, embodiments are not limited to any specific combination of hardware and software When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments need not include the device itself.

The term “computer-readable medium” as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G. In another example, instructions may initially be borne on a magnetic disk of a remote computer. The remote computer can load the instructions into its dynamic memory and send the instructions over a telephone line using a modem. A modem local to another device to which the instructions are being sent can receive the data on the telephone line and use an infrared transmitter to convert the data to an infrared signal. An infrared detector can receive the data carried in the infrared signal and place the data on a system bus for a processor of the device receiving the data. The system bus carries the data to main memory, from which the processor retrieves and executes the instructions. The instructions received by main memory may optionally be stored in a memory either before or after execution by the processor. In addition, instructions may be received via a communication port as electrical, electromagnetic or optical signals, which are exemplary forms of carrier waves that carry data streams representing various types of information. Thus, a device may obtain instructions in the form of a carrier wave.

Where databases are described, it will be understood by one of ordinary skill in the art that (i) alternative database structures to those described may be readily employed, and (ii) other memory structures besides databases may be readily employed.

The terms “cash out” and “cashout” are used interchangeable herein and may refer to a process by which a player of a gaming device is provided with payment. Such payment is typically provided by the gaming device, e.g., in the form of coins, tokens, transfer of funds to an account associated with a player or a cashless gaming ticket.

The terms "controller", "casino server", "central controller", "slot server", "computer server", "computer server device" and "server device" are used interchangeably herein and may refer, unless specified otherwise, to one or more electronic devices (e.g., a computer, two distinct servers) that are operable to communicate with one or more gaming devices. A controller may manage, direct or otherwise affect the gaming devices, such as by providing a random number to a gaming device, by receiving and/or providing data associated with a player, and/or receiving and/or providing data associated with game play of the gaming device. A controller may also contain or otherwise be configured to read data from and/or write data to one or more (local or remote) databases regarding, among other things, data associated with (i) a cash-out ticket, (ii) a player, (iii) a payout, (iv) a probability of obtaining an outcome, etc.

The terms "credit balance" and "credit meter balance" are used interchangeably herein and, unless specified otherwise, may refer to an indication of an amount of currency (or other value) that is due to a player and/or that is available for wagering (e.g., a wager may be drawn from a credit balance). In some embodiments, a balance may be associated with a gaming device being operated by a player. Such an indication may be output via a gaming device display, such as an LED "credit meter." In some embodiments, a player wishing to cash out is provided with payment (e.g., a cashless gaming ticket) equal to his credit balance, or otherwise based on his credit balance (e.g., the integer amount of a credit balance, such as $5.00 for a balance of $5.50). In another embodiment, a credit balance may be stored on a smart card and/or a casino server (e.g., and available for transfer to a gaming device).

The term "game", unless specified otherwise, may refer to a wagering activity whereby a player posts consideration, usually monetary in form, in exchange for a chance at winning a payout (which is typically a monetary payout). The definition is intended to include basic or primary games and bonus or secondary games. The definition is further intended to include both primary games and secondary games.

The terms "basic game" and "primary game" are used interchangeably herein and, unless specified otherwise, may refer to a portion of a game for which consideration is provided.

The terms "bonus game" and "secondary game" are used interchangeably herein and, unless specified otherwise, may refer to a portion or aspect of a basic game that is separate and/or separable from the basic game, for which portion or aspect a player participating in a primary or basic game typically does not have to provide additional consideration.

The terms "game device", "gaming device", "game machine", "gaming machine" are used interchangeable herein and may refer, unless specified otherwise, to any electrical, electromechanical and/or mechanical device that (in a manner well known in the art) accepts wagers, determines an outcome and determines winnings (if any) based on the outcome. The outcome may be randomly generated; may be generated through a combination of randomness and player skill; or may be generated entirely through player skill. Gaming devices may include slot machines (both video and mechanical reel slot machines), video poker machines, video blackjack machines, video roulette machines, video keno machines, video bingo machines, pachinko machines, video lottery terminals, handheld gaming devices, vending machines and the like.

The terms "game play", "handle pull", "pull", "spin" and "hand" are used interchangeably herein and may refer, unless specified otherwise, to a single play of a game at a gaming device that generates a singular, corresponding outcome (e.g., a player pulls the handle of a slot machine and the reels resolve to "Bar-Bar-Bar"). In one embodiment, a player wagers a number of credits in accordance with each game play. In some embodiments, one or more game plays may be associated with a particular cashless gaming receipt. For example, (i) the wagered credits of a game play may be derived from a balance of credits generated by an inserted receipt, or (ii) a game play may occur during a session initiated by a receipt.

The terms "game session", "gaming session", "session" and "play session" are used interchangeably and may refer, unless specified otherwise, to a gambling event with a beginning and end that may encompass a number of game plays. The end of the session may be determined voluntarily (in which the player elects to stop play) or involuntarily (in which the gaming device terminates play). In some embodiments, a game session may be associated with a particular cashless gaming receipt, particular player or particular player identifier and/or particular gaming device. For example, an associated session may begin when a player inserts a particular cashless gaming receipt, and end when the player cashes out.

The terms "cash-out ticket", "cashless gaming ticket", "ticket", and "cashless gaming receipt" are used interchangeably herein and may refer, unless specified otherwise, to a substrate (e.g., a small piece of paper) that may be output and/or received by a device such as a gaming device (e.g., via a "ticket-in/ticket-out" slot of a gaming device or its peripheral device) and that is redeemable for cash or another benefit and/or may be used for wagering purposes. A cash-out ticket may be issued by a game or gaming device, or as a result of a communication from a game or gaming device to associated equipment. A cash-out ticket may be associated with a value that is based on a credit meter balance of a gaming device at the time a player requests to cash out the balance and is issued the cash-out ticket. A cash-out ticket may comprise (i) machine-readable indicia (e.g., a bar code) or other machine-readable substance (e.g., magnetically encoded material) and/or (ii) an identifier (e.g., a unique series of numeric digits or alphanumeric characters). In one or more embodiments, machine-readable indicia may indicate an identifier (e.g., a printed barcode encodes a ticket identifier). In one embodiment, a database stored at a central location (e.g., a server operable to communicate with one or more gaming device, one or more casino attendant terminals and/or other devices) may store records of issued cash-out tickets, each record correlating an identifier of a cash-out ticket to a value. A cash-out ticket may entitle its bearer (or a specified person) to an amount of credits or currency equal to an indicated face value or to an amount based on an indicated face value. An indicated face value may correspond to an amount of credits indicated by a credit meter balance of a gaming device at the time of cash-out.

The term "outcome" may refer, unless specified otherwise, to a result of a game play and may refer to one or more indicia indicative of the result. Examples of outcomes include cherry-cherry-cherry in a slot machine game, a push in blackjack, a flush in video poker, the completion of a puzzle, the attainment of a goal, etc. Different types of gaming devices may have widely varying types of outcomes. Several are described in detail herein and still others will be apparent to those of skill in the art based on the present disclosure.

The term "payout" may refer, unless specified otherwise, to a benefit or prize to be provided as a result of an outcome that corresponds to the payout. For example, a payout may comprise an amount of currency (e.g., cash, electronic credits, comp points).

The term "jackpot" may refer, unless specified otherwise, to the top prize, or value of greatest relative benefit, available for winning via a game.

The terms "package of spins", "package of game plays" and "package" are used interchangeably herein and, unless specified otherwise, may refer to a plurality of game plays that may be purchased for a single specified price. A package may define one or more terms or conditions that a purchaser agrees to upon providing the price. For example, the package may define a duration of play as beginning at a particular time (e.g., upon initiation of the first game play under the terms of the package after a purchase or selection of the package) and ending at a specified time, such that the purchaser of the package may be allowed to play a gaming device for the duration so defined in exchange for providing the price corresponding to the package. Alternately or additionally, the package may define a duration of play as a (e.g., fixed) number of game plays.

In one or more embodiments, the specified end time of the package may be defined in terms of one or more events, the occurrence of which causes an end of the duration of play. Examples of such events include, but are not limited to, (i) a passage of a predetermined length of time from a time at which the duration of play began, (ii) an occurrence of a predetermined number of qualifying outcomes from a beginning time of the duration of play; (iii) an occurrence of a predetermined outcome (e.g., an outcome corresponding to an outcome of at least a predetermined magnitude); (iv) a player pausing play (e.g., not initiating a game play) for at least a predetermined length of time; and (v) an occurrence of a predetermined credit meter balance (e.g., a credit meter balance of zero and/or a number less than zero). A qualifying outcome may comprise, for example, the nth outcome in the duration of play (e.g., if the package defines 100 game plays, the duration of play defined by the package ends upon the occurrence of the $100^{th}$ game play after the beginning of the duration of play). Another example of a qualifying outcome may comprise an outcome that occurs at a predetermined time after the initiation of the duration of play. For example, if a package defines 30 minutes of play as the duration of play, the outcome that occurs at the $30^{th}$ minute since the beginning of the duration of play may comprise a qualifying outcome.

In one or more embodiments, a game play package may be referred to as a prepaid session or prepaid flat rate play session (e.g., a time of play or plurality of game plays that are paid for upfront (i.e. before the game session is initiated). Once a session is prepaid, the player does not need to supply any additional funds until the session has been completed. A prepaid session may allow the player to complete many game plays during the session.

In one embodiment, a package of game plays may be purchased via a contract. A contract that may be determined, offered and/or purchased to facilitate play of a gaming device is described in detail herein.

Regarding player tracking cards and player tracking systems, most casinos issue plastic cards (typically resembling frequent shopper cards) to players as a way of identifying the player at a slot machine or table game. As is well known in the art, such cards typically have encoded thereon (e.g., in machine-readable and/or human readable form) a player identifier (e.g., a six digit number) which uniquely identifies the player (e.g., because the number is associated with a record in a player database that includes corresponding player information). At a slot machine or other device, the player inserts the card into a corresponding reader device and the player identifier is read (e.g., magnetically or optically) from the card. From the player identifier which the reader device reads, the corresponding player information may in turn be determined (e.g., read from the database, typically via a network connection between the reader device and a device hosting the database).

The term "spin meter" may refer, unless specified otherwise, to an electronic or electromechanical meter that displays the number of game plays remaining in a session, contract, or package. A spin meter may include or be associated with a processor and/or memory that tracks and updates the number of spins remaining based on game plays or spins initiated and/or completed under the terms of the contract, session or package. In one embodiment, a spin meter may be a component of a gaming device. In another embodiment, a spin meter may be a component of a peripheral device. For example, a player might buy a spin package of "100 Jackpot Only Spins". As each Jackpot Only spin is completed, the spin meter decrements by one.

Referring now to FIG. 1A, an apparatus 100A according to embodiments includes a casino server 110A that is in communication with one or more gaming devices 120A, one or more player devices 130A, and one or more insurer devices 140A. Each of the gaming devices, player devices and insurer devices may comprise computers, such as those based on the Intel® Pentium® processor, that are adapted to communicate with the casino server 110A; portable types of computers, such as a laptop computer; a palm-top computer; a hand-held computer; or a Personal Digital Assistant (PDA). Other equivalent devices capable of performing the methods specified herein would be apparent to one of skill in the art.

Any number of gaming devices, player devices and insurer devices may be in communication with the casino server 110A. The number of each depicted in FIG. 1A is solely for purposes of illustration.

The casino server 110A may communicate with the gaming devices, the player devices and the insurer devices directly or via a network, including without limitation the Internet, a wireless network protocol, a local area network (or any combination thereof), through a Web site maintained by casino server 110A on a remote server or over an on-line data network including commercial on-line service providers, and bulletin board systems. The casino server may communicate with the gaming devices, the player devices and the insurer devices directly or indirectly. In yet other embodiments, the devices may communicate with casino server 110A over radio frequency (RF), cable TV, satellite links and the like.

Those skilled in the art will readily understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The casino server 110A may function as a "Web server" that generates Web pages (documents on the Web that typically include an HTML file and associated graphics and script files) that may be accessed via the Web and allows communication with the casino server 110A in a manner known in the art.

FIG. 1A depicts only an embodiment of the invention. Other arrangements of devices to perform various methods specified herein will be readily appreciated by those of skill in the art.

Any and all of the devices described herein (e.g., a gaming device 120A and casino server 110A) may be in communication with one another via any conventional communications medium and/or protocol. For example, a gaming device 120A may communicate with the casino server 110A via a WEB-based connection, a local area network (LAN), a wide area network (WAN), the Internet, other forms of internet protocol (IP) networks (e.g., intranets or extranets), a publicly switched telephone network (PSTN), a wireless communications network or any other known communications system/medium. Those skilled in the art will understand that devices in communication with each other need only be "capable of" communicating with each other and need not be continually transmitting data to or receiving data from each other. On the contrary, such devices need only transmit data to or receive data from each other as necessary, and may actually refrain from exchanging data most of the time. For example, a device in communication with another device via the Internet may not transmit data to the other device or receive data from the other device for weeks at a time. Further, devices may be in communication even though steps may be required to establish a communication link (e.g., dialing a network service provider).

A variety of communications protocols may be part of the system 100A or another system described herein (e.g. system 100B, described with respect to FIG. 1B), including but not limited to: Ethernet (or IEEE 802.3), SAP, SAS™, Super-SAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

Figure 1B:
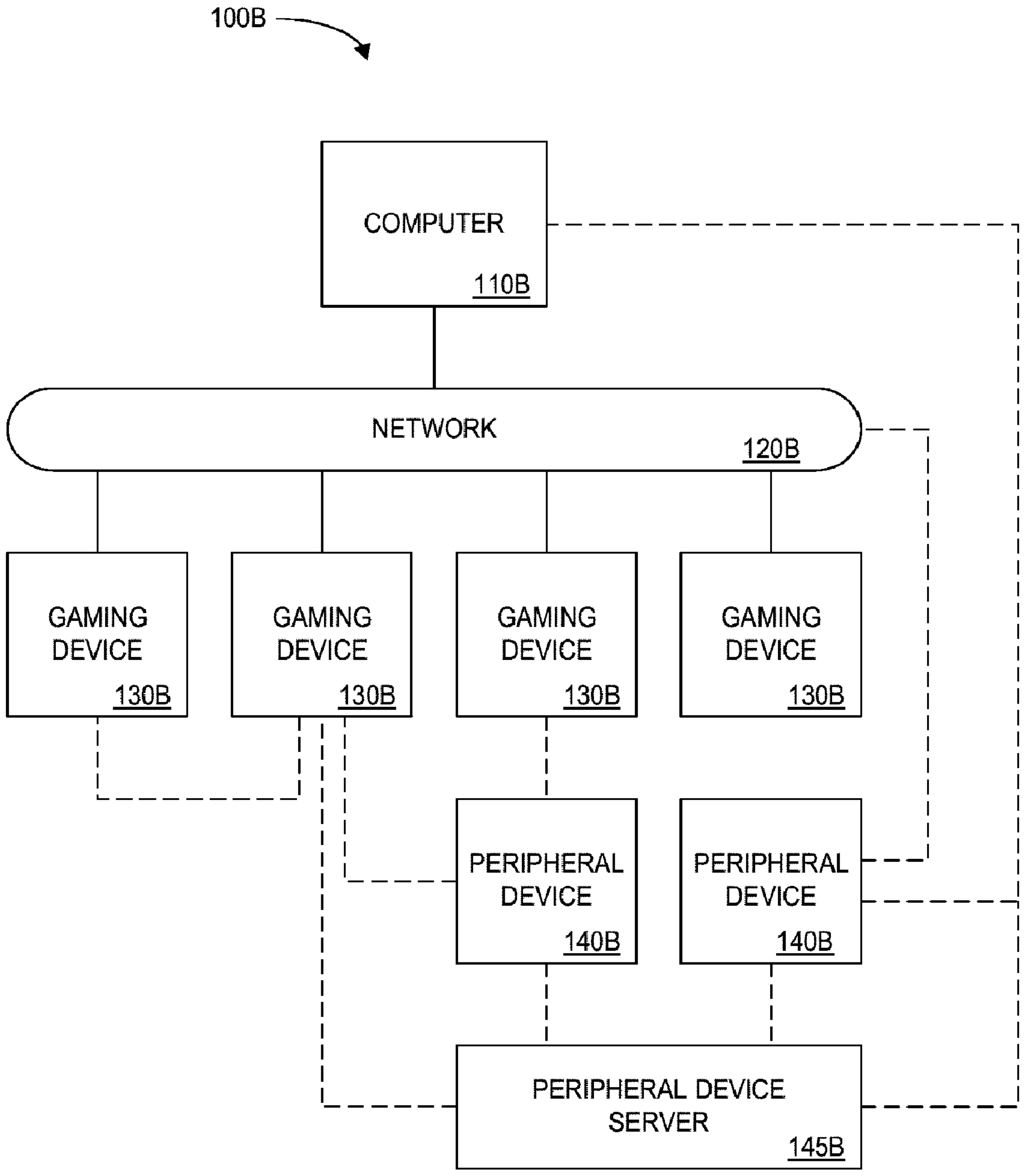
FIG. 1B is a block diagram of a system consistent with at least one embodiment.

Referring now to FIG. 1B, illustrated therein is an alternative system 100B according to at least one embodiment described herein. The system 100B includes a computer (e.g., a slot server of a casino) that is in communication, via a communications network, with one or more gaming devices (e.g., slot machines, video poker machines). A difference between the aforementioned system 100A and this alternative system 100B is that in this system at least one gaming device 130B is in communication with one or more peripheral devices 140B. A peripheral device 140B may, in turn, be in communication with a peripheral device server 145B and, in some embodiments, with the computer 110B. In one or more embodiments the peripheral device server 145B may be in communication with one or more gaming devices 130B and/or computer 110B.

It should be noted that, although not pictured for purposes of simplicity, system 100B may include one or more player devices (e.g., such as a player device 130A) and/or one or more insurer devices (e.g., such as an insurer device 140A).

The computer 110B may communicate with the gaming devices 130B and peripheral devices 140B directly or indirectly, via a wired or wireless medium such as the Internet, LAN, WAN or Ethernet, Token Ring, or via any appropriate communications means or combination of communications means. For example, the computer 110B may communicate directly with one of the gaming devices (e.g., via a LAN) and indirectly (e.g., via a gaming device) with a peripheral device. In another example, the computer 110B may communicate with one of the gaming devices 130B via a LAN and with another of the gaming devices 130B via the Internet (e.g., if the particular gaming device comprises a personal computer in communication with an online casino).

One or more of the devices of system 100B may comprise computers, such as those based on the Intel® Pentium® processor, that are adapted to communicate with the computer. Further, one or more of the devices may comprise a gaming device such as a mechanical or electronic slot machine, a video poker machine, a video blackjack machine, a video keno machine, a pachinko machine, a video roulette machine, and/or a lottery terminal. Further yet, one or more of the devices may comprise an external or internal module associated with one or more of the gaming devices that is capable of communicating with one or more of the gaming devices and of directing the one or more gaming devices to perform one or more functions. Any number of devices may be in communication with the computer. Any number and type of peripheral devices 140B may be in communication with a gaming device 130B, peripheral device server 145B and/or the computer 110B.

In an embodiment, the computer 110B may not be necessary and/or preferred. For example, the present invention may, in one or more embodiments, be practiced on a stand-alone gaming device 130B, one or more gaming devices 130B in communication with one or more peripheral devices 140B, one or more gaming devices 130B in communication with a peripheral device server 145B, one or more peripheral devices 140B in communication with a peripheral device server 145B, and/or a gaming device 130B in communication only with one or more other gaming devices 130B. In such an embodiment, any functions described as performed by the computer 110B or data described as stored in a memory of the computer 110B may instead be performed by or stored on one or more gaming devices 130B, one or more peripheral devices 140B, and/or peripheral device server 145B.

Similarly, a peripheral device server 145B may not be desired and/or needed in some embodiments. In embodiments that do not involve a peripheral device server 145B, any or all of the functions described herein as being performed by a peripheral device server 145B may instead be performed by the computer 110B, one or more gaming devices 130B, one or more peripheral devices 140B, or a combination thereof. Similarly, in embodiments that do not involve a peripheral device server 145B any data described herein as being stored in a memory of a peripheral device server 145B may instead be stored in a memory of another server computer, one or more gaming devices 130B, one or more peripheral devices 140B, or a combination thereof.

Any or all of the gaming devices 130B may, respectively, include or be in communication with a peripheral device 140B. A peripheral device 140B may be a device that receives information from (and/or transmits information to) one or more gaming devices 130B. For example, a peripheral device 140B may be operable to receive information about games being played on a gaming device 130B, such as the initiation of a game and/or a random number that has been generated for a game.

In one or more embodiments, one or more such peripheral devices 140B may be in communication with a peripheral device server 145B. This allows the peripheral device server 145B to receive information regarding a plurality of games being played on a plurality of gaming devices 130B. The peripheral device server 145B, in turn, may be in communication with the computer 110B. It should be understood that any functions described herein as performed by a peripheral device 140B may also or instead be performed by the peripheral device server 145B. Similarly, any data described herein as being stored on or accessed by a peripheral device 140B may also or instead be stored on or accessed by the peripheral device server 145B.

A peripheral device 140B may be operable to access a database (e.g., of a peripheral device server 145B) to provide benefits (e.g., cashless gaming receipts) based on, for example, an outcome of a game. In another example, a peripheral device 140B may include a player interface for displaying information to a player regarding one or more contracts or packages of game plays available for purchase and/or information about a contract or package of game plays that has been purchased. For example, in one embodiment a peripheral device may include a touch-screen via which a player may indicate a desire to purchase a contract or package of game plays and a display (e.g., a "spin meter") that indicates to a player a number of game plays remaining available to a player who has purchased a contract or package of game plays.

The peripheral device server 145 may also monitor player gambling history over time by associating gambling behavior with player identifiers, such as player tracking card numbers. For example, information about the player obtained or accessed by a peripheral device server 145B may be analyzed, e.g., to identify those players that a particular gaming machine owner, operator, or manufacturer finds most desirable. Based upon desired objectives, the peripheral device server 145B may direct the appropriate peripheral device 140B to issue customized messages, offers (e.g., customized offers for contracts or packages of game plays), and games to specific players.

Information received by a peripheral device 140B from a gaming device 130B may include gambling data such as number of games initiated per unit of time, outcomes displayed for games initiated, payouts corresponding to outcomes displayed, a credit meter balance of the gaming device, a spin meter balance of the gaming device, and/or data associated with the player currently playing the gaming device.

The functions described herein as being performed by a peripheral device server 145B and/or a peripheral device 140B may, in one or more embodiments, be performed by the computer 110B (in lieu of or in conjunction with being performed by a peripheral device server 145B and/or a peripheral device 140B).

In one or more embodiments, a peripheral device 140B may be useful for implementing the embodiments into the operation of a conventional gaming device. For example, in order to avoid or minimize the necessity of modifying or replacing a program already stored in a memory of a conventional gaming device, an external or internal module that comprises a peripheral device 140B may be inserted in or associated with the gaming device.

Thus, for example, a peripheral device 140B may be utilized to monitor play of the gaming device 130B and output messages and an outcome of a game. In such embodiments the gaming device 130B with which the peripheral device 140B is in communication may continue to operate conventionally.

Accordingly, a peripheral device 140B may include (i) a communications port (e.g., for communicating with one or more gaming devices, peripheral device server, another peripheral device, and/or computer; (ii) a display (e.g., for displaying messages and/or outcomes and payouts), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device 140B may not output outcomes and/or messages to a player but may instead direct the processor of a gaming device 130B to perform such functions. For example, a program stored in a memory of peripheral device 140B may cause a processor of a gaming device 130B to perform certain functions. For example, a program stored in a memory of peripheral device 140B may cause a processor of a gaming device 130B to output an outcome, determine an outcome, output a message, output information regarding a contract or package of game plays, initiate a game play in accordance with a purchased contract or package of game plays (e.g., without requiring payment therefore), access a database, provide a benefit, refrain from providing a benefit (e.g., by not sending a signal to a hopper controller of the gaming device when it otherwise normally would), and/or communicate with another device.

Examples of peripheral devices 140B include (1) electronic apparatuses "retrofitted" to conventional gaming devices so that inventive processes disclosed herein may be realized through game play at the gaming device, (2) Personal Digital Assistants such as those manufactured by Palm, Inc., (3) lap top computers, (4) cellular telephones, (5) pagers, (6) buttons or (7) any combination thereof.

In one or more embodiments, either or both of system 100A and system 100B may include additional devices, such as one or more kiosks and/or one or more casino personnel devices. One or more point-of-sale terminals associated with one or more merchants may also be included in either or both of system 100A and system 100B.

In some embodiments, a kiosk may be configured to execute or assist in the execution of various processes of the present invention. In some embodiments, a kiosk may comprise a processor and a memory as described. A kiosk may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk may comprise many of the features and components of a gaming device, though the kiosk itself may not necessarily be configured to enable gambling activity as a primary function. A kiosk may communicate with any or all of (i) a central controller, (ii) a gaming device, (iii) an inventory/reservation system of a casino-maintained property (e.g., a hotel), (iv) casino personnel devices, (v) merchant POS terminals, and so on. A number of kiosks may be stationed within casino premises (e.g., at various locations on a slot floor). In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cashless gaming tickets, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices, such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device, server, kiosk, peripheral device, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals to facilitate various processes of the present invention. For example, in some embodiments, a player may receive a cashless gaming ticket redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a central slot server, (ii) a gaming device, (iii) an inventory/reservation system (e.g., a computer terminal at a theatre communicates with an inventory database to determine a number of unsold seats for a certain event), (iv) a kiosk, and so on.

In some embodiments, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

Figure 2:
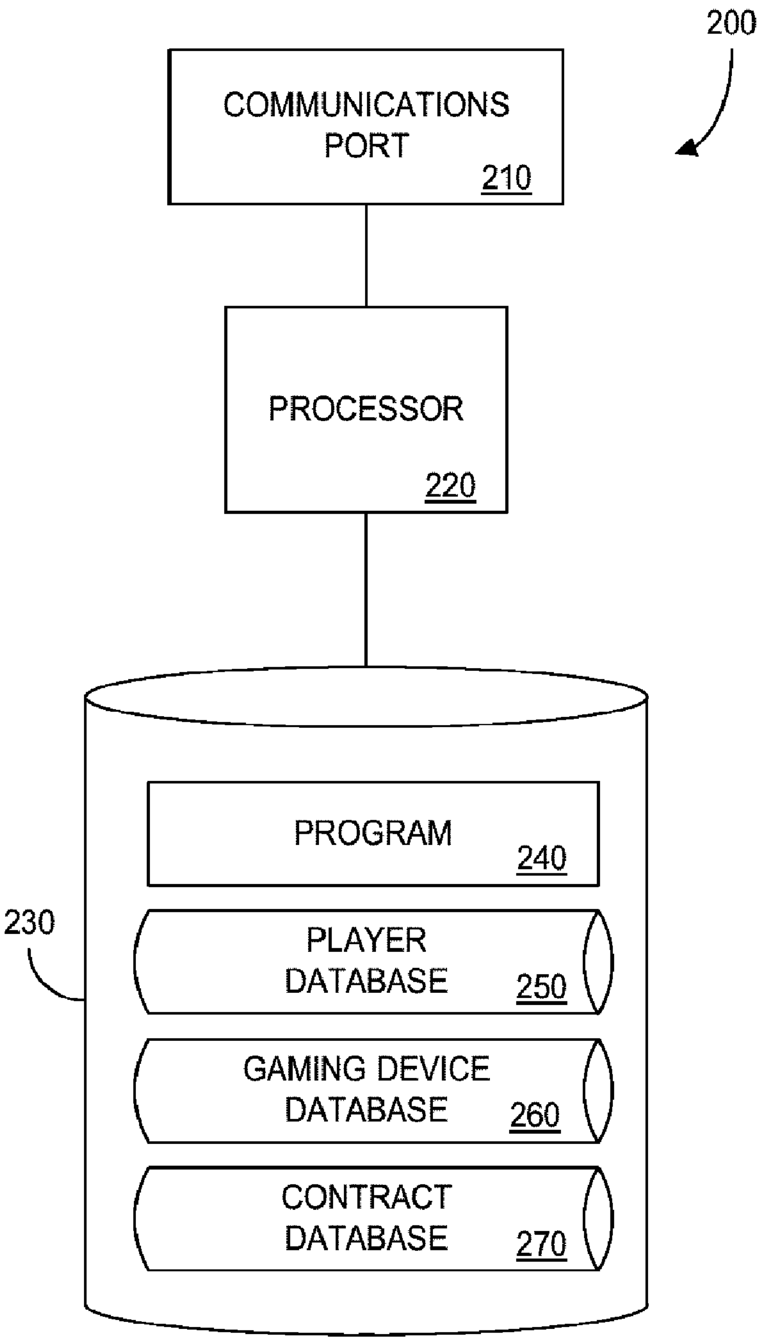
FIG. 2 is a block diagram of one embodiment of a casino server.

FIG. 2 illustrates an embodiment 200 of the casino server 110A (FIG. 1A). Embodiment 200 may also be an embodiment of computer 110B (FIG. 1B). The casino server 110 may be implemented as a system controller, a dedicated hardware circuit, an appropriately programmed general-purpose computer, or any other appropriate device including without limitation electronic, mechanical or electro-mechanical devices.

The server of the illustrated embodiment comprises a processor 210, such as one or more Intel® Pentium® microprocessors. The processor 210 is in communication with a communication port 220 and a data storage device 230. The communications port 220 allows the processor 210 to communicate with other devices, such as the insurer device 140. The data storage device 230 comprises magnetic memory, optical memory, semiconductor memory or any combination thereof. The data storage device 230 may include, for example, Random Access Memory (RAM), Read-Only Memory (ROM), a compact disc, digital video disc and/or a hard disk. The processor 210 and the storage device 230 may each be, for example: (i) located entirely within a single computer or computing device; or (ii) connected to each other by a remote communication medium, including without limitation a serial port cable, a telephone line, a network connection or a radio frequency transceiver. In some embodiments, the casino server 110 may comprise one or more computers that are connected to a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format, as well as in a variety of other forms known in the art. The program 240 furthermore includes program elements that may be necessary, including without limitation an operating system, a database management system and "device drivers" for allowing the processor 210 to interface with peripheral devices. Appropriate program elements are well known to those skilled in the art, and need not be described in detail herein.

According to an embodiment of the present invention, the instructions of the program 240 may be read into a main memory from another computer-readable medium, such as into RAM from hard drive or ROM. Execution of sequences of the instructions in program 240 causes processor 210 to perform process steps described herein. In alternative embodiments, hard-wired circuitry may be used in place of, or in combination with, software instructions for implementation of the processes of the present invention, as would be understood by those of skill in the art. Thus, embodiments are not limited to hardware, software or any specific combination of hardware and software.

The storage device 230 also stores (i) a player database 250, (ii) a gaming device database 260, and (iii) a contract database 270. The databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Based on the present disclosure many other arrangements of data will be readily understood by those of skill in the art.

Figure 3:
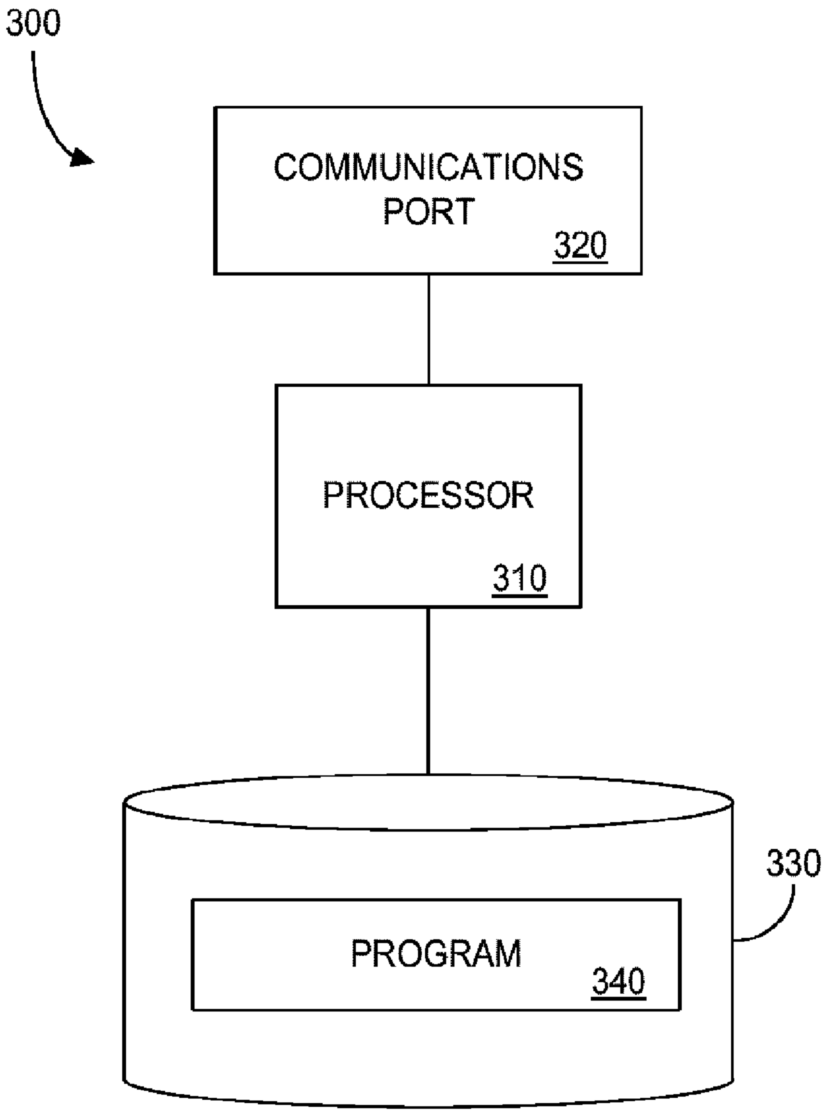
FIG. 3 is a block diagram of one embodiment of an insurer device.

FIG. 3 illustrates an embodiment 300 of an insurer device. The insurer device may be implemented as a dedicated hardware circuit, an appropriately programmed general-purpose computer, or any other appropriate device including without limitation electronic, mechanical or electromechanical devices. Accordingly, the insurer device need not include the various components depicted in FIG. 3.

It should be noted, as described herein, that an insurer (and thus an insurer device) may not be necessary and/or desired. For example, embodiments may be practiced by a casino without utilizing a separate entity to insure losses of contracts or packages. For example, a casino may price contracts or packages such that the casino, on average or over the long term, does not incur losses on contracts or packages (although individual contracts or packages may result in a loss to the casino), thus obviating the need for an insurer.

The insurer device of the illustrated embodiment comprises a processor 310, such as one or more Intel® Pentium® microprocessors. The processor 310 is in communication with a communications port 320 and a data storage device 330. The communications port 320 allows the processor 310 to communicate with other devices, such as the casino server 110A. The data storage device 330 comprises magnetic memory, optical memory, semiconductor memory or any combination thereof. The data storage device 330 may include, for example, Random Access Memory (RAM), Read-Only Memory (ROM), a compact disc and/or a hard disk. The processor 310 and the storage device 330 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 330 stores a program 340 for controlling the processor 310. The processor 310 performs instructions of the program 340, and thereby operates in accordance with the present invention, and particularly in accordance with the methods described in detail herein. The program 340 may be stored in a compressed, uncompiled and/or encrypted format, as well as in a variety of other forms known in the art. The program 340 furthermore includes program elements that may be necessary, including without limitation an operating system, a database management system and "device drivers" for allowing the processor 310 to interface with peripheral devices. Appropriate program elements are well known to those skilled in the art, and need not be described in detail herein.

According to an embodiment of the present invention, the instructions of the program 340 may be read into a main memory from another computer-readable medium, such as into RAM from hard drive or ROM. Execution of sequences of the instructions in program 340 causes processor 310 to perform process steps described herein. In alternative embodiments, hard-wired circuitry may be used in place of, or in combination with, software instructions for implementation of the processes of the present invention, as would be understood by those of skill in the art. Thus, embodiments are not limited to hardware, software or any specific combination of hardware and software.

Figure 4:
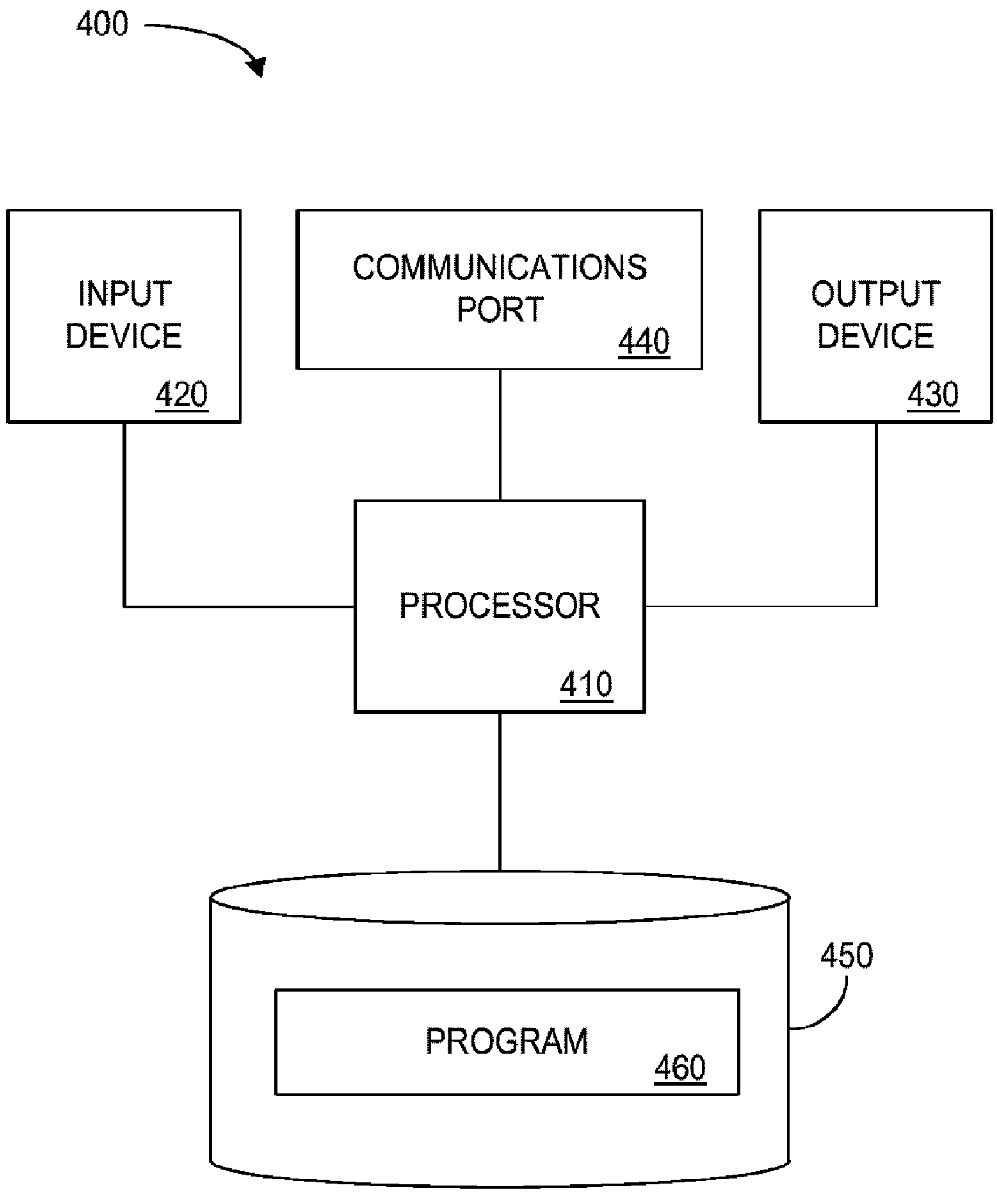
FIG. 4 is a block diagram of one embodiment of a gaming device.

FIG. 4 illustrates an embodiment 400 of a gaming device. Well-known examples of gaming devices include video poker, video blackjack, pachinko, mechanical slot machines and video slot machines. The gaming device may be implemented as a dedicated hardware circuit, an appropriately programmed general-purpose computer, or any other appropriate device including without limitation electronic, mechanical or electromechanical devices. Accordingly, the gaming device need not include the various components depicted in FIG. 4.

The gaming device of the illustrated embodiment comprises a processor 410, such as one or more Intel® Pentium® microprocessors. The processor 410 is in communication with a communications port 440 and a data storage device 450. The data storage device 450 comprises magnetic memory, optical memory, semiconductor memory or any combination thereof. The data storage device 450 may include, for example, Random Access Memory (RAM), Read-Only Memory (ROM), a compact disc and/or a hard disk. The processor 410 and the storage device 450 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 450 stores a program 460 for controlling the processor 410. The processor 410 performs instructions of the program 460, and thereby operates in accordance with the present invention, and particularly in accordance with the methods described in detail herein. The program 460 may be stored in a compressed, uncompiled and/or encrypted format, as well as in a variety of other forms known in the art. The program 460 furthermore includes program elements that may be necessary, including without limitation an operating system, a database management system and "device drivers" for allowing the processor 410 to interface with peripheral devices. Appropriate program elements are well known to those skilled in the art, and need not be described in detail herein.

According to an embodiment of the present invention, the instructions of the program 460 may be read into a main memory from another computer-readable medium, such as into RAM from hard drive or ROM. Execution of sequences of the instructions in program 460 causes processor 410 to perform process steps described herein. In alternative embodiments, hard-wired circuitry may be used in place of, or in combination with, software instructions for implementation of the processes of the present invention, as would be understood by those of skill in the art. Thus, embodiments are not limited to hardware, software or any specific combination of hardware and software.

The processor 410 may also be in communication with one or more input devices 420 and one or more output devices 430.

Examples of input devices include: a button (e.g., a button for selecting a particular package of game plays); a touch screen; a handle; a player tracking card device, which performs functions related to player tracking cards, such as reading player tracking cards and communicating information read from such cards to the processor 410; a ticket reader, which is capable of reading tickets and particularly indicia registered on tickets and like material; a credit card reader which generally allow a card such as a credit card or debit card to be inserted therewithin and information to be read therefrom.

In one or more embodiments, an input device may comprise a display device. The display device may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device may include more than one display device, one or more other output devices, or a combination thereof (e.g., two display devices and two audio speakers). Yet another of the display devices may display packages of game plays or contracts available for purchase. It should be noted that any information described as being displayed via a display device herein may or may not be continuously displayed. For example, a display device may be operable to selectively display information to a player. For example, upon determining that a satisfaction of a predetermined condition has occurred or that a predetermined event has occurred (e.g., a player has indicated a desire for an output of certain information or the player's gambling behavior exhibits certain characteristics), information may be displayed via a display device. For example, upon a player indicating a desire to consider purchase of a package of game plays or a contract, a display device may display a menu of available packages or contracts.

In one embodiment, information displayed via a display device may be updated or changed in response to changes in information or data. For example, an electromechanical button may be a display device that displays information about an available package of game plays or an available contract. However, the information so displayed via the button may be changed based on changes to the available package or contract. For example, a first available package of game plays may be replaced by a second available package of game plays (e.g., by casino personnel, by a processor of a device based on application of one or more rules, etc.). Accordingly, the information on the button that previously described the first package may be replaced with information that describes the second package.

Examples of output devices include: a cash dispenser, which dispenses coins and/or bills to players that have requested to have funds be dispensed; a ticket printer, which may be commanded to print onto a substrate, such as paper or other material; a display screen, such as a liquid crystal display, a plasma display and a video display monitor.

In one or more embodiments, a gaming device may include a player tracking module (e.g., an input and/or output device of the gaming device may comprise a player tracking module). A player tracking module may comprise a reader device for reading data from player tracking cards and/or smart cards, such that (i) players may be identified, and (ii) various data associated with players may then be determined (e.g., a package or contract previously purchase by the player, a number of cashable credits; a number of promotional credits that may not be redeemed for cash; a number of accumulated loyalty points; a number of accumulated game elements such as symbols, cards or hands; etc.). In one example, a card reader device may determine an identifier associated with a player (e.g., by reading a player tracking card comprising an encoded version of the identifier), such that the gaming device may then access data (e.g., of a player database, as described) associated with the player. In another example, a smart card reader device may determine data associated with a player directly by accessing a memory of an inserted smart card.

Thus, as known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments is the s-Choice™ Smart Card Casino Management System from Smart Card Integrators, Inc.™.

Further, as known in the art, a gaming device may comprise a player tracking module comprising (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players are contemplated. For example, a unique identification code may be associated with the player. The player may then be identified upon entering the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashless gaming ticket may encode a player identifier.

Thus, as described, various data associated with a player may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics may be measured in association with a player (e.g., coin-in statistics, win/loss statistics) and similarly accessed.

Various systems for facilitating such monitoring are contemplated. For example, a two-wire system such as one offered by International Gaming Systems (IGT) may be used. Similarly, a protocol such as the IGT SAS™ protocol or the SuperSAS™ protocol may be used. The SAS™ protocol and the SuperSAS™ protocol each respectively allows for communication between gaming machines and slot accounting systems and provides a secure method of communicating all necessary data supplied by the gaming device to the online monitoring system. One aspect of the SAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, coin-in statistics, win/loss statistics and/or any other data deemed relevant.

In one or more embodiments, the processor 410 is operable to communicate with a random number generator (not shown), which may be a component of the gaming device 400 or a component of another device (e.g., casino server 110A or computer 119B). The random number generator, in accordance with at least one embodiment of the present invention, may generate data representing random or pseudo-random values (referred to as "random numbers" herein). The random number generator may generate a random number every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBitS™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

In one or more embodiments, the processor 410 may be operable to communicate with a benefit output device (not shown), which may be a component of the gaming device 400. The benefit output device may comprise one or more devices for outputting a benefit to a player of the gaming device. For example, in one embodiment the gaming device may provide coins and/or tokens as a benefit. In such an embodiment the benefit output device may comprise a hopper and hopper controller, for dispensing coins and/or tokens into a coin tray of the gaming device. In another example, the gaming device may provide a receipt or other document on which there is printed an indication of a benefit (e.g., a cashless gaming receipt that has printed thereon a monetary value, which is redeemable for cash in the amount of the monetary value). In such an embodiment the benefit output device may comprise a printing and document dispensing mechanism. In yet another example, the gaming device may provide electronic credits as a benefit (which, e.g., may be subsequently converted to coins, spins and/or tokens and dispensed from a hopper into a coin tray). In such an embodiment the benefit output device may comprise a credit meter balance or spin balance and/or a processor that manages the amount of electronic credits that is indicated on a display of a credit meter balance or an amount of spins indicated on the display of a spin meter balance. In yet another example, the gaming device may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained. Note that, in one or more embodiments, the gaming device may include more than one benefit output device. For example, the gaming device may include both a hopper and hopper controller combination and a credit meter balance. Such a gaming device may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor may also be in communication with an input device, which is a device that is capable of receiving an input (e.g., from a player or another device) and which may be a component of gaming device. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor may also be in communication with a payment system, which may be a component of the gaming device. The payment system is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e., coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

In one or more embodiments, aspects of the present invention, such as allowing time-based play or play of multiple game plays of a gaming device in exchange for a price paid prior to initiation of the game plays (e.g., flat rate play in accordance with a contract or package), may be practiced by replacing and/or augmenting one or more components (e.g., hardware and/or software components) of an existing gaming device. Thus, in one or more embodiments, the invention may be applied as a retrofit or upgrade to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory commonly found gaming devices include electronically erasable programmable read-only memory (EPROM) and erasable programmable read-only memory (EEPROM). Thus, in one or more embodiments, an EEPROM storing software with instructions for carrying out aspects of the present invention (as well as instructions for carrying out other functions traditionally performed by the gaming device) may replace an EEPROM previously installed in a gaming device, such that the gaming device may be configured to operate in accordance with various processes of the present invention.

For example, a "flat rate play module" may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play a game offered by the gaming device that does not incorporate aspects of the present invention, or (ii) to play a game offered by the gaming device in a manner that utilizes aspects of the present invention. Thus, players who are familiar with the games offered by various gaming devices may elect to pay for them in a different or similar manner as they are accustomed to.

Accordingly, a gaming device may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that aspects of the present invention may not be utilized). If a player selects a "flat rate" mode, the gaming device may then be operable to execute game play in accordance with one or more aspects of the present invention.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; etc.). Accordingly, a player may select a mode of operation (e.g., by pressing an appropriately labeled icon of a touch-sensitive display screen), and upon receiving the player's selection, the gaming device may be configured to operate in the selected mode.

In other embodiments, as described, a peripheral device may be useful for implementing one or more embodiments into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device.

In still further embodiments, rather than configure existing gaming devices to execute aspects of the present invention by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the present invention without the need, or by minimizing the need, to remove and replace hardware within the gaming device.

Figure 5:
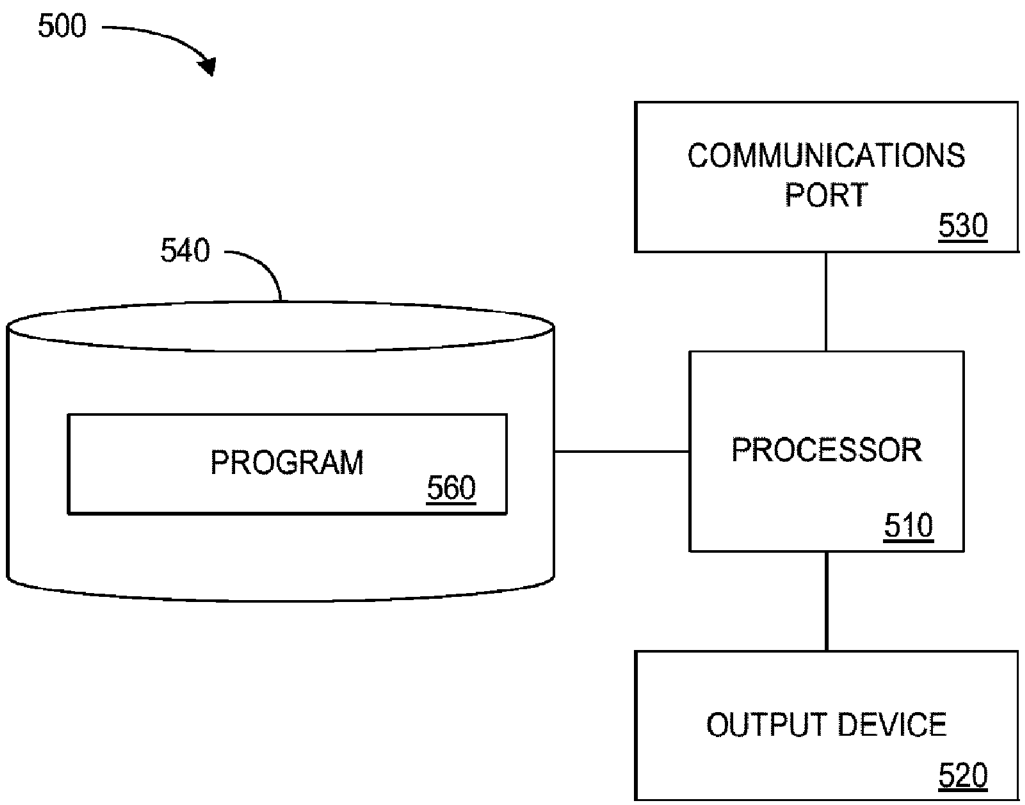
FIG. 5 is a block diagram of one embodiment of a player device.

FIG. 5 illustrates an embodiment 500 of a player device, which may comprise, for example, a TV or a personal computer. The player device may be implemented as a dedicated hardware circuit, an appropriately programmed general-purpose computer, or any other appropriate device including without limitation electronic, mechanical or electromechanical devices. Accordingly, the player device need not include the various components depicted in FIG. 5.

The gaming device of the illustrated embodiment comprises a processor 510, such as one or more Intel® Pentium® microprocessors. The processor 510 is in communication with a communications port 530 and a data storage device 450. The data storage device 540 comprises magnetic memory, optical memory, semiconductor memory or any combination thereof. The data storage device 540 may include, for example, Random Access Memory (RAM), Read-Only Memory (ROM), a compact disc and/or a hard disk. The processor 510 and the storage device 540 may each be, for example: (i) located entirely within a single computer or computing device; or (ii) connected to each other by a remote communication medium, including without limitation a serial port cable, a telephone line, a network connection or a radio frequency transceiver. In some embodiments, the player device may comprise one or more computers that are connected to a remote server computer for maintaining databases.

The data storage device 540 stores a program 560 for controlling the processor 510. The processor 510 performs instructions of the program 560, and thereby operates in accordance with the present invention, and particularly in accordance with the methods described in detail herein. The program 560 may be stored in a compressed, uncompiled and/or encrypted format, as well as in a variety of other forms known in the art. The program 560 furthermore includes program elements that may be necessary, including without limitation an operating system, a database management system and "device drivers" for allowing the processor 510 to interface with peripheral devices. Appropriate program elements are well known to those skilled in the art, and need not be described in detail herein.

According to an embodiment of the present invention, the instructions of the program 560 may be read into a main memory from another computer-readable medium, such as into RAM from hard drive or ROM. Execution of sequences of the instructions in program 560 causes processor 510 to perform process steps described herein. In alternative embodiments, hard-wired circuitry may be used in place of, or in combination with, software instructions for implementation of the processes of the present invention, as would be understood by those of skill in the art. Thus, embodiments are not limited to hardware, software or any specific combination of hardware and software.

The processor 510 may also be in communication with one or more output devices 520.

Examples of output devices include: a ticket printer, which may be commanded to print onto a substrate, such as paper or other material; a display screen, such as a liquid crystal display, a plasma display and a video display monitor.

Player Database

FIG. 6 is a tabular representation 600 of the player database. The tabular representation 600 of the player database includes a number of example records or entries 680 and 685 each defining a player. Those skilled in the art will understand that the player database may include any number of entries. The tabular representation 600 also defines fields for each of the entries or records. The fields specify: (i) a player identifier 610 that uniquely identifies the player; (ii) a name 620 of the player; (iii) an address 630 of the player; (iv) a financial account identifier 640 of the player, which may be, e.g., a credit card, debit card or checking account number; (v) demographic data 650 about the player, such as the age, gender, income level of the player; (vi) credits 660 which the player has accumulated in one or more previous and current plays at one or more gaming devices; and (vii) an indication of the aggregate amount 670 that the player has ever wagered, or that the player has ever deposited in a gaming device or made available for wagering at a gaming device.

Not all of the fields depicted in FIG. 6 are required, and various substitutions, deletions and other changes to the tabular representation will be readily apparent to those of ordinary skill in the art.

Gaming Device Database

FIG. 7 is a tabular representation 700 of the gaming device database. The tabular representation 700 of the gaming device database includes a number of example records or entries 740 and 745, each defining a gaming device. Those skilled in the art will understand that the gaming device database may include any number of entries. The tabular representation 700 also defines fields for each of the entries or records. The fields specify: (i) a gaming device identifier 710 that uniquely identifies the gaming device; (ii) a name 720 of the gaming device, which may additionally or alternatively specify the type of game(s) playable at the gaming device; and (iii) a manufacturer 730 of the gaming device.

Not all of the fields depicted in FIG. 7 are required, and various substitutions, deletions and other changes to the tabular representation will be readily apparent to those of ordinary skill in the art.

Contract Database

FIG. 8 is a tabular representation 800 of the contract database. The tabular representation 800 of the contract database includes a number of example records or entries such as the entry 895. Each record defining a contract that a player may agree to, and which may govern play at a gaming device accordingly. Those skilled in the art will understand that the contract database may include any number of entries. The tabular representation 800 also defines fields for each of the entries or records. The fields specify: (i) a contract identifier 810 that uniquely identifies the contract; (ii) a player identifier 820 that uniquely identifies a player who has agreed to the terms of the contract; (iii) an initial player bankroll 830 which sets forth the required initial amount, if any, which the player must provide; (iv) a description 840 of the contract; (v) a cost 850 which describes the cost, if any, of the contract to the gaming device (for e.g., its operator/owner); (vi) a result 860 at the end of the contract period, including, e.g., what amounts are owed to/by whom; (vii) an amount 870 owed to the player at the end of the contract; (viii) an amount 880 owed to the insurer at the end of the contract.

The tabular representation 800 of the contract database also may indicate a total amount 890 owed to the insurer, which may be calculated as the sum of the amounts 880 for all records.

Not all of the fields depicted in FIG. 8 are required, and various substitutions, deletions and other changes to the tabular representation will be readily apparent to those of ordinary skill in the art.

Figure 9:
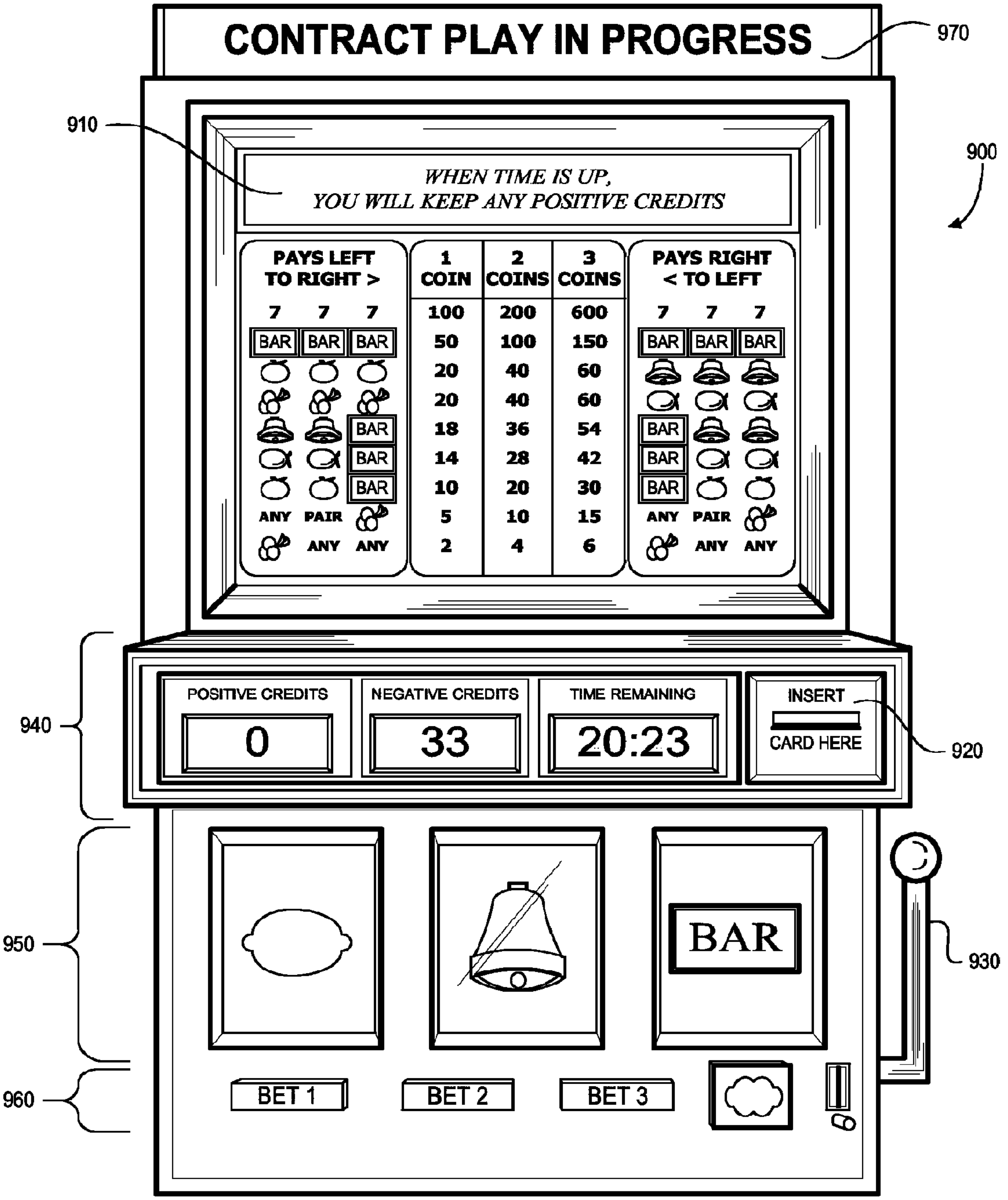
FIG. 9 is a front planar view of an illustrative gaming device, according to one embodiment.

Referring to FIG. 9, an illustrative gaming device 900 includes an information area 910, which displays a message to the user that, at the end of the contract, positive credits may be withdrawn by the player. Gaming device 900 also includes a card reader 920 for reading, e.g., player tracking cards. A handle 930 is used for initiating plays, in a manner known in the art. A display area 940 provides information, such as a positive credit balance (e.g., what credits may be withdrawn by the player as funds), a negative credit balance (e.g., what amounts have been lost but need not be repaid by the player) and a time remaining (e.g., for play according to the terms of a contract as described herein).

Reels 950 display the outcome of a play in the form of a reel symbol on each reel. Buttons 960 allow the player to indicate wager amounts for an outcome. An indicator 970 indicates whether a contract is in force and play must proceed under the terms of a contract.

Figure 10:
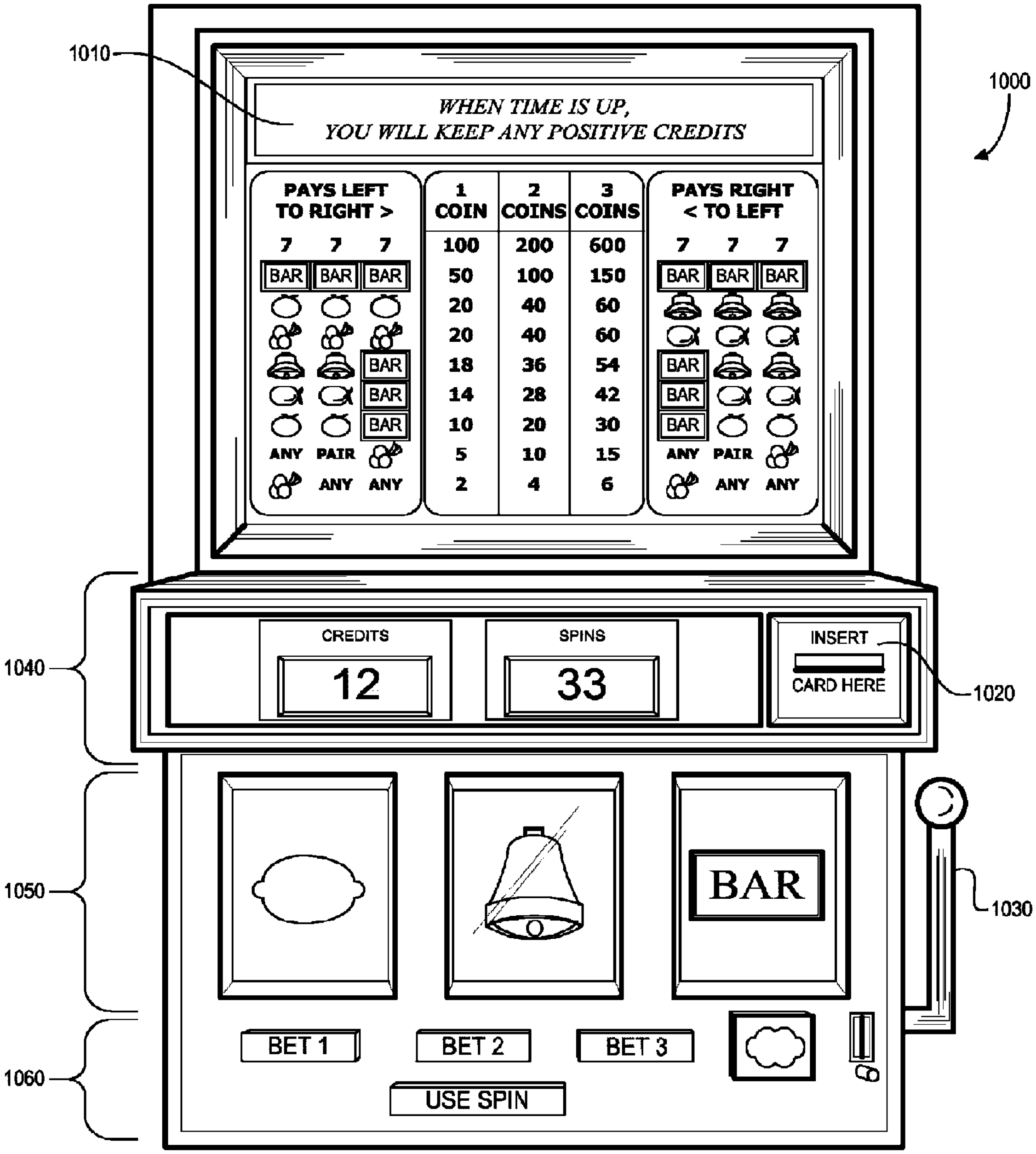
FIG. 10 is a front planar view of another illustrative gaming device, according to one embodiment.

Referring to FIG. 10, another illustrative gaming device 1000 includes an information area 1010. Gaming device 1000 also includes a card reader 1020 for reading, e.g., player tracking cards. A handle 1030 is used for initiating plays, in a manner known in the art. A display area 1040 provides information, such as a credit balance and a number of spins (i.e. plays or outcomes) remaining (e.g., for play according to the terms of a contract as described herein).

Reels 1050 display the outcome of a play in the form of a reel symbol on each reel. Buttons 1060 allow the player to indicate wager amounts for an outcome, and a "USE SPIN" button allows the player to indicate when another of the remaining spins (i.e. plays) is to be used.

Process Descriptions

In general, a method according to an embodiment of the present invention allows payment to be received from a player in exchange for a predetermined number of outcomes at a player device (such as a gaming device, television, web terminal, etc.). The predetermined number may be expressed as a number, or in terms of a combination of a minimum time (e.g., an hour) and minimum rate of play (no less than six plays per minute).

Further restrictions of a like nature may be that the player may not receive more than a maximum number of outcomes, the player must play for a certain minimum time period, the player must play for less than a certain maximum time period, the player must maintain a minimum rate of play, the player may not exceed a maximum rate of play, the total amount of funds inserted for use in game plays ("coin in") over the duration of the contract must exceed a certain minimum amount, and the total coin in over the duration of the contract must not exceed a certain amount.

Further restrictions of a like nature may be that the player may not receive more than a predetermined number of winning outcomes, the player may not receive more than a predetermined number of particular outcomes, the player may not receive more outcomes until a condition is met.

The player device generates at least the predetermined number of outcomes, and adjusts a balance of the player device based on the outcomes. Generally, the balance is increased according to winning outcomes and decreased according to wager amounts and (in some embodiments) losing outcomes. The player may be allowed to play, regardless of whether the balance decreases below zero.

In some embodiments, there may be established an agreement between a player, an insurer, and/or a casino. Terms of such a contract may include any or all of the following:

1. The player pays the insurer a fixed amount in advance.
2. The player must make a predetermined number of plays or outcomes (perhaps no more as well as no less).
3. The player need not pay any additional money after purchasing the contract.
4. The player keeps any net winnings after all outcomes have been generated.
5. If the player has a net loss (e.g., negative balance) after the outcomes have been generated, then the loss is paid to the casino by the insurer.

Many variations of these terms and additional terms will be readily apparent and many are further discussed in detail herein. The contract can serve to insure a player against excessive losses, and may give the player more outcomes than would otherwise be possible for the price of the contract. For example, a player wishing to make six hundred plays at a quarter slot machine would ordinarily require $150 (25 cents×600) in order to assure himself the ability of completing the six hundred plays. However, a contract might allow a player to make six hundred plays by paying only, e.g., $20.

Also, in some embodiments since there might be no additional player decisions required after the player has purchased the contract. For example, the player may not need to be present for the execution of the contract (plays) and may therefore experience the feeling of remote gambling.

Figure 11:
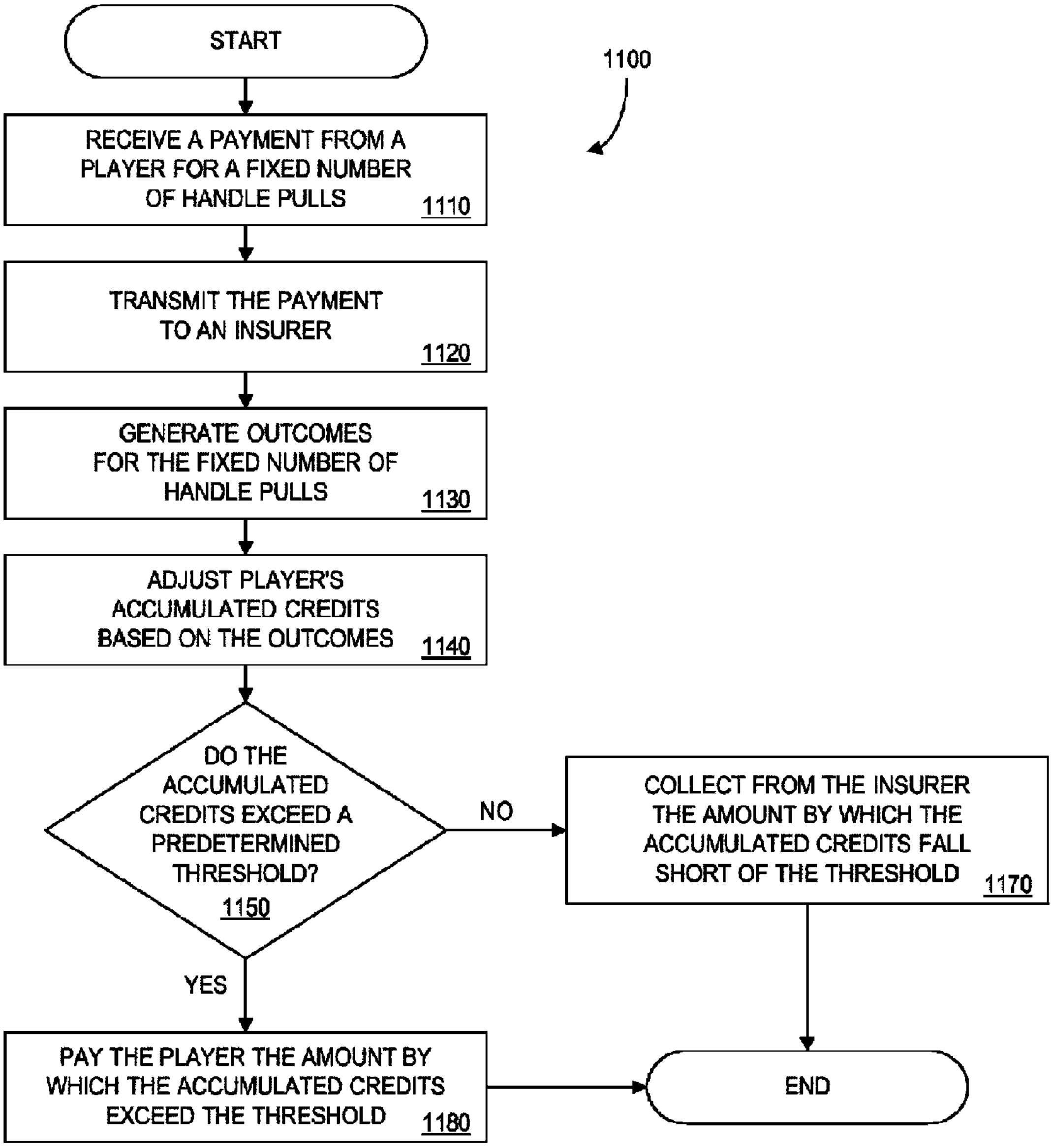
FIG. 11 is a flow chart illustrating an exemplary process according to an embodiment of the present invention.

Referring to FIG. 11, a flow chart 1100 represents an embodiment of the present invention that may be performed by a gaming device and/or the casino server 110 (FIG. 1) to execute in accordance with a contract. The particular arrangement of elements in the flow chart of FIG. 11, as well as the other flow charts and processes discussed herein, is not meant to imply a fixed order to the steps; embodiments can be practiced in any order that is practicable.

At step 1110, a gaming device receives a payment from a player for a predetermined number of handle pulls (or other indications of an outcome). Typically, the payment is inserted into the gaming device as tokens, coins and/or bills. At step 1120, the payment is transmitted to an insurer, typically via an insurer device.

At step 1130, the gaming device generates a number of outcomes sufficient to satisfy the predetermined number of handle pulls required by the terms of the contract. At step 1140, the credit balance is adjusted according to these outcomes, typically by increasing the balance for winning outcomes and reducing the balance for losing outcomes. As is well known, the adjusting of a balance typically occurs after each outcome, but may occur at other times.

In the depicted embodiment, if the accumulated credits of the credit balance exceed a predetermined threshold (step 1150) then the player is paid the amount by which the accumulated credits exceed that threshold (step 1180). Otherwise, the amount by which the accumulated credits fall short of that threshold are collected from the insurer (step 1170).

In some embodiments, the contract does not involve an insurer at all. The contract may merely allow outcomes to be generated for the player while the player is not physically present at the gaming device. In such an embodiment, the contract define instructions from the player as to how the slot machine should play on the player's behalf. For example, the instructions will tell the machine how fast to play (e.g., outcomes per minute), when to quit (e.g., when the balance is less than twenty credits), and then where to send winnings (e.g., to a hotel bill, to a bank account).

Further variations in the terms of the contract are contemplated. For example, a contract may specify the size of the wager for each pull. The wager size may be the same as that typically used by the gaming device. For example, if a player signs up for a contract at a quarter slot machine, the wager for each pull of the contract might be a quarter. If the slot machine has multiple slots, the wager for each pull might be a quarter, 50 cents, 75 cents etc. The contract may allow or may force the player to vary the wager from pull to pull.

One aspect of a contract may allow all play to occur in "credit mode." That is, the player need not physically insert money into the gaming device prior to each pull, and money needn't come out of the gaming device after a player win. Rather, a player's credit balance may be stored in a player database (FIG. 6) either in the gaming device or in the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel, of 40 cents, or even of 12½ cents.

The following are several examples which illustrate additional embodiments. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment of the present invention, a contract may describe some threshold of gross winnings (the total of a player's winning amounts during the duration of a contract, not subtracting amounts wagered by the player), net winnings (gross winnings minus amounts wagered by the player), or accumulated player credits above which the player keeps any excess. Gross winnings describe the accumulated player wins from each pull of the contract. Thus, a player who makes 600 pulls on a $1 slot machine as part of a contract and wins $3 on each of 100 pulls has gross winnings of $300 ($3/pull×100 pulls). Net winnings are the gross winnings minus the accumulated costs of wagering. In the above example, the accumulated costs of wagering are $600 ($1/pull×600 pulls). Thus, in the above example, the player's net winnings would be negative $300 ($300-$600). Accumulated player credits may mirror a running tally of a player's net winnings. For example, a player may begin with zero credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero, and the player has 44 credits, each credit representing 25 cents, then the player receives a payout of $11 (44 credits×25 cents/credit). If the player had negative 12 credits, indicating a net loss of 12 credits, then the player receives nothing. The player does not owe $3 because the contract does not make the player responsible for any losses.

The threshold might be at, e.g., ten credits, in which case a player with accumulated credits of thirty would receive a payout equivalent to twenty credits at the end of a contract, and a player with six credits would receive nothing. Further, with a threshold of negative ten credits, a player with accumulated credits of negative six would receive the equivalent of four credits, while a player with negative one hundred credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of 100 credits. The same player might receive any winnings beyond a threshold of 10 accumulated credits. Thus, if, at the end of the contract, the player has accumulated –negative 125 credits, then the player must pay 25 credits. If the player has accumulated 33 credits, then the player receives a 23 credit payout. If the player has accumulated negative 49 credits, then the player neither owes nor receives anything.

In some embodiments, a threshold delineates a change in the percentage of a player's winnings or losses between credit tallies above and below the threshold. For example, a player might keep any credits won beyond a threshold of 50. Below 50 credits, the player only keeps 80% of his winnings. Therefore, if a player has 70 credits remaining at the end of a contract, he keeps all 20 credits above 50, and he keeps an additional 40 credits, representing 80% of the first 50 credits. Therefore, the player keeps 60 credits in total.

A player may also be responsible for a percentage of losses above or below a certain threshold. For example, a player may be responsible for 50% of losses over 10 credits. Thus, a player who finishes a contract with minus 20 credits owes nothing for the first 10 credits of loss, but owes 5 credits for the next 10 credits of loss. The player therefore owes 5 credits.

In the most general sense, a contract specifies a functional relationship between what a player's accumulated credits are at the end of the contracted number of pulls, and what the player either owes or is due. The function may be piece-wise linear, or may be rather non-linear and convoluted.

Where there is potential for a player to owe money at the end of a contract, the player may be required to deposit money into the gaming device in advance so as to discourage the player from walking away when he owes money. The advance payment may later be returned if the player turns out to owe nothing at the end of the contract.

In many embodiments, a contract is "transparent" to the casino. In other words, if the player makes a certain number of handle pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not "transparent" to the casino. That is, the amount of money a casino receives after a certain number of the player's handle pulls may depend on whether or not the player was in a contract. In one example, a casino agrees that if a player's accumulated credits at the end of a contract are less than negative 200, then the casino will only collect 200 credits for the contract's handle pulls. This example may benefit the insurer, since the insurer doesn't have to worry about covering player losses in excess of 200 credits. In another example, the casino configures a gaming device to give different odds to a player in contract play versus a player not in contract play.

In one version of a contract, a player pays a fixed amount upfront, say $30. The gaming device then puts a credit balance on the gaming device. The credit balance may or may not be equal to the amount of money the player has paid upfront. In general, the player will not be allowed to cash out the credit balance until the end of the contract. Even then, the player may not receive the number of credits displayed on the credit balance. For example, the player may only receive the difference between the credit balance and a predetermined threshold.

During the course of the contract, the player may be allowed a fixed number of pulls, or a fixed amount of time in which to make as many pulls as he can. A player may receive some combination of a fixed amount of time and a fixed number of handle pulls, e.g., the player may make as many pulls as he can for the first hour, and then 100 pulls thereafter.

In this embodiment, each handle pull costs a credit, or costs multiple credits if the player plays multiple lines, or bets multiple credits per line. The credit or credits for the handle pull are deducted from the credit balance. If the handle pull results in the win of credits, such credits are added to the credit balance. Credits that are won typically do not go into the coin tray.

One aspect of this contract is that a player's credit balance may go negative. For example if a player has zero credits, and places a wager for a handle pull, then the credit balance goes to negative 1. In one embodiment, a negative credit balance may simply indicate that, during the contract, more credits have been deducted from the credit balance in order to initiate handle pulls than have been added to the credit balance as a result of winning handle pulls (or monetary input from a player, in one embodiment). This assumes, of course that the credit balance did not start out negative. The possibility of a negative credit balance provides an advantage for players in contract play. For one, a player can continue playing after his credit balance has gone to zero, without the need to insert new money. This is not the case in the typical course of play. Additionally, in many embodiments, the player will not be responsible for reimbursing the casino for a negative credit balance. Thus, in one sense, a player with a negative credit balance is playing for free. In one embodiment, while a credit balance is negative a wager per game play may be reduced by 50% from an amount that would otherwise be required.

Since it is unconventional for a slot machine to show a negative credit balance, several methods of doing so are described below:

A negative credit balance may be indicated using a negative sign. For example a credit balance of negative 10 credits may be written "−10".

A negative credit balance may be indicated by enclosing the magnitude of the balance in brackets or parentheses. For example, "(10)".

A negative credit balance may be indicated by showing the magnitude of the balance, together with a red light, a border, text, or some other indicator of negativity. For example when a player has negative 10 credits, the gaming device may display "10" and additionally have a red light on. Alternatively, the gaming device may display "10" and backlight text which says, "Negative".

A negative credit balance may be indicated in a different color than a positive credit balance. For example, a negative balance may be shown in red, and a positive balance in green.

A negative credit balance may be shown pictorially. For instance, a balance of negative 10 is shown as a hole 10 units deep, whereas a balance of positive 10 is shown as a pile 10 units high. A negative balance may also be illustrated as a number below a horizontal line, and a positive balance may be shown as a number above the horizontal line.

A negative credit balance may be shown as blinking, faded, italicized, in smaller font, etc.

A negative credit balance may be shown in a separate area or on a separate display from where a positive credit balance is shown. For example, a first LCD display is used for displaying the amount of any positive credit balance, and a second LCD display is used for showing the magnitude of any negative credit balance. When there is a negative credit balance, the display of the positive credit balance may read “0” or may simply be blank. Similarly, when there is a positive credit balance, the display of the negative credit balance may read “0” or may simply be blank. FIG. 9 illustrates a gaming device containing two displays for credit balances, one for a positive credit balance and one for a negative credit balance. In the figure, the player currently has negative 33 credits. The positive credit balance display reads, “0”, and the negative credit balance display reads, “33”.

The presence of negative credit balances may further necessitate arithmetic involving negative numbers. Such arithmetic may be confusing, especially when a player is not paying too much attention to his balances. At first glance, upon winning a 10-coin payout, a player with a negative credit balance might be surprised to see the magnitude of his balance going down, e.g., from negative 9, to negative 8, to negative 7, etc., even though he has won. A player may similarly be surprised to see his balance go from negative 6 to positive 4 upon the win of 10 coins. It might appear at first glance as if the player has lost 2 coins.

The presence of two separate or distinct balances may illustrate the player’s standing in a convenient format. When a player with a balance of negative 6 wins 10 credits, his negative balance display is zeroed out, and then his positive balance display goes to positive 4. A player should then be less likely to experience confusion when a single balance appears not to change much, or appears to go in the wrong direction.

The pictorial display of negative balances may also help to alleviate confusion. When a player with a balance of −9 (a hole 9 units deep) wins a 20 coin payout, 20 bricks can be added to the pictorial display. The first 9 bricks fill in the hole, and the next 11 bricks stack on top of the filled hole. Thus, it appears that 20 units have been given to the player.

In one embodiment, when a payout will bring a player from being in the negative to being in the positive, the payout is made to the player with a distinct pause when the player’s credit balance gets to zero. For example, a player with a balance of −6, who wins 10 credits, may first receive 6 credits. Then there may be a pause. Then the player may receive his last 4 credits. The pause gives the player time to adjust from seeing the magnitude of his negative balances decrease, to seeing his positive balance increase.

The gaming device may also accompany the payment of credits with a message. The message may say for example, “Paying back borrowed credits.” Then once the negative balance has been zeroed out, a new message may appear, “Adding new credits,” or something to that effect. Further, such a change from a negative to a positive balance (or vice versa) may be accompanied by a change of status associated with some other output device or indicator (e.g., when a balance goes from negative to positive, a background color of a display screen changes from red to green; when going from negative to positive, a sound effect is output by audio speakers; etc.).

One way to handle confusion with negative credit balances is to try to avoid them entirely. In one variation of a contract, a player pays $50 to begin with. He then begins with a credit balance of 50. The player could just as easily begin with a different credit balance, but it may seem more fair to a player that he begin with a credit balance equal to the amount of money he has paid. Now, the contract specifies that after 400 pulls, the player will keep any positive credit balance remaining. In addition, the contract guarantees that the player will receive at least $30 back. So, if, at the end of the contract period, the player’s credit balance is only $5, the player still gets back $30. The question is, why not just charge the player $20, let him start with a credit balance of 20, and allow him to keep the amount of any positive credit balance? The two contracts would be mathematically equivalent, as the player would not lose more than $20 in either case. However, the first contract has an advantage in that, by starting the player at 50 credits, the player is less likely to lose enough credits to go negative. By keeping a positive credit balance, the player is less likely to be confused with negative numbers and with negative arithmetic. The first contract also has another psychological advantage. Namely, the player will always get something back (i.e. his $30), whereas in the second contract, the player may get nothing back.

The first contract described above can be further made more desirable to a player by guaranteeing the player get not only $30 of his $50 back, but also guaranteeing the player a coupon, voucher, or gift certificate for a product or service, the coupon having $20 face value. The player then perceives that he is guaranteed to recover the full amount of his payment, in the form of cash and other benefits, and has the further opportunity to win much more. The casino can afford to give away a $20 coupon, voucher, or gift certificate, because the casino may have excess inventory that it is willing to sell at a discount, may have high priced products for which a $20 discount would have little impact, may have products or services which cost it very little anyway, etc. Casino products or services may include nights at the casino’s hotel, meals at the casino’s restaurant, products from the casino’s gift shop, tickets to the casino’s show, etc. In addition, the coupon, voucher, or gift certificate may be provided by a third-party merchant. The merchant may be more than happy to give the player free or discounted products or services just to acquire the player as a customer. In fact, the merchant might even pay the casino to give away its certificates. The player, upon receiving such a certificate as a perceived recouping of his payment for the contract, will be very motivated to actually use it, thereby increasing the likelihood that the third party merchant would acquire a new customer.

With the use of coupons, vouchers, etc., a casino might also be able to justify starting a player at a credit balance below what the player has paid for the contract. For example, the player may pay $50 to enter into a contract where he starts at a $30 credit balance. The player may perceive this to be unfair, even though the fact that he cannot lose more than $50 within a large number of pulls confers upon him a significant advantage. Therefore, a contract may require a player to pay $50, but may provide a $20 gift certificate to the player, and start the player off at a $30 credit balance.

Of course, the starting amount of a player’s credit balance, together with the face value of a gift certificate provided to the player, need not necessarily add up to the amount a player pays for the contract. For example, a player might pay $50, start with a credit balance of $40, and receive a $30 gift certificate. Similarly, a player need not be guaranteed to get back a value equal to what he paid initially. For example, a player may pay $50 to enter into a contract, and may be guaranteed a minimum of $20 back and a $20 gift certificate.

Returning to the subject of negative credit balances, another way to eliminate them is to change the rules of play once the player's credit balance gets to zero. In one embodiment, when the player's credit balance hits zero, normal play is halted and the player can only spin for the jackpot. Thus, a win of 10 coins does not increase the player's credit balance, and the cost of a handle pull does not decrease his balance. Rather, the only outcome that benefits the player is hitting the jackpot. If the player does hit the jackpot within the time or the pulls remaining in his contract, he may keep the jackpot. Otherwise, he will only receive a guaranteed minimum amount specified in his contract, e.g. $30. Of course, a player whose balance reaches zero may be allowed more outcomes than just the jackpot. For example, the player may be allowed to win any of the top three outcomes.

Still another way to handle negative credit balances, though the embodiment is not limited to negative credit balances, is to hide or obscure the amount of a player's credit balance. For example, rather than displaying to a player a numerical representation of his credit balance, the gaming device may instead display a shade of color. The shades of color may be approximately correlated to actual credit balances. For example, colors like violet and blue may be associated with high credit balances, while colors at the other end of the visible spectrum, such as red and orange, may represent relatively low credit balances. So, for example, if a player saw a color such as yellow, orange, or red displayed on his gaming device, he might realize that he was in the negative. However, he need never be confused with the presence of a negative sign, nor with changes from negative to positive numbers. It will be appreciated that there are many distinguishable gradations of color, brightness, hue, etc., each of which may be used to represent a credit balance. In addition, varying credit balances may be represented by progressively darker textures, by the position of a needle on a meter, by the angle of a dial, by the brightness of a light, by the pitch of a tone, by the loudness of a tone, etc. Another representation of a credit balance would be a pile of coins, diamonds or other items. Each coin in the pile might represent a credit, or a fraction of a credit. With a large number of coins piled together, the player would not be able to tell exactly how many coins were in the pile. Another representation of a credit balance involves a bag, such as a bag of money that swells or shrinks depending on how much money is in the bag, equivalent to how many credits the player has left.

The concealment or obfuscation of the actual value of a player's credit balance may serve another purpose. Suppose that a player is engaged in a contract in which he will receive any positive credit balance remaining at the end of the contract. If the player's credit balance now reads negative 300, the player may become discouraged, feeling he has little chance to bring his credit balance back into the positive range. However, if the player's credit balance were represented by a shade of color, the player might not be so sure of how negative he was, and might become less discouraged. Another benefit of the concealment of a credit balance is that a player may, in good faith, represent to friends or family that he is "about even", since he would not necessarily be able to tell from the shade of his credit balance meter that he was down 10 coins. Therefore, the concealment of a credit balance can alleviate embarrassment. The concealment of a credit balance may also allow a player to postpone any anguish associated with losses. Until the player sees the actual amount of money that he has lost, he may maintain the illusion that his losses are not so bad. In this way he may better enjoy his experience. Note once again that the concealment of a credit balance need not occur only in the context of contract play. A player who plays in standard fashion may insert a $100 bill and begin with a green credit balance. The credit balance may change colors, moving up or down the visible spectrum, depending on how the player fares. Only if the player runs out or money may the gaming device actually reveal the player's credit balance, since, at that point, the player would no longer be able to continue spinning without inserting new money, and the illusion would be up. Also note that the player may always be given the option to see the exact amount of his credit balance. For example, at any time the player may press a "show balance" button, at which time his gaming device may switch the balance meter from displaying a color to displaying an actual number. Therefore, it may be completely up to a player as to whether he wants to maintain for himself any illusions about how much money he has won or lost.

In the context of the present embodiment, in which a player has a credit balance that can increase or decrease, and in which the player will keep the amount of any positive credit balance at the end of the contract period, some anxious situations may arise for the player. For example, the player might reach a point where his credit balance stands at 250, but where he has 300 pulls remaining in the contract. The player may be quite happy with his current credit balance, but worried that his credit balance will decrease significantly within the next 300 pulls. Therefore, in some embodiments, the player may take some measure to protect his current credit balance. For example, the player may signal to the gaming device that he does not want to receive less than his current credit balance at the end of his contract. As a result of the player's signal, the player may receive a minimum of his current credit balance at the end of a gaming contract, even if his balance ends up below its current level. If the player's credit balance rises above the level at which he sought protection, the player may receive the higher credit balance. Protecting a credit balance of a certain level will be termed "banking" at that level. For example, by banking a credit balance at a level of 100, a player ensures that he will receive the benefit of at least a 100-credit balance, whatever that benefit happens to be in the context of the contract.

A number of restrictions may apply as to when a player may bank, and as to the level at which a player may bank. Exemplary restrictions are listed below:

A player may only bank at a certain percentage of his current credit balance. The percentage might be a percentage greater than 100%, 100%, or a percentage below 100% (e.g, 50%, 33%, etc.). For example, if a player may only bank at 50% of his credit balance, then a player with a balance of 200 may bank at the 100 level.

The player may only bank a limited number of times during the course of a contract. For example, a player might be allowed to bank only once during a contract. The player would then be faced with a strategic decision as to when to bank. A player might bank at a level of 100 credits, but in doing so may lose the opportunity to bank at a later time, when he might bank at a higher level, and thereby protect a larger credit balance. On the other hand, if the player does not bank at a certain level, his credit balance may decline and he would not have the benefit of protection at the higher level.

The player may only bank within a given time period or within a given number of handle pulls of the start of a contract period. Similarly, the player might be allowed to bank only within a given time period or within a given number of handle pulls of the end of a contract period.

The player may only bank at a specific time, or set of times. For example, the player may only bank either 15 minutes, 30 minutes, or 45 minutes into a contract period, but at no other time. Similarly, a player might be allowed to bank only on specific handle pulls. For example, the player may only bank after the $100^{th}$, $200^{th}$, or $300^{th}$ spins, and at no other time.

In one embodiment, certain payouts may be categorized as "immediately bankable" such that a player who wins such a payout may immediately bank the amount of the payout.

The player may bank at only up to a maximum level. For example, no matter what his credit balance, a player may never bank at a level above 100.

In some embodiments, the ability to bank may be the only significant feature of a contract. For example, a contract may specify that a player can play for 100 pulls, using his own money to wager on each handle pull. At any point, the player may choose to bank his current winnings. Once the player has banked, he is effectively insured against any losses that go below the level at which he banked.

One version of a contract allows a player to initiate handle pulls without placing a wager and without having any amount deducted from his credit balance. In this way, over the course of a contract, a player's net winnings can only go up. For example, in a contract, a player may begin with a zero credit balance. The player may then be allowed 100 spins without placing any wagers. Any winning outcomes cause his credit balance to increase, while any non-winning outcomes do not affect his credit balance.

The expected size of a player's credit balance at the end of the contract described above may be readily calculated as the gaming device denomination multiplied by the payback percentage of the gaming device multiplied by the number of spins the player is allowed. Thus, if a $1 denomination gaming device pays back 95%, or an average of 95 cents for every dollar wagered, then the player's average balance after 100 spins would be $1×95%×100=$95. Therefore, the price that a player might have to pay to enter into such a contract would likely exceed $95. For example the player might pay the casino $98 to enter into a contract for 100 spins without having to pay for spins individually. As a result of the contract, the player would receive an average of $95, and therefore the casino would profit by an average of $3.

Examination of the formula for a player's expected winnings at the end of a contract where he does not wager prior to each spin, reveals that the player's expected winnings may be reduced if the payback percentage of the gaming device is also reduced. For example, if a $1 denomination gaming device paid back only 30%, then a player would make an average of $30 after 100 spins. Therefore, in one embodiment, a player may enter into a contract in which he does not pay for any wager, but in which the payback percentage of the gaming device is reduced from its typical value. The advantage for the player is that the price of the contract may be much smaller. Now, for example, rather than paying $98 to enter into a contract for 100 spins, the player need only pay $35 for a contract for 100 spins. The player gets the same amount of entertainment for a fraction of the upfront outlay. A further advantage of a contract at a gaming device with a reduced payback percentage, is that the payback percentage of a gaming device may be reduced by reducing the winnings paid for outcomes that the player regards as unimportant. For example, a player may not regard an outcome of "cherry-any-any", with a payout of $2, as very important, even though the outcome "cherry-any-any" makes up a significant portion of the payback percentage of the gaming device. Instead, the player may only be concerned with relatively high paying outcomes, such as jackpot outcomes. However, high-paying outcomes often make up a relatively small portion of a gaming device's payback percentage. Therefore, in one embodiment, the player may enter into a contract in which he does not pay for each spin during the contract, in which the payback percentage of the gaming device is reduced by reducing the payouts associated with low-paying outcomes, and in which the payouts associated with high paying outcomes are maintained. In one particular embodiment, a player may enter into a contract in which he may win only the jackpot on any spin.

Below is an example of the reduction of the payback percentage of a gaming device. In this example, the slot machine begins with the following payout structure, taken from "Winning At Slot Machines", by Jim Regan (which is incorporated by reference herein for all purposes):

TABLE 1

| OUTCOME | HITS |
|---|---|
| 0 | 8570 |
| 2 | 680 |
| 2 | 680 |
| 5 | 200 |
| 5 | 200 |
| 5 | 68 |
| 20 | 20 |
| 10 | 42 |
| 10 | 6 |
| 20 | 42 |
| 14 | 20 |
| 14 | 5 |
| 20 | 50 |
| 18 | 4 |
| 18 | 20 |
| 20 | 20 |
| 50 | 20 |
| 100 | 1 |

In the table 1, "Outcome" represents the number of tokens paid, and "Hits" represents the number of times the corresponding outcome would be expected to occur in 10,648 spins, or a complete cycle of the slot machine. The probability of each outcome occurring on a single spin can be found be dividing the "Hits" entry by 10,648. For example, the probability of the outcome that pays 100 tokens appearing on a single spin is $1/10{,}648 \approx 9.39*10^{-5}$.

If a player inserts a single token into the slot machine, his expected winning are given by:

$$\begin{aligned} EV &= 0*8570/10{,}648 + 2*680/10{,}648 + 2*680/10{,}648 + \\ &\quad 5*200/10{,}648 + \ldots + 100*1/10{,}648 \\ &\approx 0.945 \end{aligned}$$

Therefore, for every token the player inserts, he can expect to receive 0.945 tokens back, resulting in a payback percentage of 94.5%.

Suppose the payback percentage is reduced. The payouts of outcomes paying less than 20 are reduced to zero, while the payouts of outcomes paying 20 or more are kept the same. The payout structure now looks like the following:

TABLE 2

| OUTCOME | HITS |
|---|---|
| 0 | 8570 |
| 0 | 680 |
| 0 | 680 |
| 0 | 200 |
| 0 | 200 |
| 0 | 68 |
| 20 | 20 |
| 0 | 42 |
| 0 | 6 |
| 20 | 42 |
| 0 | 20 |
| 0 | 5 |
| 20 | 50 |
| 0 | 4 |
| 0 | 20 |
| 20 | 20 |
| 50 | 20 |
| 100 | 1 |

Now, if a player inserts a single token into the slot machine, his expected winnings are given by:

$$\begin{aligned} EV &= 0*8570/10{,}648 + 0*680/10{,}648 + 0*680/10{,}648 + \\ &\quad 0*200/10{,}648 + \ldots + 100*1/10{,}648 \\ &\approx 0.351 \end{aligned}$$

Therefore, for every token the player inserts, he can expect to receive 0.351 tokens back, resulting in a payback percentage of 35.1%. Of course, in the case of the contract under discussion, a player will not insert a token prior to every pull. However, he will still receive an average of 35.1 cents for every pull, or equivalently, an average of $35.10 after 100 pulls. Note how the payback percentage of the gaming device has been reduced from 94.5% to 35.1%, even though the probabilities of each outcome occurring have not changed, and the payouts for the six highest outcomes have not changed. If payouts for all the outcomes, except for the outcome paying 100, were reduced to zero, then the expected winnings on a single handle pull would be given by:

$$\begin{aligned} EV &= 100*1/10{,}648 \\ &\approx 0.00939 \end{aligned}$$

Thus, the payback percentage would be less than 1%. Therefore, a player could purchase a contract for 100 spins for only $1, and the casino would still make a profit, on average.

In one embodiment, a player might have a choice of contracts where the gaming device has a different payback percentage in each. Each contract may allow the player a different number of spins, depending on what the payback percentage is. For example, for $100, a player might get 100 spins at 95% payback, 200 spins at 48% payback, or 300 spins at 32% payback.

One possible drawback of gaming devices with reduced payback percentages is that the player will likely not win very often. For example, with the payout structure described above, in which only the six highest paying outcomes continue to pay, the number of hits per cycle of winning outcomes would be: 20+42+50+20+20+1=153. With a cycle of 10648, the player would win an average of once every 10648/153 spins, or about once every 70 spins. In fact, in almost 24%

($=((10648-153)/10648)^{100}$) of contracts of 100 spins, the player would not win on any spin.

A player's frequency of obtaining winning outcomes may be increased, while maintaining a low payback percentage of a gaming device, if outcomes are introduced that take away from a player's credit balance. Such outcomes will be termed "negative outcomes", which are distinct from non-winning outcomes. Typically, at a gaming device, the only way for a player to lose money or to lose credits is to make a wager on a handle pull. If the handle pull is non-winning, then the player has lost the amount of his wager. However, no additional amounts are deducted from the player's credit balance. If the player has not paid for the wager in the first place, then a player would typically have no way of losing money on a handle pull, no matter what the outcome. Thus, negative outcomes are distinct from non-winning outcomes in that negative outcomes actually do cause a player to lose money from a credit balance. For example, a player might have a credit balance of 60, achieve a negative outcome of −15, and then have a credit balance of 45.

In one embodiment, negative outcomes cause a player to lose a fixed percentage of his credit balance and/or balance of "spins" (plays) remaining (e.g. as indicated by display area 1040). For example, a negative outcome may take away 50% of a player's credit or spin balance. A player with a balance of 40, upon attaining such a negative outcome, would end up with a balance of 20. Negative outcomes may take away other percentages, such as 10%, 33.3%, 66.7%, 75%, or 100% of a credit or spin balance. If a negative outcome would take away a fractional credit, then the number of credits to be taken may be rounded either in favor of the casino or in favor of the player. For example, if a player has a balance of 11, and he receives a negative outcome that takes away 50%, then the player may end up with either 5 or 6 credits, depending on the rules of rounding that are applied. One benefit of negative outcomes that take away a percentage of a player's credit balance, is that, so long as a player is not using up a credit to initiate each handle pull, the player's credit balance cannot go negative. For example, a player's credit balance may be cut in half 10 times in a row, but dividing a positive number by 2 will never make the number go negative. In some embodiments, however, a player's credit balance is allowed to go to zero. For example, a player with a single credit may go to zero if he gets a negative outcome that takes away 50% of a balance, even though fractional credits would normally be rounded in favor of the player.

The magnitude of a negative outcome may have a more complicated functional dependence upon a player's credit balance. For example, if the player's credit balance is 100 or less, then a negative outcome takes away 50% of the balance. However, if the player's credit balance is more than 100, the negative outcome takes away only 33% of the player's credit balance.

Negative outcomes may be depicted with the addition of new symbols to existing gaming devices. For example, "thief" symbols could be added to the reels of a gaming device. Then, a negative outcome would be indicated by the appearance of at least two thief symbols across a pay line. Alternatively, existing symbols of a gaming device could be used to indicate negative outcomes. For example an ordinarily meaningless symbol combination, such as lemon-bell-bar, might represent a negative outcome. In some cases, one or more blanks may represent a negative outcome.

The following example illustrates how the use of negative outcomes can allow a player to win more frequently, without changing the payouts of outcomes, and without altering the payback percentage of the gaming device. The payout structure of a typical slot machine, taken from "Winning At Slot Machines", is once again reproduced below:

TABLE 3

| OUTCOME | HITS |
|---|---|
| 0 | 8570 |
| 2 | 680 |
| 2 | 680 |
| 5 | 200 |
| 5 | 200 |
| 5 | 60 |
| 20 | 20 |
| 10 | 42 |
| 10 | 6 |
| 20 | 42 |
| 14 | 20 |
| 14 | 5 |
| 20 | 50 |
| 18 | 4 |
| 18 | 20 |
| 20 | 20 |
| 50 | 20 |
| 100 | 1 |

The win frequency of a slot machine may be defined as the percentage of handle pulls in which the player can expect to achieve a winning outcome. The win frequency may be derived by summing the number of hits for a winning outcome that are contained within a cycle, by the total length of the cycle. In the case of the above payout structure, the win frequency is:

$$\begin{aligned}&(\#\text{ Hits for first outcome paying } 2 + \\ &\#\text{ Hits for second outcome paying } 2 + \ldots + \\ &\#\text{ Hits for outcome paying } 100)/ \\ &(\text{Length of cycle})\end{aligned} = (680 + 680 + \ldots + 1)/10648$$

$$\approx 19.5\%$$

Now, the above payout structure will be modified to include the addition of a negative outcome. The new payout structure is as follows:

TABLE 4

| OUTCOME | HITS |
|---|---|
| 0 | 3386 |
| −10 | 864 |
| 2 | 5000 |
| 2 | 680 |
| 5 | 200 |
| 5 | 200 |
| 5 | 68 |
| 20 | 20 |
| 10 | 42 |
| 10 | 6 |
| 20 | 42 |
| 14 | 20 |
| 14 | 5 |
| 20 | 50 |
| 18 | 4 |
| 18 | 20 |
| 20 | 20 |
| 50 | 20 |
| 100 | 1 |

The new payout structure includes a negative outcome that causes a player to lose 10 coins form his credit balance. Note also that the new payout structure allows the first outcome paying 2 to occur much more often than it had. The outcome now occurs on 5000 hits of the cycle, whereas previously it had occurred on just 680 hits of the cycle. The win frequency can be shown to have increase to approximately 60.1%. Meanwhile, the payback percentage of the gaming device has not changed. A payout structure such as the one above may prove to be more exciting to a player, since he now wins more often than he had with the original payout structure.

Note that the new outcome could also have been made, for example, a "lose 50% of your balance" outcome. Then, the above payout structure would be accurate only when the player had a balance of 20 coins. Otherwise, the gaming device would have a different payback percentage than 94.5%.

A potential drawback of contracts in which a player only wins money, and does not pay the cost of handle pulls, is that the player may accumulate money so rapidly that the contract must be priced very highly in order to assure a casino profit. Some remedies to this drawback have been described above. Another possibility is that a player must first transition into a state (i.e. a prequalification) in which he can win, before he is actually allowed to win. An analogy can be taken from the game of volleyball. In volleyball, the defending team may win the rally, but not score a point. As a result of winning the rally, the defending team gets the ball. Only when a team starts out with the ball can it actually score points. Similarly, on a gaming device, a player might first need to obtain a winning outcome, or some other outcome which transitions the player into a new state, where he can actually win credits. Then, if the player does not achieve a winning outcome, the player may exit the state in which he can win credits. In this way, the player's accumulation of money is greatly reduced.

In some embodiments, a period of time, or a number of pulls during which the player can only win, and in which pulls cost the player nothing, is provided to the player as a prize or reward. For example, the player may win a bonus outcome, which allows him to spin for two minutes, without inserting any new money, and keep any winnings from the two minutes. The two minutes of free spins may or may not be at a reduced payback percentage. In fact, they may be at an even higher payback percentage. Such a bonus may be provided to a player at the initiation of a gaming session (e.g. before a player begins to use prepaid spin credits), at the middle of a gaming session, and/or at the end of a gaming session.

In some embodiments, a player does not fully pay upfront for the benefits conferred by a contract. Rather the player may pay in the form of "taxes". In some embodiments, taxes may be defined by rules that specify how to adjust a balance, such as how to deduct credits from a player's winning payouts, or from a player's credit balance under various circumstances. The following is a list of exemplary taxes:

1. The gaming device withholds from a player any payout that would bring a player's net winnings for a contract period above a predetermined threshold. For example, suppose a player has begun a contract period at a $1 gaming device by inserting a $50 bill and receiving therefore 50 credits. The player has been playing for 20 minutes, has been doing reasonably well, and now has a credit balance of 145. The player's net winnings for the contract period thus far are 145−50=95 credits, assuming the player has neither inserted new credits, nor cashed out any credits since beginning the contract period. Now, suppose that the gaming device has a rule in place whereby it withholds from a player any winnings that would bring a player's net winnings for a contract period over 100 credits. So, if the player with 95 credits in net winnings for the contract period now gets an outcome paying 15 credits, then the player may be paid only 5 of the credits, bringing the player's net winning to 100 credits. The other 10 credits are withheld by the gaming device, since payment of the 10 credits would bring the player's net winnings over 100 credits. Now, suppose that a player makes another $1 wager and loses on the next outcome. His credit balance decrements by one. His credit balance does not remain at 150, even though 5 credits had previously been withheld.

2. The gaming device limits the amount of a player's net winnings for a contract period to a predetermined number. With this tax, a player's balance may reflect net winnings exceeding the predetermined number.

However, at the end of the contract period the player will only receive net winnings up to the predetermined number. For example, if the player ends a contract period with a balance reflecting net winnings of $200, and the gaming device has limited net winnings to $100 for a contract period, then the player may only receive $100 of his $200 in net winnings when he cashes out. If the player is not playing in credit mode, then the gaming device may simply not pay the player any winnings that would bring his net winnings for a contract period over the predetermined number. However, the player may receive a free spin for every credit that he was not paid.

3. The gaming device withholds a predetermined number of credits from any payout exceeding a certain threshold. For example, the gaming device withholds one credit on any payout of more than 4 credits.
4. The gaming device pays the player only the highest payout for any consecutive sequence of pulls in which the player has won some credits on each pull in the sequence. For example, suppose the player has made eight consecutive pulls with the following resulting payouts: 0, 10, 4, 0, 2, 5, 3, 0. The player would actually only be paid 10 coins in total for the second and third pulls, and 5 coins for the fifth, sixth, and seventh pulls. This is because the second and third pulls were consecutive pulls of winning outcomes. Therefore the player only gets the highest payout of the consecutive pulls, which is 10. Similarly, the highest payout from amongst the fifth, sixth, and seventh pulls is 5. Now in practice, when the player receives a winning outcome, the gaming device does not know whether the next outcome will also be a winning outcome. So the gaming device cannot know what to pay the player for the current sequence of winning pulls. Therefore, if the current payout is the first winning payout in a sequence, the gaming device may pay the player the full amount of the payout. If, however, the current payout is not the first winning outcome in a sequence, then there are two possibilities. In one possibility, the current payout is the highest payout thus far in the sequence, in which case the gaming device may pay the player the difference between the current payout and the next highest payout already to occur in the sequence. In the second possibility, the current payout is not the highest payout in the sequence, in which case the player may be paid nothing, or may have his wager returned, for a push. Going back to the first possibility, if the current payout is the highest payout in any sequence of winning outcomes, then the player may additionally be paid a single coin for every prior winning outcome present in the sequence, so as to convert such outcomes to pushes instead of losses for the player. In other variations of this tax, the player is paid only the highest n payouts in any sequence of winning outcomes. In still another variation, the player is paid only for the lowest winning outcome in any consecutive sequence of winning outcomes, or only for the median outcome, or only for the modal outcome.
5. The gaming device limits the player to receiving only certain types of outcomes. For example, in one embodiment, a player may be restricted to receiving outcomes typically generated and/or displayed in accordance with a bonus round, such as that which may occur in a "Wheel of Fortune" themed game.
6. The player is paid only for the first winning outcome in any sequence of consecutive winning outcomes. Subsequent winning outcomes in the sequence may be treated as pushes, or may be treated as losses. In other variations, the player is paid only for the second winning outcome in any consecutive sequence of winning outcomes, or only for the nth winning outcome in any consecutive sequence of n or more winning outcomes (here n is a natural number). In the latter variation, if a consecutive sequence of winning outcomes is less than n, then a player may be paid only for the last winning outcome, may be paid for every winning outcome, or may not be paid for any of the winning outcomes. In another variation, the player is paid only for the last winning outcome in any consecutive sequence of winning outcome. In still other variations the player is paid only for the first and second winning outcomes in any sequence of consecutive winning outcomes, or only for the mth and nth, outcomes, or only for any other combination of winning outcomes. In still other variations, the player is paid only for the first, last, or nth outcome in any sequence of outcomes in which no more than m outcomes are non-winning outcomes. There are many other possible variations to this tax.
7. The player is paid only for the best line in multi-line play. For instance, if the player has enabled three paylines on the gaming device, and the outcomes for lines 1, 2, and 3 pay 5, 9, and 0 coins, respectively, then the player only receives 9 coins, not 14 coins. In variations of this tax, the player is paid for the highest two lines, the highest 10% of lines, the median line, or the lowest line.
8. The gaming device withholds from the player a fixed percentage of any payout. For example, the gaming device withholds 5% of any payout. In many instances, the withholding of a percentage of a payout will result in the withholding of a fractional amount of a credit. For example, withholding five percent of a 10-coin payout equates to withholding one half of a credit. In some embodiments, the gaming device rounds any fractions of a credit withheld either up or down, depending on its rules of operation. Thus, even though the gaming device withholds 5% of payouts, the gaming device may withhold a full credit on a 10-coin payout after rounding up the half credit to a full credit. In another embodiment, the gaming device does not withhold fractional credit amounts, but rather keeps track of the fractional amounts of credits that would have been withheld from a player had they been whole credit amounts. Then, whenever the stored fractional amounts of credits add up to a full credit, the gaming device may withhold such a credit from the player. For example, on two consecutive pulls, a player wins 6 and then 14 credits. The gaming device pays the player six credits for his first payout, but also tracks the 5%*6 credits=0.3 credits that it would have withheld from the player. Then, when the player achieves the payout of 14 credits, the gaming device figures the withholding from the 14-credit payout as 5%*14=0.7 credits, adds the 0.7 credits to the 0.3 credits previously stored, and deducts the resultant full credit from the player's payout of 14, giving the player only 13 credits instead. Whenever the gaming device is tracking fractional amounts of credits to be withheld in the future, the gaming device may display such fractional amounts to the player.

9. The player receives only the highest payout in any sequence of two non-overlapping handle pulls. For example, the player only receives the highest payout from amongst the first and second handle pulls, and only the highest payout from amongst the second and third handle pulls. If the player achieves more than two winning outcomes in any designated group of handle pulls, then the lower of the winning outcomes may be treated as a push, and the player may receive his wager back for that handle pull. In variations of this tax, the player receives the highest n payouts in any sequence of m non-overlapping handle pulls. The player might also receive only the lowest payout, the lowest positive payout, the median payout, or the modal payout in any sequence.
10. The player receives only the highest payout in any sequence of two handle pulls. Note that sequences of handle pulls considered in this tax may overlap. For example, the sequence consisting of the first and second handle pulls overlaps with the sequence consisting of the second and third handle pulls. Thus if a player has a sequence of handle pulls resulting in payouts of, 0, 3, 8, 2, 0, 3, 5, 0, then the player receives 8 coins and 5 coins, for a total of 13 coins. The player receives nothing for the second or fourth pulls, because the third pull, which is in a sequence of two with both the second and fourth pulls, respectively, is higher than both the second and fourth pulls. Similarly, the player receives nothing for the sixth pull, because the seventh pull is higher.
11. The player begins a contract period with a number of credits that is less than the equivalent amount of money he has paid. For example, a player inserts $50 into a gaming device and then receives 30 credits or even zero credits.
12. The player is only allowed a certain number of winning outcomes within a given time frame. For example, the player may only win three times in any 30-second period. If the player wins more than 3 times in a 30-second period, then the third win may be a push. With such a tax in place, a player may be required to maintain a certain rate of play so that he does not pause for the remainder of a 30-second period after having won three times. Time frames may be overlapping or non-overlapping. In the latter case, for example, the player cannot win more than 3 times in any rolling 30-second period. In the former case, there are discrete 30-second periods during which the player cannot win more than three times. However, a player can win more than three times within 30 seconds by winning twice at the end of a first period, and twice at the beginning of a second.
13. The player is only allowed the highest outcome during any given time period. For example, the player might get only the highest outcome from any 30-second period. Once again, the periods might be overlapping or non-overlapping. In variations, a player is allowed the highest paying n outcomes within any given time frame. Alternatively, the player might be allowed the $2^{nd}$ highest paying outcome in any given time frame, the median paying outcome, etc.
14. A player is restricted to win no more than twice his prior win. For example, a player might win 3 coins on a first outcome. Three handle pulls later, the player wins 10 coins. However, since the player's earlier win was 3 coins, he may now receive only 6 coins instead of 10, since six coins would be twice his earlier win. Now, on a subsequent handle pull, the player might win up to 12 coins (or in some embodiments, up to 20 coins, even though he was not given the full 10 coins). Suppose, however, that after his win of 3 coins, the player's next win was one coin. Then, on a later win, the player would be restricted to a maximum of two coins.
15. One or more coins is taken from a player upon the occurrence of a predefined event or sequence of events. For example, every time the player loses on three consecutive spins, a coin is taken away from him. Alternatively, if a player wins three times in a row, a coin might be taken from him. In another example, if a player wins more than 5 coins on three consecutive spins, a coin is taken from him. In another example, if a player wins more than 20 coins in any two-minute period, then a coin is taken from him.
16. A percentage of a player's credit balance is taken upon the occurrence of some random event, such as an outcome. For example, an outcome consisting of three blanks on the three reels of a slot machine might cause a player to lose half of his balance. Any fractional amounts of a player's balance may be rounded up or down.
17. A fixed amount of a player's credit balance is taken upon the occurrence of some random event, such as an outcome. The number of credits taken may be 5, 10, etc. In particular, the number of credits taken may be more than the maximum possible wager at the gaming device, or more than the player's last wager.
18. When a player's credit balance meets certain criteria, the player is limited as to what outcomes constitute winning outcomes, or as to how much he can win. For example, when a player's credit balance exceeds 200, he may only be restricted to receiving 50% of any payouts. In another embodiment, when the player's credit balance goes below zero, the player may be able to win only the jackpot. In one embodiment, when the player's credit balance first meets one of the designated criteria (e.g. when it goes over 200), the taxes may apply thereafter, even if the player's credit balance later ceases to meet the criteria. For example, if a player's credit balance goes over 200, then all future outcomes, at least for that contract period, may give the player only 50% of what the outcomes would normally pay. In other embodiments, the tax ceases to apply once the player no longer meets the criteria.
19. The player is prevented from receiving outcomes, payouts, bonuses or the like in a "bonus round". Thus, in one embodiment, where a player may typically be eligible to participate in a bonus round of a game, the player purchasing a contract may not be so eligible, and accordingly, the gaming device may not activate bonus round-related processes and apparatus (e.g. a secondary display associated with a bonus game may not be activated).
20. Each time an outcome corresponding to a payout greater than zero is determined, a random number is determined, the random number being used to determine whether a portion of the payouts is to be withheld as a tax. Thus, for example, each win may be associated with a probability of being taxed.
21. One example of a tax may be to not provide a joker in a joker poker card game.
22. The player loses a number of game plays or a duration of time the player is otherwise entitled to under the contract.

Any of the above taxes may have exceptions to when the tax is applied. In particular, exceptions may occur when the player receives a jackpot outcome. For example, even if a tax prevents a player's balance from exceeding $150, the player's balance may go above $150 if he obtains a jackpot-winning outcome. If an outcome would ordinarily be a push (e.g. because the prior outcome was a win and a player is prevented from winning twice in a row), and a jackpot-winning outcome occurs, then the player would still be allowed to win the jackpot.

Any of the above taxes may also be limited such that not more than a predetermined amount of money is taken from the player during a contract period or during any particular time period. For example, suppose a player is taxed such that whenever he attains a streak of winning outcomes, he receives only the payout for the first outcome, and the rest of the outcomes in the streak are treated as pushes. So if a player were to lose on a first pull, and then achieve consecutive outcomes paying 12, 8, and 2, then the player would actually receive 14 coins: 12 coins for the first outcome, 1 for the second (to repay the cost of the wager), and 1 for the third. In effect, the player has given up seven coins for the second outcome, and 1 coin for the third outcome, for a total of eight coins given up due to the tax. If, at the end of 20 minutes, the player has given up more than 30 coins due to the tax, then the excess coins may be returned to the player. Alternatively, if the player has paid 30 coins due to the tax, prior to the expiration of the 20-minute period, then the tax may no longer apply until the 20-minute period has expired.

In some contracts, a player is responsible for placing wagers from his own money even after having paid to enter into the contract. These contracts may constitute insurance contracts, whereby the player pays a fixed amount upfront, and then proceeds to wager as usual. After a given time period, or a given number of handle pulls, the player may receive some money back from the gaming device. The money he receives may be an insurance payout for any losses the player has suffered in excess of a certain threshold. For example, the player initially pays $20. He then makes 250 handle pulls, inserting wagers for each, and collecting winnings from each. The gaming device determines whether, in the 250 pulls, the player has lost more than $40. If he has, the gaming device pays the player enough so as to bring the player's total losses down to only $40. Another variation of an insurance contract pays the player a fixed percentage of losses below a certain threshold. For example, at the end of an insurance period, the player may receive back 50% of any losses sustained in excess of $50. Therefore, a player who had lost $100 would receive $25 back.

In some embodiments, the player may purchase insurance for a variable time period. The insurance then pays the player such that the player's losses are limited to a fixed amount per unit of time. For example, the player might purchase insurance that limits his losses to $30 per hour. If the player then plays for 2 hours, the gaming device will reimburse him enough money to limit his losses to $60. If the player plays for 3 hours, the gaming device will reimburse him enough money to limit his losses to $90.

In some embodiments, a player enters into a contract, such as an insurance contract, that requires the player to pay money on a periodic basis, not just upfront. For example, the player must pay an extra coin every three spins in order to remain insured. After the player has made a predetermined number of regular payments, the cost of the insurance may even go down. For example, instead of paying one coin every three pulls, the player may pay two coins every seven pulls. In this way, a player becomes 'invested' in his play. If an insured player leaves a gaming device where he has good insurance rates, he risks having to start over at a new gaming device with higher rates.

The player may pay for contract play, including insured play, in any number of other ways, described in the section on taxes above. For example, the player may agree to have one coin taken away from any payout of 4 coins or more, or may agree that any second consecutive win will count as a push.

Related to an insurance contract is a contract that rewards a player for a fixed amount of play, regardless of whether the player has sustained losses. For example, whereas an insurance contract might pay a player only if he has sustained losses after 20 minutes of play, a contract of the present embodiment rewards a player simply for completing 20 minutes of play. In this embodiment, the player plays in a normal fashion, using his own money to make wagers, and directly receiving any winnings. However, after a fixed period of time, or after a fixed number of handle pulls, the player may receive a benefit, such as a cash payment, a coupon, voucher, or gift certificate, or a number of free spins. In such embodiments, the number of spins that the player has previously purchased (i.e. which accumulate and count toward the reward) may be output to a player, for example, on a display area 1040. Thus, in some embodiments, the player may view his or her progress towards the reward on a "spin" counter.

Free spins may give the player the opportunity to win standard payouts on the gaming device. Alternatively free spins may be for alternate prizes. For example, a free spin may allow a player to spin for products or services associated with the casino or with some third-party merchant. A special reel or wheel of the gaming device may contain a free meal pass, a free pair of show tickets, a gift certificate at an online bookstore, etc. The reel may use different symbols than those associated with the normal play of the game. Alternatively, a spin for prizes may employ a standard reel, or reels of the slot machine, with different symbols or symbol combinations given alternate meanings. For example, the cherry symbol wins the player a free line pass. The bar symbol wins the player a free pair of show tickets, the diamond symbol wins the player a $100 gift certificate at the casino's jewelry store.

Also related to insurance play is a contract where the player pays upfront for a fixed period of play, or a fixed number of handle pulls at which the gaming device assumes a more favorable configuration. For example, payouts associated with one or more outcomes may increase. Winning outcomes may occur with greater frequency. The size of the jackpot may increase. In one embodiment, the player might pay $10 upfront. Then, for the next half hour, the gaming device may reconfigure itself to pay true odds, or to return an average of 100% of the amount wagered. Further, in one or more embodiments, after a player pays a flat fee (e.g. $10), the gaming device may reconfigure itself to pay a multiple of any payout amounts awarded during a following period of time (e.g. for the next 10 minutes, the player may receive "double" payouts). Once again, rather than paying upfront, the player may pay on a periodic basis for an improved machine configuration.

Typically, a gaming device can sell only one pull to a player. After making a pull, the player can simply leave, and the gaming device is thereby deprived of further business from the player. The gaming device has a better chance of making repeat sales to a player when he inserts, say, a $20 bill. A player who has just inserted a large bill typically receives a large number of credits on the gaming device. It is then very easy for the player to make a large number of handle pulls, since each handle pull can be purchased electronically using a credit on the meter. Nevertheless, a player with a large credit balance typically still has the opportunity to cash out at any time and to leave the gaming device.

In some embodiments, upon the provision of payment (e.g. the insertion of a $20 bill), a gaming device may provide the player with the option to proceed in a conventional manner (i.e. where a credit balance is increased to 80 credits) or to purchase a number of plays at a discounted price (e.g. 100 plays for $20). In other embodiments, a player wishing to purchase a number of plays at a discounted price may be permitted or required to "pre-select" such an option before depositing the requisite payment (e.g. a $20 bill).

Thus, in one embodiment, a contract allows the gaming device to sell a large block of handle pulls to a player at once. In return for purchasing in bulk, the casino can give the player a reward. Once the player has paid for a block of spins, the player may be bound to make those spins. In other words, he may not be able to cash out a credit balance corresponding to any spins he has not made. (He may, on the other hand, be able to cash out any winnings that result from making those spins). However, since the player has paid in advance, and committed to a certain number of handle pulls, the gaming device may reward the player with cash, with extra spins, with comps, or with any other benefit. For example, for $50, a player might receive 52 spins at a $1 machine. Alternatively, the player may receive 50 spins and a free meal comp. In an alternate embodiment, a player may be given the ability to choose between (1) committing to playing a number of prepaid spins (e.g. and receiving associated benefits, such as extra spins) or (2) not so committing, and retaining the ability to terminate play at a gaming device before a number of prepaid spins have occurred (e.g. without receiving benefits associated with commitments and/or with the condition of paying a penalty upon early termination).

One important aspect of allowing the advanced purchase of handle pulls is the way the handle pulls are displayed to the player. If a player pays $50 and receives 52 handle pulls, then there would be a drawback to simply putting 52 credits on the credit meter. Certainly, the 52 credits would pay for the 52 handle pulls. But the player might think that he has the option to cash out the balance of his credit meter at any time, and may then be disappointed when he is unable to do so. Therefore, in one embodiment, a balance separate from his credit balance is displayed to the player. This new balance is a spin balance. The spin balance shows the number of spins the player is allowed. Players can be taught that a spin balance is only good for spins, and that it cannot be cashed out, whereas a credit balance can be cashed out at any time. Additionally, any winnings paid using spins from the spin balance may be added to the player's credit meter. The player would then be able to receive the winnings immediately, if he so desired.

A spin balance is also applicable outside the framework of contracts. A player, in the course of regular play, might win several free spins. The player might have the option of using the spins at any time. Such spins can be added to the player's spin balance, so that it is clear they are not credits and cannot be cashed out. FIG. 10 shows a gaming device that has both a credit balance and a spin balance displayed. A player at such a gaming device might cash out the 12 credits in the credit balance at any time. The player might also use up spins by pressing the "Use Spin" button. When the player presses the "Use Spin" button, a spin is deducted from the player's spin balance, but not from his credit balance. In some embodiments, not illustrated, a player may be able to use multiple spins at once. Using multiple spins at once might be equivalent to betting multiple coins at once, and may make the player eligible for a higher pay table, or for the bonus round. In some embodiments, a player might be able to use both spins and credits on a single handle pull. For example, the player uses 2 credits and 1 spin, which would get the player an equivalent pay table as if he had used 3 credits.

In some embodiments, even after a player has prepaid for a large number of handle pulls, and has received a benefit, the player may still cash out an amount of money corresponding to unused handle pulls. For example, if the player has paid $50 for 50 handle pulls plus two bonus handle pulls, and has made 30 handle pulls, the player may cash out and receive $20 back. However, the player may thereby forfeit any benefit he received, i.e. the two bonus handle pulls.

As described herein, players may have some restrictions on the play covered by the contract. For example, a contract may cover an hour's play at a gaming device, but require the player to make between 600 and 800 pulls in that hour. In some embodiments, however, contracts may allow players to quit early or to play more than is otherwise covered by the contract. For example, a contract might cover an hour's worth of play. After the first half-hour, the player may be ahead by $100 and wish to quit without risking the loss of the $100 in the subsequent half-hour. He may therefore opt to pay $20 in order to be released from the obligation of continuing the contract. He may then collect his $100 in winnings.

A player at a gaming device may reach the end of a contract with accumulated credits just short of an amount necessary to collect winnings. However, the last 17 out of 20 pulls may have been wins for the player. The player may feel as if he has some momentum going for him and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of $100 at the end of a contract. The casino, or insurer, may figure that if the player were to keep pulling, he would be likely to lose some of that $100. So the casino may pay the player $5 to take another 200 pulls.

In a related embodiment, a player may carry over the accumulated credits from a first contract to a second contract. Thus, a player with 40 accumulated credits at the end of a first contract may begin a second contract with 40 accumulated credits. The player may pay or be paid for carrying over credits.

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract so as to be compensated for the risk it takes. In other embodiments, the casino and the insurer share the profits and losses associated with a contract. To ensure a profit to be divided amongst the two, a contract may be priced in excess of a player's average win. Note that a player's loss would count as zero in figuring out the player's average win, since the player does not have to pay for losses.

One method of establishing the price of the contract involves first figuring out what the insurer might expect to pay, on average, to cover a player's losses. Another method of pricing a contract involves first figuring out what the casino/insurer combination might expect to pay, on average, to compensate a player for his winnings. Both methods involve similar computations. Therefore, computations will be described below with respect to only one or the other method of pricing a contract.

The insurer obtains the gaming device or a component of the gaming device containing significant information about the operation of the gaming device (e.g. the CPU), or the PAR sheets of the gaming device. The insurer then operates the gaming device as a player would when under contract. For example, if the insurer is to sell contracts for 600 pulls, the insurer would make 600 handle pulls at the gaming device and record the number of accumulated credits at the end of the 600 pulls. The insurer may repeat this process of testing contracts at the device for a large number of trials. The insurer may then average what its payments would be over all the trials. Note that while it might take a player days or years to complete, say, 100,000 contracts at a gaming device; the process may be sped up for the insurer by giving the gaming device special instructions to generate outcomes more rapidly. The performance of large number of trials in the manner described above is often called a Monte-Carlo simulation.

The following is an example of pricing a contract. Using the method of pricing described above, an insurer simulates the execution of a 600-pull contract. The insurer repeats the simulation four more times. After the first simulation, the player has won $10. After the second, the player has lost $5. After the third, the player has lost $17. After the fourth, the player has lost $8. After the fifth, the player has won $3. To figure out what the insurer must pay, on average, the insurer adds the three losses to get: $5+$17+$8=$30. The insurer then divides by five, the number of simulations, to get: $30/5=$6. The insurer doesn't care, for the purposes of this calculation, how much the player won when he did win, since the casino is the one paying the player his winnings. Now, in order to obtain an average $4 profit, the insurer might charge $10 for each contract.

1) The insurer obtains or creates software that mirrors or models the operation of the gaming device. For example, the software is configured to generate the same outcomes as does the gaming device with the same frequency as the gaming device. For each outcome generated, the software tracks what a player's accumulated credits would be. As before, the insurer may simulate many contracts and average what its payments would be over all the trials.
2) The insurer mathematically models potential outcomes of one handle pull of the gaming device using a random variable with a probability mass function (PMF) or probability density function (PDF). With these functions, the x-axis may represent potential winnings, such as −$1 or $3, which can occur from a single handle pull. The example of −$1 indicates the player has paid $1 for the pull but has won nothing. The example of $3 indicates that the player has paid $1 for the pull and won $4. The y-axis of these functions represents the probability or probability density of each outcome occurring. The probability of the player getting −$1 on a pull might be 0.8, while the probability of the player getting $3 might be 0.2. A PMF for the number of accumulated credits at the end of a contract can then be created by summing the random variables representing individual handle pulls. If each pull is independent with an identical PMF, as is common with slot machines, then the PMF for the results of the entire contract can be created using repeated convolutions of the PMF's for individual handle pulls. If, for example, 600 pulls are involved, then the PMF for single a handle pull may be convolved with itself 599 times to generate a PMF for the entire contract. Using this resultant PMF, the insurer can easily calculate how much it would expect to pay to cover a player's losses on each contract. If the resultant random variable is denoted by w, and the insurer would be required to pay for any player losses, then the insurer's expected payment is given by $$\Sigma_{-\infty}^{0} w * \text{probability}(w)$$

3) In the method described above, Fourier Transforms, Z transforms, Laplace Transforms, or other transforms can be used to aid in the calculation of the repeated convolutions. Such a use of transforms is well known in the art.
4) As is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that described in 3). If a Gaussian PDF is used as an approximation, then an integral sign replaces the summation sign, and "probability" is replaced by "probability density."

The following is an example of using a Gaussian probability density function to approximate the amount a casino would be required to pay, on average to, to compensate a player for his winnings at the end of a contract. The contract may then be priced in excess of this amount to ensure an average profit for the casino/insurer combination. A Gaussian function is given by the formula, $f(x)=1/\sqrt{(2\pi\sigma)}\exp(-(x-\mu)^2/(2\sigma^2))$. In this formula, a is the standard deviation, and $\mu$ is the mean. Now, let us suppose that a single handle pull of a slot machine results in a required payout to the player described by a probability mass function with mean $\mu_0$ and standard deviation a $\sigma_0$. Then, assuming each handle pull is independent, n handle pulls of the slot machine may be described by a function with mean $\mu=\mu_0 n$ and standard deviation $\sigma=\sigma_0\sqrt{n}$. Furthermore, if n is large, then the function describing a casino's aggregate payout after n handle pulls may be approximated by the Gaussian function f(x), whose formula is given above.

To calculate what a casino would have to pay to compensate a player for his winnings, on average, we note that the casino pays when the player wins, but receives nothing when a player loses. Therefore, the expected payment of the casino is given by:

$$\int_{-\infty}^{0} 0 * f(x)dx + \int_{0}^{\infty} x * f(x)dx = \int_{0}^{\infty} x * f(x)dx.$$

We proceed to solve the integral:

$$\begin{aligned}
\int_{0}^{\infty} x * f(x)dx &= \int_{0}^{\infty} x * 1/\sqrt{(2\pi\sigma)}\exp(-(x-\mu)^2/(2\sigma^2))dx \\
&= 1/\sqrt{(2\pi\sigma)}\int_{0}^{\infty} x * \exp(-(x-\mu)^2/(2\sigma^2))dx \\
&= 1/\sqrt{(2\pi\sigma)}\int_{0}^{\infty} [(x-\mu) * \exp(-(x-\mu)^2/(2\sigma^2)) + \\
&\quad \mu * \exp(-(x-\mu)^2/(2\sigma^2))]dx \\
&= 2\sigma^2/\sqrt{(2\pi\sigma)} * (-1/2) * [\exp(-(x-\mu)^2/(2\sigma^2))]_0^{\infty} + \\
&\quad \mu\int_{0}^{\infty} 1/\sqrt{(2\pi\sigma)}\exp(-(x-\mu)^2/(2\sigma^2))dx
\end{aligned}$$

We deal with the two terms separately:

$$2\sigma^2/\sqrt{(2\pi\sigma)}*(-1/2)*[\exp(-(x-\mu)^2/(2\sigma^2))]_0^\infty = -\sigma^2/\sqrt{(2\pi\sigma)}*[0-\exp(-\mu^2/(2\sigma^2))]$$
$$= \sigma^2\exp(-\mu^2/(2\sigma^2))/\sqrt{(2\pi\sigma)}$$
$$= n\sigma_0^2\exp(-n^2\mu_0^2/(2n\sigma_0^2))/\sqrt{(2\pi\sqrt{n}\sigma_0)}$$
$$= n^{3/4}\sigma_0^{3/2}\exp(-n\mu_0^2/(2\sigma_0^2))/\sqrt{(2\pi)}$$

and $$\mu\int_0^\infty 1/\sqrt{(2\pi\sigma)}\exp(-(x-\mu)^2/(2\sigma^2))dx = \mu\int_{-\mu/\sigma}^\infty 1/\sqrt{(2\pi\sigma)}\exp(-y^2/2)\sigma dy$$

(where $y=(x-\mu)/\sigma$)

$$= \mu\sqrt{\sigma}\int_{-\mu/\sigma}^\infty 1/\sqrt{(2\pi)}\exp(-y^2/2)dy$$
$$= \mu\sqrt{\sigma}\left[1-\int_{-\infty}^{-\mu/\sigma} 1/\sqrt{(2\pi)}\exp(-y^2/2)dy\right]$$

The integral is the cumulative distribution function for a zero mean, unit standard deviation Gaussian, for which tables exist. We denote it by N(−μ/σ).

Continuing:

$$\mu\int_0^\infty 1/\sqrt{(2\pi\sigma)}\exp(-(x-\mu)^2/(2\sigma^2))dx = \mu\sqrt{\sigma}[1-N(-\mu/\sigma)]$$
$$= n\mu_0 n^{1/4}\sqrt{\sigma_0}[1-N(-n\mu_0/(\sqrt{n}\sigma_0))]$$
$$= n^{5/4}\mu_0\sqrt{\sigma_0}[1-N(-\sqrt{n}\mu_0/\sigma_0)]$$

Recombining the two terms we get:

$$\int_0^\infty x*f(x)dx = n^{3/4}\sigma_0^{3/2}\exp(-n\mu_0^2/(2\sigma_0^2))/\sqrt{(2\pi)} + n^{5/4}\mu_0\sqrt{\sigma_0}[1-N(-\sqrt{n}\mu_0/\sigma_0)]$$

If we were to graph the above as a function of n, the number of pulls, we would see that initially, as the number of pulls in a contract gets larger, a casino could expect to pay more money to compensate a player for his winnings. However, there would reach a point, beyond which more pulls in a contract would actually decrease the amount a casino could expect to pay to compensate a player for his winnings. This illustrates an important feature of contracts. Having more pulls in a contract is not necessarily an advantage for a player.

5) A casino or insurer may start with a first price for a contract, and then evolve the price as more and more of the contracts are purchased and executed. For example, if an insurer loses money on the first few contracts it sells, then it may increase the price of the contract. If the insurer makes large profits on its first few contracts, then it may reduce the price.

Once the insurer has determined what it can expect to pay, on average, to cover a player's losses, the insurer may price the contract so as to give itself a desired profit margin. For example, if the insurer can expect to pay, on average, $15 to cover a player's losses, then the insurer might price the contract at $20 to insure itself a $5 average profit.

In one embodiment, a contract may require certain behaviors of the player. As described, these behaviors may include maintaining a certain rate of play, or performing a minimum number of handle pulls or playing a gaming device of a particular denomination and/or game type. The gaming device on which a contract is executed may take various steps to ensure that the behaviors are performed. To this end, the gaming device may initiate handle pulls automatically or may fail to register handle pulls that the player attempts to initiate. For example, if the player must make at least one handle pull every 10 seconds, and the player has failed to make any handle pulls in 9 seconds, then the gaming device may automatically initiate a handle pull for the player on the tenth second. As another example, a player may be restricted from making more than one pull every 10 seconds. If in the same 10-second interval, the player attempts to make more than one handle pull, the second handle pull may not be initiated, at least until the next 10-second interval.

As can be seen from the above two examples, the player may maintain some control over his gambling behavior even while the gaming device forces him to comply with the contract. So a player who must make a pull every 10 seconds still has control over whether the pull occurs on the first second of an interval or the eighth second of an interval. Such control can be psychologically important, because many players feel that the exact moment at which they initiate a handle pull has an important effect on the ultimate outcome.

In many cases, a player may not desire to make any active decisions once a contract has been initiated and may simply put a gaming device into "automatic play." The player may later have the option of taking the gaming device out of automatic play and of manually initiating handle pulls. One further advantage of automatic play is that the gaming device in automatic play mode may generate outcomes very rapidly. Since most modern gaming devices generate outcomes using a computer processor, and since computer processors may execute billions or more instructions per second, a gaming device could easily generate any number of outcomes a player might desire in as short of a time period as desired. For example, a player may have a lunch date in 10 minutes, but may wish to make 1000 handle pulls before then. The player may thereby enter into a contract with the gaming device in which the player will pay, say, $30, the gaming device will rapidly generate 1000 outcomes (at $1 per outcome), and the player will receive any positive amount of remaining credits. In fact, such a contract would likely be profitable for the gaming device, since a gaming device starting at $30, with a house advantage, is unlikely to have a positive credit balance after 1000 pulls.

Another aspect of automatic play would allow the events of a television show, movie, sports broadcast, etc., to automatically initiate handle pulls on behalf of the player. For example, a player might insert 100 credits into the gaming device, and agree to allow the gaming device to automatically deduct a credit, and initiate a handle pull anytime the word "love" is said in a 30-minute soap opera. Meanwhile, the player may enjoy the show.

A contract may be offered to a player in a number of ways. A gaming device may use text or synthesized voice to ask a person whether or not he would like to sign up for a contract. A casino attendant may offer a contract to a player, or signs at a casino may point a player towards a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunch time or departure time. A player may have the opportunity to enter into a contract only if he also agrees to do business with a particular merchant or group of merchants. A player may have the opportunity to enter into a contract if the casino or insurer deems him a good, valuable, or loyal customer.

A player may specify a desired contract or package of game plays in a number of ways. At a gaming device, a player may use a touch screen to indicate his desire to enter into a specific contract. Using the touch screen, the player may select from a menu of possible contracts. For example, the menu might list one or more contracts with different time durations or different prices. Further, the player may be given the option to play conventionally (i.e. non-contract play). The player could then select a contract (or conventional play) by touching an area of the screen next to the selected option.

In one or more embodiments, the player is able to purchase a contract or package of game plays via buttons (e.g., electrical, mechanical, or electromechanical buttons) on a user interface panel of a gaming device. For example, the player might press a button labeled "Buy 500 Jackpot Only spins for just 35 credits." Upon pressing the button, 35 credits are deducted from the player's credit balance and 500 spins are added to a Jackpot Only spin meter.

A spin meter may be in the form of an intelligent button or electro-mechanical button that includes a display and is actuatable by a player. For example, U.S. patent application Ser. No. 10/726,929 to Bleich et al. (filed Dec. 3, 2003 and published as Publication No. 2004/0266517 A1 on Dec. 30, 2004) and U.S. patent application Ser. No. 10/611,626 to Thomas (filed Jun. 30, 2003 and published as Publication No. 2004/0266516 A1 on Dec. 30, 2004) each describes an intelligent button that includes a meter that is incremented to display a number of available spins or game play, is usable by a player to elect to use an available game play, and is decremented in response to a use of an available game play. Such a button may be used, in one embodiment, as a spin meter that may reflect a number of game plays purchased via a package or contract and that may be decremented upon each initiation of a game play under the terms of the contract or package. The entirety of each of these applications is incorporated by reference herein.

The following are various examples, provided for illustrative purposes only and not meant to be limiting in any sense, of some circumstances in which a player may purchase a package of game plays by pressing one of a plurality of available buttons on a gaming device interface. It should be noted that such buttons may be buttons of a touch-screen interface or mechanical or electromechanical buttons on a panel or section of a gaming device, or may take another form, as appropriate or practicable.

Example 1

The player inserts a bill into the bill validator of the slot machine and establishes a balance of 80 credits. After playing for a period of time, his credit balance has been reduced to 35 credits due to an unlucky streak. In order to ride out the losing streak without risking all of his remaining bankroll, the player presses a "200 Jackpot Only Spins for 20 Credits" button on the front of the slot machine. Twenty credits are deducted from his credit balance, and a spin balance of 200 spins is established. For the next 200 spins, the player is eligible only for a jackpot payout. Smaller payouts do not result in any addition to his credit meter. As the 200 spins are used, the spin meter is decremented by one for each spin.

Example 2

The player inserts a $20 bill into the bill validator of a quarter denomination slot machine. Before establishing a credit balance of 80 credits, two buttons light up on the user interface panel. One button says "Begin session with 80 credits" while the other says "Begin session with three bonus rounds." Intrigued, the player presses the button offering the three bonus rounds. The slot machine immediately begins a series of three bonus rounds in which the player is asked to select objects from a group of objects on the secondary screen of the slot machine. Each selection reveals a number of credits won by the player. After all three bonus rounds have been completed, the player has earned 93 credits. These credits are then added to the credit meter of the slot machine and the player is ready to begin a slot machine gaming session.

Example 3

The player inserts a bill into the bill validator of the slot machine and establishes a balance of 100 credits. The player immediately encounters a lucky sequence of spins in which he hits a number of sizable payouts. Thinking that the machine is now hot, the player presses a "100 Double Jackpot Spins" button. Upon pressing the button, 5 credits are deducted from the credit meter of the player. At the same time, a spin meter now registers 100 spins. For the next 100 spins, this spin meter decrements by one. Any jackpot hit by the player during these 100 spins is immediately doubled, allowing the player to benefit more from a hot machine.

Example 4

The player inserts a bill into the bill validator of the slot machine and establishes a balance of 100 credits. After playing for half an hour, a button lights up on the user interface panel of the slot machine. The button offers "50 spins for only 45 credits." The player was planning on playing for a while longer anyway, so the discount offered was attractive. He presses the button and 45 credits are deducted from his credit meter. At the same time, 50 spins are added to a spin meter of the slot machine. During the next 50 spins, rather than decrementing the credit balance by one, the spin meter is decremented by one. Any winnings during the 50 spins are added to the credit balance of the player. While the player is able to cash out his credit meter balance at any time, he is not able to cash out his spin balance (although he may save the spin balance upon cashout so that he can use it at another slot machine of the same denomination).

Figure 12A:
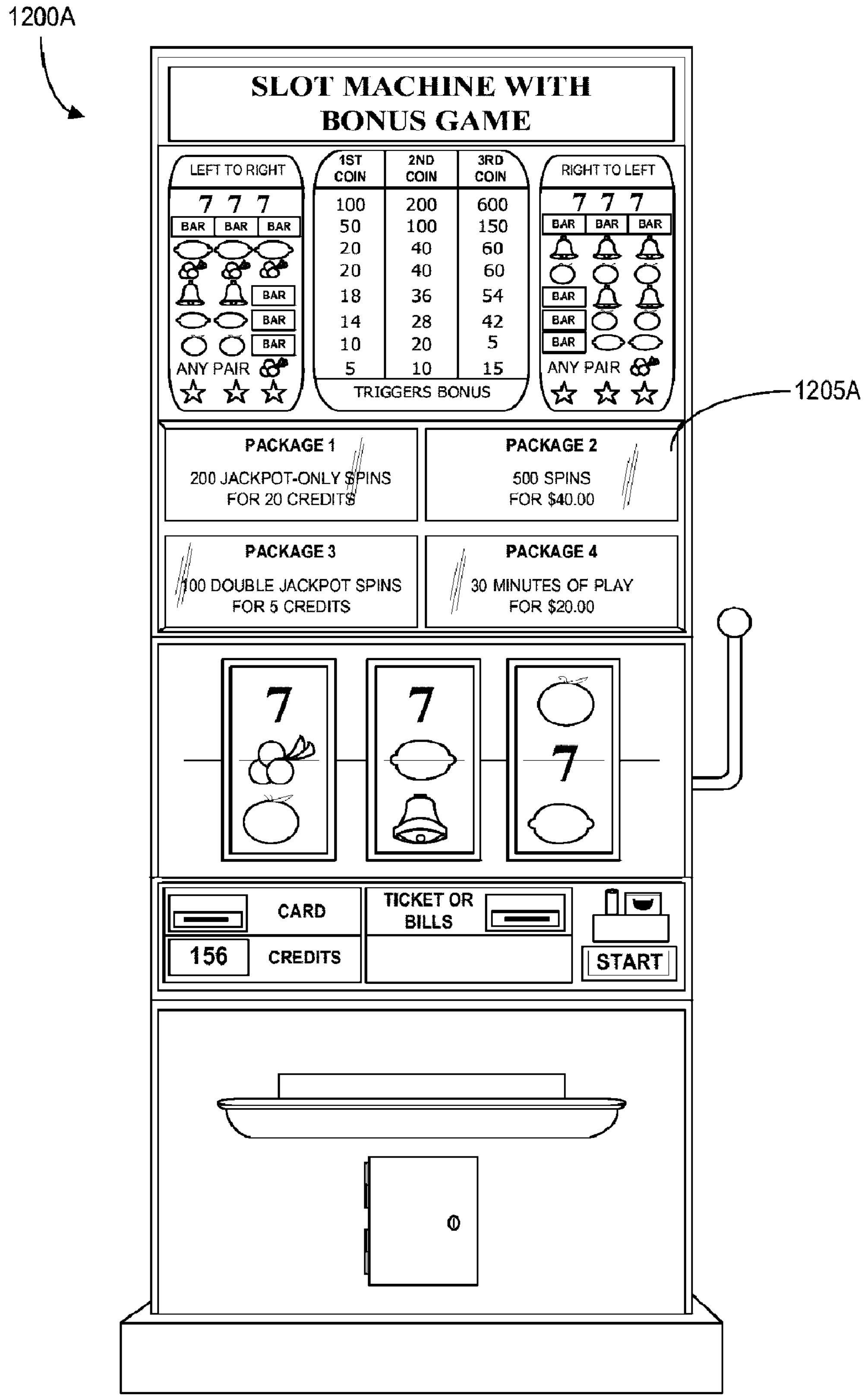
FIG. 12A is a plan view of a slot machine operable to display a menu of packages of game plays available for purchase, in accordance with one or more embodiments.

Referring now to FIG. 12A, illustrated therein is a plan view of an example embodiment 1200A of a gaming device in the form of a slot machine (referred to as slot machine 1200A herein). Slot machine 1200A illustrates that a menu of available packages of game plays or contracts may be displayed to a player via a player interface comprising a video screen such as a touch screen. Player interface 1205A comprises a video screen that is a touch screen displaying such a menu of four available packages to a player. A player may be presented with the menu, for example, upon indicating a desire to consider purchasing a package (e.g., by selecting an option on a previous menu of options presented to the player) and/or upon initiating play at the slot machine 1200A. A player may select a package or contract (e.g., in order to obtain further information on the package or contract and/or to purchase the package or contract) by touching the area of the screen on which the package appears.

It should be appreciated that one or more embodiments may include storing graphic and/or sound elements that are used to construct the menu of available packages. These elements may be store, for example, in EEPROM, flash memory, hard disk, CD ROM, or in any other suitable storage device.

The menu may be displayed via any suitable display device, such as a CRT, LCD, VFC, LED display. In one embodiment, the menu may be implemented using only dedicated electromechanical switches. In one embodiment, a player operates an input device of the slot machine 1200A to cause the menu to be displayed. In one embodiment, a gaming device includes a touch screen and a touch screen controller (not shown) associated with a video monitor display device. The touch screen and touch screen controller may be operable to communicate with a video controller of the video monitor display device and a processor (e.g., processor 410 of gaming device 400). Thus, a player may be enabled to indicate decisions (e.g., which package of game plays the player desires to purchase) by touching the touch screen in the appropriate places.

In one embodiment, display of the menu preempts display of other information. For example, in one embodiment the same display device or screen used to display game play elements (e.g., video reels of a slot machine) during active game play may be used to display a menu of available packages or contracts to a player upon an indication of a player to view the menu. In another embodiment, a dedicated display device or screen may be used to display a menu of available packages of game plays or contracts on a continuous, periodic, or other basis.

Figure 12B:
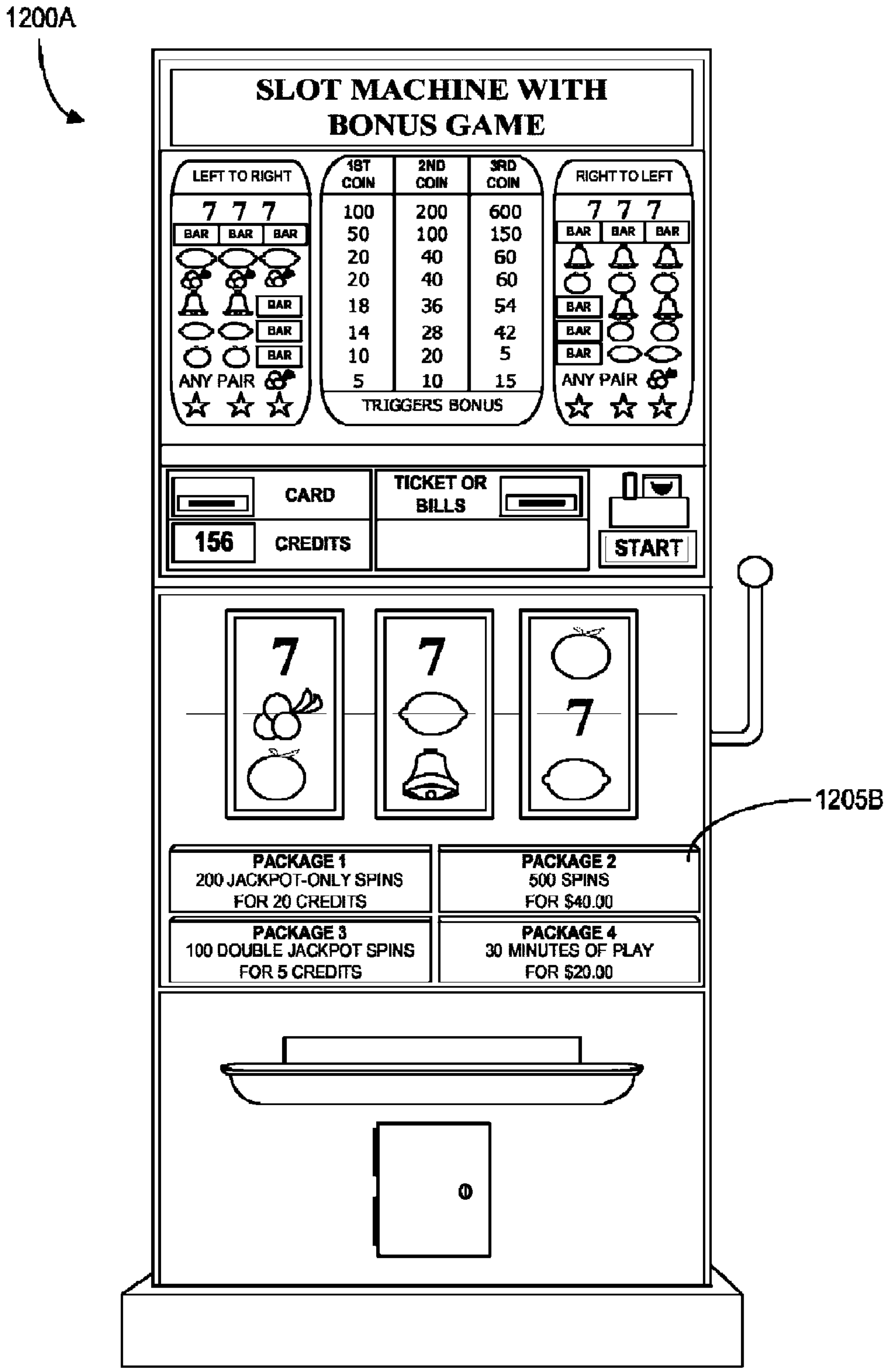
FIG. 12B is a plan view of a slot machine having a plurality of buttons, each button corresponding to a package of game plays available for purchase, in accordance with one or more embodiments.

Referring now to FIG. 12B, illustrated therein is a plan view of an example embodiment 1200B of a gaming device in the form of a slot machine. The slot machine 1200B illustrates an embodiment in which a player interface 1205B in the form of a plurality of mechanical or electromechanical buttons is operable to display information about packages of game plays or contracts available for purchase. In the particular embodiment illustrated, each button on the player interface 1205B describes a particular package of game plays or contract that is available for purchase. In one embodiment, a player's actuation of the button causes (i) a purchase of the package or contract such that the appropriate number of credits is deducted from the player's credit meter balance as payment for the package or contract or the player is prompted to input the appropriate amount of payment; (ii) additional information to be output regarding the package (e.g., via a display screen of the slot machine 1200B; and/or (iii) an output of a confirmation screen requesting that the player confirm his intention to purchase the contract or package.

In one embodiment, in addition to or in lieu of a gaming device displaying information about one or more available packages or contracts, another device may be operable to perform this and related functions (e.g., allowing player to select a desired package or contract). For example, a peripheral device associated with one or more gaming devices or a kiosk may be utilized to output information about one or more available packages or contracts and/or to allow a player to indicate a desire to purchase a package or contract.

Thus, as should be appreciated from the description of the embodiments herein, a gaming device, peripheral device or other device may include one or more components operable to display information about one or more contracts or packages available for purchase. Further, the gaming device, peripheral device or other device may include one or more components operable by a player to indicate a desire to purchase a particular package or contract. The component(s) operable to display information about the available packages or contracts may, in one embodiment, comprise the component(s) operable by a player to indicate a desire to purchase a particular package or contract. In one embodiment, a player may use special buttons, keys, or voice input to specify a desired contract, package or terms thereof.

Figure 13:
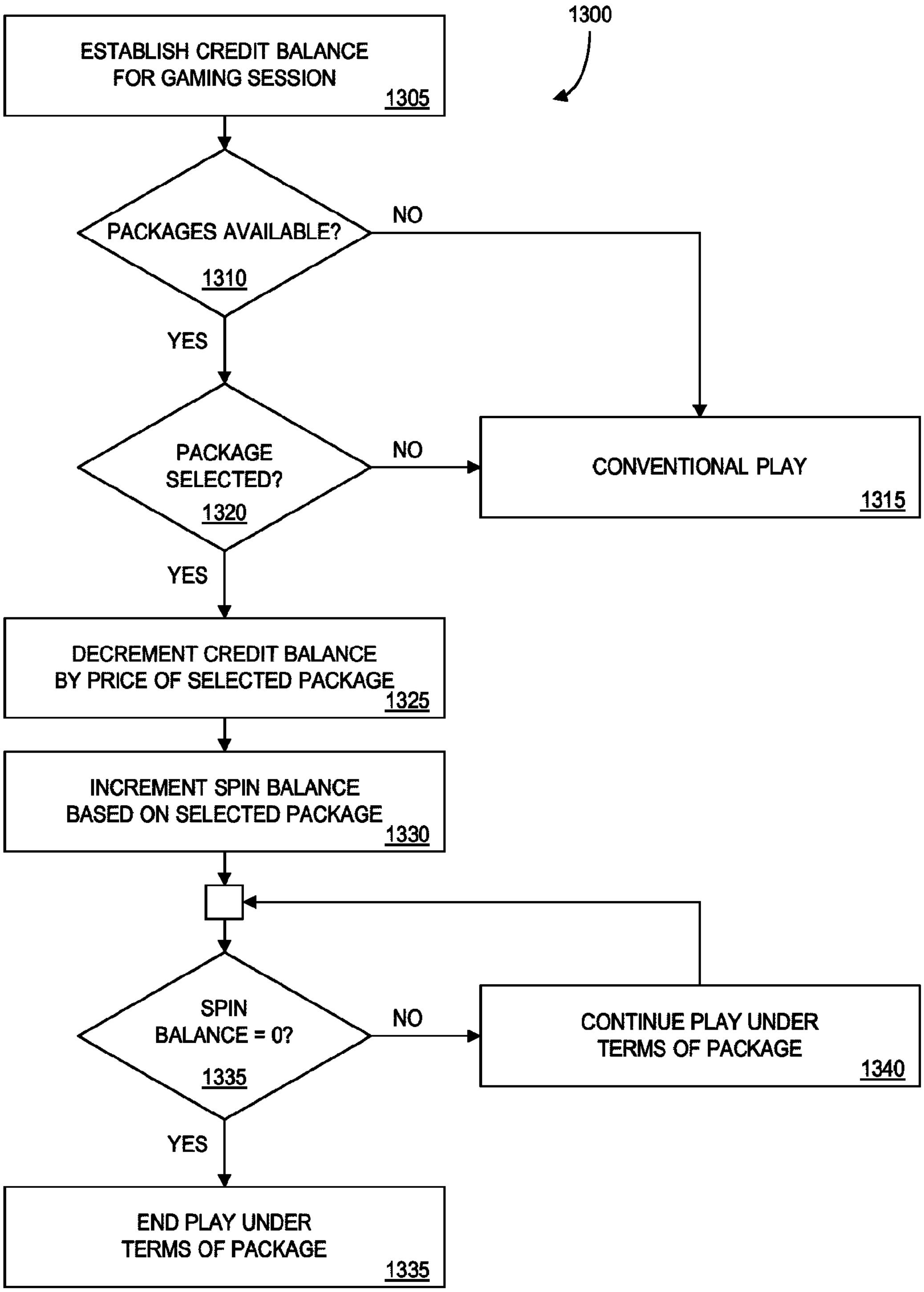
FIG. 13 is a flow chart illustrating an exemplary process according to one or more embodiments.

Referring now to FIG. 13, illustrated therein is an example process 1300 that may be implemented as one or more subroutines executable by one or more processors (e.g. a processor of a gaming device). The process 1300 provides for (i) establishing a credit balance for a gaming session, (ii) determining whether one or more packages of game plays are available for purchase, and if so (iii) determining whether one or more packages has been selected for purchase. If a package of game plays has been selected for purchase, the process 1300 provides for (i) decrementing the credit balance by the price of the selected package, (ii) incrementing a spin meter balance based on the selected package, (iii) determining whether the spin meter balance is equal to zero, and, if the spin meter balance is not equal to zero, (iv) allowing continued play of a gaming device under the terms of the purchased package. Each of these steps will now be described in more detail.

In step 1305, a balance of credits is established. A player may be enabled to establish a credit balance at a gaming device in one or more of a variety of manners. Such manners may include, for example, (i) inserting a bill into a bill validator; (ii) inserting coins or tokens into a coin slot; (iii) inserting a cashless gaming ticket/voucher into a reader device; (iv) entering a code associated with an amount of money; (v) swiping a credit card, debit card, smart card, or cashless gaming card; and (vi) having funds deposited to the gaming device electronically from an account, such as a casino account (e.g. via electronic funds transfer). Once established, the credit balance may be increased during play as the player accumulates winnings and/or provides additional funds.

In step 1310, it is determined whether one or more packages of game plays are available for purchase. Such a determination may comprise, for example, determining whether to output a menu of available packages. In another embodiment, such a determination may comprise determining whether one or more buttons, each button defining a package, is currently active. In some embodiments, a package may be available only if one or more conditions associated with the package are satisfied. Such conditions may comprise, for example, (i) whether an indication to activate a package has been received (e.g., from a casino employee and/or processor of another device); (ii) whether information associated with the player who established the credit balance in step 1305 (e.g., as determined via a record of a database associated with a player identifier provided by the player) satisfies one or more criteria associated with a package; (iii) whether information associated with play of the gaming device satisfies one or more criteria.

In other embodiments, a gaming device may be preconfigured with a plurality of packages that are available to all players at all times, such that there is no need to determine whether one or more packages is available (since the gaming device may be programmed with data that indicates the available packages). For example, as illustrated in FIG. 12B, a gaming device may include a plurality of buttons, each button being associated with a package available for purchase. In one embodiment, a player may be able to select one of the packages at any time by actuating the appropriate button. In another embodiment, a button may be active in some circumstances and inactive in others (an inactive button corresponding to an unavailability of the associated package), thus allowing a player to select the associated package only under certain circumstances.

In one embodiment, step 1310 may comprise outputting a menu of the available packages. A step of outputting a menu of available packages may be preceded by a step of determining whether one or more packages are available. In another embodiment in which a gaming device is pre-programmed with one or more packages that are available, there may be no need to determine whether packages are available prior to outputting the packages. For example, the menu of available packages may be selectively output upon the player initiating the credit meter balance and/or upon a player indicating a desire to view the menu.

If it is determined that at least one package is not available, the process 1300 may continue to step 1315. In one embodiment, step 1315 may comprise enabling conventional play of the gaming device. In another embodiment, a gaming device may be configured only for package play, such that if at least one package is not available for purchase, the gaming device may not be available for play and an appropriate message indicating the unavailability of the gaming device for play may be output in step 1315.

In step 1320, it is determined whether a package of game plays has been selected for purchase. If no package has been selected for purchase, the process continues to step 1315. For example, in one embodiment a player may be allowed a predetermined period of time in which to decide to purchase a package before the gaming device configures itself for conventional play. In such an embodiment, step 1320 may comprise determining whether the predetermined amount of time has passed without receiving a selection of a package from the player. In another embodiment, a player may affirmatively indicate a desire to not purchase a package and thus engage in conventional play (e.g., via a menu of a touch screen or via a mechanical or electromechanical button). In this latter embodiment, step 1320 may comprise determining whether this affirmative indication to engage in conventional play has been received.

As described herein, a player may select a package option using one or more buttons (e.g., electromechanical buttons or touch screen buttons) on the gaming device. For example, the player may press a button labeled "100 Jackpot Only Spins" in order to indicate that he wants to purchase a block of Jackpot Only Spins. Examples of packages of game plays include:

(i) 100 Jackpot Only spins (e.g. 100 spins which result in a payout to the player only if the top jackpot is hit, all other normally paying outcomes resulting in no payment to the player);

(ii) 100 spins for 90 credits (e.g. a block of 100 spins is sold to the player at a discount to the retail price);

(iii) 100 spins for 80 credits with Whammy feature (e.g. a block of 100 spins is sold to the player at a steep discount to the retail price, but some of the payouts of the gaming device are disabled during the session);

(iv) 50 spins for the wheel (e.g. a block of 50 spins which provide no regular payout to the player but allow him to earn bonus round wins when achieved); and (v) 500 spins of double comp points for 3 credits (e.g. the gaming device awards comp points at double the normal rate for the next 500 spins).

As also described, such packages may be made available to the player throughout a gaming session. Alternatively, the availability of a package of game plays may be restricted in some way, such as by making the package available:

(i) Only at the beginning of a gaming session;

(ii) Only when the player's credit balance has enough credits to pay for the package;

(iii) Only when the player is playing max coins;

(iv) Only when the player is playing the maximum number of pay lines;

(v) Only if the player is a member of a specified program (e.g., the player is a Diamond Club member);

(vi) Only when the player is playing with a player tracking card; and (vii) Only when the player has previously played the machine.

In one embodiment, after receiving a selection of one or more packages, a gaming device may require the player to confirm his selection by having him press the button a second time or touch a location on a touch screen of the gaming device. Such confirmations might be especially appropriate for packages which require relatively larger upfront payments. Commonly-owned, co-pending U.S. application Ser. No. 10/791,028, filed Mar. 2, 2004 in the name of Walker et al. and entitled METHOD AND SYSTEM FOR MANAGING GAME CONFIRMATIONS describes various methods and apparatus for allowing a player to confirm a selection at a gaming device. The entirety of this application is incorporated by reference herein for all purposes.

If a package of game plays is determined to have been selected, process 1300 continues to step 1325, where the credit balance established in step 1305 is decremented by the price of the selected package. For example, a player selecting a package of 100 spins for a cost of 90 credits would result in the gaming device decrementing his credit balance by 90 credits. In one embodiment, step 1325 may comprise determining a price for the selected package. For example, a previously determined price may have been associated with the package and stored in a database or otherwise in a memory accessible to the gaming device or other device performing step 1325. Thus, in one embodiment determining the price for the selected package may comprise retrieving the price from the memory.

Alternatively, the player could be asked to insert a bill, coins, or cashless ticket to pay for the selected package. In another embodiment, players are able to buy packages on credit, providing payment only at the conclusion of a session or even at the conclusion of the casino visit. In another embodiment, the player makes a series of payments over time during the gaming session to pay for the package.

In step 1330, a balance of a spin meter is incremented based on the package determined to have been selected. For example, the spin meter might show a balance of 500 to indicate that 500 Jackpot Only spins are available for the player to use, in a circumstance in which a player selected a package of 500 Jackpot Only spins for purchase. As these spins are used, the spin meter balance is decremented.

In one embodiment, the player is able to select before every spin whether he wants to draw a spin from his credit balance or his spin balance. The gaming device might even have two spin buttons to engage the reels, one which draws from the spin meter and one which draws from the credit meter. In one embodiment, the player may also be allowed to establish rules (saved on a player tracking card or at a slot server) for determining which balance to draw from at any given time.

In embodiments in which a gaming device is deducing a number of spins or game plays indicated on a spin meter, it should be noted that in some embodiments the gaming device may be configured in a manner that clearly indicates to the player that the gaming device is operating in accordance with the terms of the package (e.g., a "Jackpot Only" mode if the player has selected a package of 500 Jackpot Only spins). This may be done to avoid or diminish the likelihood of confusing the player as to whether the gaming device is operating in a conventional mode or a mode configured in accordance with the terms of a package. For example, in accordance with one embodiment a player purchasing a block of Jackpot Only spins will not have access to payouts less than the maximum available payout or jackpot for spins completed under the terms of the package. In order to make sure that the player understands that the paytable has been temporarily altered, an indication could be made on the gaming device (e.g., on the reels of the gaming device) to show that smaller payouts would not be paid to the player as a result of game play results conducted in the current mode. For example, all of the cherry symbols on an electronic reel gaming device might be grayed out or shown with a slash through them to indicate that they would provide no payment to the player. In some embodiments, the button that the player pressed to buy the Jackpot Only spins might flash while the Jackpot Only spins were being used up.

In step 1335, it is determined whether the spin balance of the spin meter is zero. In other words, it is determined whether the spins purchased by the player via the selected package have been exhausted. If the spin meter balance equals zero, the play of the gaming device under the terms of the selected package may end (step 1345). In one embodiment, once the spin balance has been exhausted, the gaming device returns to a normal mode of operation. In one embodiment, step 1345 may comprise presenting the player with advertisements (e.g., via a display screen of the gaming device) for other packages of game plays that may be purchased. If it is determined, in step 1335, that the spin meter balance does not yet equal zero, play of the gaming device under the terms of the selected package may continue (step 1340).

It should be noted that although the process 1300 has been described with reference to spins of a reeled slot machine, the process may be equally applicable to packages of games plays of other devices, such as hands of video poker. It should further be noted that although the process has been described with reference to packages of spins, the process is equally applicable to contract play as described herein.

In one or more embodiments, the buttons which function to allow a player to select a package of game plays or contract may be operable to perform or cause the performance of different functions depending on the number of times the button was pressed. For example, a "Double Payout on Four of a Kind" button on a video poker machine might offer double payout for four aces when pressed once, and double payout for four aces or four kings when pressed twice.

As described, buttons for selecting a package of game plays or contract might not be active at all times. For example, a given button might remain darkened and inactive during most of a gaming session, but light up and become available for selection by a player in one or more of the following circumstances:

(i) At a predetermined time (e.g. every 100 spins, or every hour on the hour);

(ii) At random intervals (e.g. there is a 1 in 100 chance of the button being activated for every spin of the reels);

(iii) Immediately following a bonus round;

(iv) Only for experienced players (e.g. a player who had used the particular slot machine before);

(v) When a particular payout occurs (e.g. whenever cherry-cherry-cherry appears);

(vi) When the player inserts/removes his player tracking card;

(vii) When the player inserts a bill into the bill validator;

(viii) When the credit balance of the player reaches a predetermined level;

(ix) When the player experiences a winning/losing streak;

(x) At certain times of the day;

(xi) When the gaming device and/or at least one associated gaming device is unoccupied and/or when the gaming device and/or the at least one associated gaming device is unoccupied for a predetermined length of time; and (xii) Upon activation by casino personnel.

In one embodiment, the buttons operable by a player to select a package of game plays or a contract may be advertised via a display of a gaming device. For example, after a number of losing spins in a row the primary screen of the gaming device may output a message to the player such as "Next two minutes only, get a block of 100 spins for only 90 credits!". While such advertisements are directed at the player, the button(s) may light up or flash to attract the attention of the player.

In one embodiment, a gaming device may include multiple spin meters. For example, the player might buy a block of 100 spins which paid money in the form of free spins added to a second spin meter. Once the spins of the first spin meter were exhausted, spins would begin to be drawn from the second spin meter. Wins from these secondary spin meters would then result in payments to the credit meter of the gaming device.

In one embodiment, the functionality of buttons could be split over multiple buttons. For example, a slot machine might have three buttons to determine the number of spins of the package (e.g. 200, 100, or 50 spins) and two buttons to determine the type of package desired (e.g. a button for jackpot only packages and another button for discounted normal spins). In such embodiments, a player would provide a combination of button presses corresponding to the package play desired. In another embodiment, one or more buttons may enable a player to indicate a number of such packages to be purchased (e.g., 1 package, 2 packages, and so on).

In one or more embodiments, a player might use one or more menus (e.g., of a touch screen) to customize a contract for himself. The player might use a first menu to select a duration of the contract (e.g. 600 pulls, or ½ hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract. In one or more embodiments, the more pulls or spins requested, the deeper the discount offered by the gaming device (compared to traditional pricing).

In some embodiments, a player chooses a contract prior to approaching the gaming device or even the casino. A player might select a contract on the Internet. On the Internet, the player might specify terms of the contract, such as the number of pulls, the rate of play, the cost, the payout tables, the winning symbol combinations, etc. The player may then print out a code or a document describing the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include: the font size of the machine, the noise level of the machine's sound effects, the particular game (e.g. number of reels, number of pay lines), the brightness of the display, etc.

In one embodiment, a contract may be associated with more than one player. For example, each of the players may be required to satisfy one or more terms of the contract. In one embodiment, a contract associated with a first player may be combined with a contract associated with a second player.

To confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

A player might also confirm entry into a contract simply by paying for it. The player might pay by depositing tokens, coins or other currency into the gaming device. The player might pay using a credit or debit card. The player might also pay from a player credit account established with the casino. The player might pay at a counter of the casino and might receive a contract or a contract indicator to bring to a gaming device. The gaming device might then recognize the contract indicator by, for example, a bar code, and then execute the contract.

A typical contract may cover and/or require a large number of handle pulls by the player. Now ordinarily, when a player is gambling at a gaming device for a long period of time, the player makes a number of decisions related to his gambling. Should the player play more quickly or more slowly? Should the player double his bet after a loss? Should the player quit after a sizable win? Should the player take a short break to use the restroom?

Since the contract covers a large number of pulls, it is possible for some player decisions to be made before hand and included in the contract. A gaming device may then act on the decisions specified in the contract without further input from the player. For example, while negotiating a contract for an hour of play at 10 pulls per minute, a player might decide he'd like a 15 minute break between the first ½ hour and the second ½ hour of pulls. The gaming device might then execute the contract for the first half hour by automatically spinning and generating outcomes for the first ½ hour. The gaming device might then freeze for 15 minutes, preventing other players from stepping in and allowing the contract holding player to take his 15 minute break. The device can then unlock after 15 minutes, perhaps with the entry of a password, and resume the generation of outcomes.

One important aspect of having a player's decisions spelled out beforehand in the contract is that the player need not even be present at the gaming device. A player can sign up for a contract at a casino in Las Vegas, and then have the contract executed automatically by a gaming device. The player can then view a running tally of his accumulated credits over the Internet while in Virginia, for example.

In general, player instructions built into a contract will include some action to be performed as well as some triggering condition for the action. As an example, a player instruction may be to increase the rate of handle pulls provided accumulated player credits exceed 100. In this example, the action is to increase the rate of handle pulls, and the triggering condition is whether accumulated player credits exceed 100.

The following player actions may be part of a player's instructions:

1. Increase or decrease a wager amount on one or more handle pulls;
2. Increase or decrease a rate of wagering;
3. Cease gambling;
4. Change the way outcomes are displayed; and/or
5. Change a strategy employed in executing a contract (e.g., a video poker game strategy).

The following conditions may trigger the above actions:

1. The player has just won or lost on one or more handle pulls;
2. The player has just won a certain amount on one or more handle pulls;
3. Any player defined sequence of wins and losses has occurred on prior handle pulls;
4. The player has approached or left the vicinity of the gaming device;
5. It has reached a particular time of day; and/or
6. A particular outcome has been obtained.

Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also instruct a gaming device how to play certain games involving player decisions. For example, a player may leave instructions to use basic strategy in a game of video blackjack, or to play according to published theory in a game of video poker. The player may add instructions to always draw to a straight flush.

A contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second (e.g., instantly or substantially instantly). The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a 600-pull contract may be generated 100 outcomes at a time, each block being generated from 8 pm-9 pm on Sunday. Thus, it would take just under six weeks for the entire contract to be executed. This method of execution may be ideal if a player has a schedule as to when he enjoys watching outcomes being generated. For example, the player might enjoy seeing outcomes generated while he watches his favorite show on Sundays from 8 pm to 9 pm. This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated In many contract embodiments, there is a limiting element of time or handle pulls. As such, it is useful for the gaming to display to the player a measure of the amount of time remaining in a contract, or a measure of the number of pulls remaining. As an example, a contract may allow a player to insert $20 into a gaming device, play for three minutes without paying for any handle pulls, and to keep any money won during the three minutes of play. During the time period covered by the contract, the gaming device may display a clock to the player that counts down the time starting at three minutes. So the clock would begin at "3:00", then read "2:59", etc. Of course, the clock could also begin at zero and count up to 3:00. The clock could display time to any desired precision, including hours, minutes, seconds, tenths of a second, hundredths of a second, etc. For longer contracts, the clock could display days, weeks, months, years, etc. The clock could be analog or digital. The clock could be built into the gaming device as a dedicated LCD display or even as an actual clock with gears or pendulums. Alternatively, the clock could be displayed on the display screen of the gaming device.

With a clock ticking off the seconds, a player would always be aware of how much time he had to finish a contract. In contracts where making a large number of handle pulls benefits the player, the player might find it very exciting trying to complete as many handle pulls as possible before time runs out. The clock would also reduce the potential for disputes by players who believed they were not given enough time to complete the play of a contract.

In many embodiments, once the clock has reached zero, the player's time for completing the contract has finished, and no more of the player's handle pulls count towards the contract. The player may be given one additional handle pull even after the clock has hit zero, so as to eliminate any dispute from the player as to whether he actually made the last handle pull in time to be counted.

Just as a clock may track the elapsed time for a contract, a counter may track the number of handle pulls made in a contract, or the number of handle pulls yet to be made in the contract. For example, if a contract allows a player to make 500 handle pulls, then a counter may begin at zero and increment by one every time the player completes a handle pull. When the counter reaches 500, the player is finished. Alternatively, the counter may begin at 500 and count down to zero.

In some embodiments, during the course of a contract, a player may win extra time, or may win the opportunity to make additional handle pulls. For example, one symbol on the reels of a slot machine may be a clock symbol. If the player obtains the clock symbol, the player may be given an extra minute in which to complete the pulls of his contract. In another example, the player may obtain a symbol that gets him a certain number of extra spins for his contract. Note that extra spins do not necessarily constitute free spins, because the extra spins may only occur within the framework of a contract. Thus, if a player has a large negative credit balance in a contract where he keeps any positive credit balance, a few extra spins might do him little good, since the player is unlikely to get out of negative territory. In some embodiments, a player may win extra spins even though his contract is for a set period of time. In this case, after the expiration of the time period covered by his contract, the player may get to make the number of extra spins that he had won during the period. Additionally, a player whose contract specifies a number of spins allowed, may win extra time. In this case, once a player has completed his spins, he may be allowed the extra period of time in which to make as many spins as he can.

In some embodiments, the gaming device provides an alert to the player when the time remaining has reached certain levels. For example, a player's contract might provide insurance to a player, with the insurance covering any losses sustained by the player during a ten-minute period. When the player has only one minute left in the contract period, the gaming device may provide an alert to the player such as, "One minute to go! Get in all the pulls you can!" Providing an alert to a player may add a sense of excitement, as the player may try to make handle pulls more rapidly, much as a runner might pick up his pace as he approaches the finish line of a race. Additionally, providing an alert to a player can reduce the likelihood that a player will be caught by surprise when a contract period ends. A player might be upset were he to assume that a contract was still in effect even after the period covered by the contract had elapsed. For example, the player might be upset if he believed his losses to be insured, when in fact they no longer were. Just as a gaming device may alert the player as to the amount of time remaining in a contract period, so too might the gaming device alert the player as to the number of pulls remaining.

The gaming device may also provide the player with periodic updates of his status in relation to the contract. Exemplary status information may include:

1. The player's credit balance.
2. The number of additional credits the player needs to win in order to receive a payment. For example, at the end of a contract, the player may get to keep any number of credits exceeding a threshold of 100 credits. If the player currently has a credit balance of 90 credits, then the gaming device may print a message such as "Win only 10 more credits and you're in the money!"
3. The number of credits the player is guaranteed so far. For example, a contract may guarantee a player a number of credits equal to half of the highest credit balance the player achieved during the contract. Thus, if the player has already achieved a balance of 100 credits at some point during the contract period, then the gaming device may tell the player "You are guaranteed 50 credits. Keep on playing!" In another example, a contract guarantees that a player will always receive a certain minimum payment at the end of the contract period. For example, the player begins with a balance of $50, but will always receive at least $40 at the end of a contract period. In this case, the gaming device may print a message for the player such as, "Five minutes to go. Minimum payment: $40."
4. The number of credits a player would receive if the contract were to end right then. For example, if a contract allowed a player to receive any credits in excess of 40, and his current credit balance was 60, then the gaming device might display a message such as, "You are 20 credits ahead."

Note that status information may be displayed separately or in conjunction with information concerning the number of pulls remaining, or the amount of time remaining in the contract period.

Once the contract period has ended, the gaming device may also print status information for the player, including such information as his ending balance, and the amount of credits that are due to the player. In one embodiment, the player is prevented from spinning once his contract period has ended, but before he has received payment. In this way, the player is less likely to confuse handle pulls he has made that are covered by the contract, with handle pulls that are not covered by the contract. For instance, once the time period of a contract has ended, the gaming device may display the message, "Time is up. You have lost a total of $20 in the last 100 handle pulls. Your insurance covers half of your losses. You are due $10. Please press the 'Get Money' button on your screen to receive your payment."

Once the player presses the "Get Money" button, his gaming device may pay him $10. Once the gaming device has paid the $10 to the player, the player may begin spinning again, but this time outside of the framework of the contract.

One obstacle with contracts involving timed play is that the gaming device may malfunction in some way. For example, the reels of a mechanical-reel slot machine might jam. Or a player might cash out coins to tip a waitress, only to find that the coin hopper of the machine is empty, and the hopper will have to be filled by an attendant. During the time of the hopper fill, the player cannot spin. Therefore, in one embodiment, a player is given extra time during a contract that is timed, and where the gaming device malfunctions. The player may have the opportunity to actually decline the extra time. In some contracts, making additional handle pulls is a disadvantage to the player, and so it would benefit the player to lose the time. In another embodiment, the player may move to another machine and complete his contract there. To move to another machine, the player might receive a code from his first gaming device. The code might indicate, for instance, the terms of the contract, the amount of time the player has remaining, the player's balance, etc. The player might then type the code into a new gaming device. The new gaming device would then interpret the code according to standardized rules, and configure itself so as to allow the player to resume contract play at the same point from which he left off.

Many contracts require that a player play for the full period of time specified in a contract. For example, a player might have to play for a full hour in order to receive any winnings associated with a contract. If the player stops play before the contract period has fully elapsed, the gaming device may assume that the player has abandoned the contract. For example, once the gaming device has detected a pause in play of a predetermined length, the gaming device may reconfigure itself for regular play. The reconfiguration may entail zeroing out any credit balance associated with a contract, eliminating or blanking out any timer or counter associated with the contract, and turning off any indicators that a contract is in progress. Thereafter, the player who has entered into the contract may not have the opportunity to resume play in the contract. Alternatively, upon sufficient proof that a player had previously entered into a contract, the player may resume the play of a contract. For example, a player may present his tracking card to a gaming device at the time when he enters into a contract. The gaming device may then associate the player tracking card with the contract. If the player later leaves the gaming device, the gaming device may store a record of the state of the contract, including the number of remaining pulls, credit balance, etc. The player might later insert his tracking card into the same gaming device, or into another gaming device linked to the first, e.g. via a network. The gaming device may associate the player tracking card number with the unfinished contract, and reconfigure itself to contract play mode, allowing the player to complete his previously unfinished contract. The player may use many other means of proving his identity so as to resume contract play, such means including a password, an answer to a question, biometric data, etc.

In other embodiments, a player may be allowed to pause the progress of a contract so that he may take a break. For example, in the midst of a contract, a player may press a "freeze" button on his gaming device. The player may withdraw his tracking card, and walk to the restroom. In the meantime, for a designated period of time, no other player may be allowed to touch the first player's gaming device. The player may later return, reinsert his tracking card, and thereby unfreeze the gaming device so as to continue contract play. The time when the player was away may not have been counted towards the period of contract play. For example, if a contract period is to last an hour, and the player takes a five-minute break during the contract, then the player may finish contract play one hour and five minutes after beginning. If a player has left a gaming device, having pressed "freeze", and does not return to the gaming device within a designated period of time, then the gaming device may assume that the player will not return, and may reconfigure itself for regular play.

A player may be limited to a predetermined number of breaks during contract play, or to breaks of up to a maximum time duration. In some embodiments, if a player does not play for a predetermined period of time, the gaming device may initiate handle pulls automatically on behalf of the player.

As described herein, a player may enjoy watching from a remote location as the outcomes of his contracts are generated. Since the player is not physically at the slot machine, the outcomes must be presented to the player via some graphical representation. In one embodiment, a camera simply films the gaming device generating the player's outcomes. The image from the camera is transmitted to the player device (FIG. 5) via the Internet, the cable system, satellite, etc. The player device might be, for example, a TV or a personal computer. In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: cherry-orange-lemon. The gaming device then transmits, via the casino server and the Internet, a bit sequence indicating the outcomes cherry-orange-lemon. Perhaps the bits "0000" represent cherry, "0011" represent orange, and "1111" represent lemon. The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes. In some embodiments, a player views a combination of the actual image of his gaming device, and a computer-rendered version of a gaming device. For example, a cartoon of the reels spinning might be displayed within the frame of an actual image of the slot machine, minus the reels.

In some embodiments, the player does not view a graphical representation of the outcomes, but sees the outcomes as text, such as "seven-bar-bar," "s-b-b," "7-b-b," etc. The player may not even see the outcomes, just how much he has won or lost on every pull. Thus, the player may view a periodically updated tally of his accumulated credits. He may only view his total accumulated credits, or his take home winnings, after all outcomes have been generated.

Any graphical or textual representation of the player's outcomes, accumulated credits, or other contract information may be displayed either on an entire portion of a computer or TV screen, or on a smaller portion of the screen. For example, a small cartoon slot machine may reside in a box in the upper right hand corner of a TV screen that simultaneously displays a regular TV show. A player watching television need then only glance up at the corner of his screen to follow the progress of his contract. Representation of outcomes may also be place in an email message to the player.

Of course, the various representations of outcomes may be used just as well with a player physically present at the gaming device or at the casino.

In some embodiments, the player calls up a number to monitor the progress of his contract. He may enter a code or password when prompted by a voice response unit (VRU) and thereby access the outcomes from his particular contract.

A player may be sent updates on his contract only when certain triggering conditions are met. For example, a player may only wish for updates when he wins more than 100 credits on a spin, or when the contract terminates.

In one embodiment, a gaming device on which contract play is in progress provides an explicit display that contract play is in progress. The display may serve to remind a player that certain activities that would otherwise be allowed are not now allowed. For example, in contract play, the player may not be able to cash out his credit balance. The player may not be allowed to wait more than 10 seconds between spins. Many different restrictions on a player may apply, depending on the nature of the contract. On the other hand, during contract play, certain rules or activities may apply that otherwise would not. For example, during contract play, a player might obtain outcomes that would cause him to lose numerous credits from his credit balance at once.

Furthermore, an obvious notice that contract play is in progress allows a player to act in his own benefit. For example, if the player has purchased an insurance contract for 200 pulls, then the player may beneficially make handle pulls during the insurance period, as he would not be responsible for all of his losses. On the other hand, were the insurance contract not in place, or were it to have expired, the player might instead wish to walk away from the gaming device.

FIG. 9 illustrates a gaming device on which contract play is in progress. A large text display on top of the gaming device is lit up, saying, "Contract Play in Progress." In one or more alternate embodiments (not shown in FIG. 9), the fact that contract play is "in progress" may be communicated to casino patrons through a physical modification of game device cabinetry. For example, in one embodiment, a chair or stool associated with a gaming device may automatically or manually fold during contract play so that players other than the contract purchaser cannot physically sit down in front of the gaming device. Or, in another embodiment, a gaming device cabinet may feature automatically or manually extendable dividers (e.g. ropes, wooden dividers, plastic dividers) that extend from the gaming device to an accompanying chair or stool (or vice versa), thereby preventing players other than the contract purchaser from occupying the gaming device.

As described herein, the pricing of a contract will often take into account the expected amount an insurer must pay to a casino to cover a player's losses, or the expected amount that a casino and insurer in combination can expect to pay to compensate the player for his winnings. Pricing of contracts may account for additional factors including:

(i) Times or dates on which the contract will be executed;
(ii) The gaming device on which the contract will be executed;
(iii) Flexibility in the contract's execution;
(iv) A player's gambling history;
(v) A denomination of a gaming device at which the contract will be executed;
(vi) A number of pay lines per game play to be wagered on;
(vii) A magnitude of a wager per game play; and/or
(viii) The importance of the player as a customer of the casino.

For example, a contract which is to be executed during a period of low customer activity at a casino may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

It should be noted that, in one or more embodiments, pricing of a contract or other term of a contract may be performed by and/or controlled by a server or other computer in communication with a gaming device at which the contract may be purchased and/or executed. For example, casino server 110A and/or computer 110B may be operable to determine, update and/or change a price for a contract or another term of a contract. The casino server 110A and/or computer 110B may, in one embodiment, communicate any changes or adjustments to a price or other term of a contract to a gaming device at which the contract may be purchased and/or executed.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

As discussed, a contract may often involve an upfront payment by the player, in return for which the player may play for an extended period of time, or receive other benefits. However, a player may, for various reasons, wish to discontinue play before having completed the amount of play specified in the contract. For example, if the player has paid $30 for a contract to receive the net winnings of a gaming device after 500 pulls, the player may wish to quit after 250 pulls in order to go have dinner. The player may be given the option of discontinuing play while still receiving a benefit. The benefit a player receives may be related to his current credit balance, to the number of handle pulls made thus far in the contract, to the amount of time played thus far, or to the amount of money he paid upfront for the contract. In one embodiment, the player may receive his expected winnings for the contract as calculated from the point in time at which the player quits. For example, a player's expected winnings from a contract in which he will receive the net winnings from a gaming device may be $20 when he has a credit balance of $35, but 250 handle pulls remaining in the contract. In another embodiment, the player may receive less than his expected winnings, so as to penalize the player for quitting early. Sometimes he may receive more than his expected winnings, as the gaming device will benefit from being open for business with new players.

Upon surrender, a player might also receive a fraction of his upfront payment. A player might receive half of his current credit balance. In one embodiment, a player with a negative credit balance may actually receive, say, $5 for ceasing play. Perhaps the contract says that the player gets to keep any net winnings, but is not responsible for net losses. Thus, a player with a negative balance, especially if the credit balance is only slightly negative, might still have high expected winnings. However, a player might perceive $5 as fairly valuable in relation to his current credit balance, and so may surrender in return for the $5. Thus, in one embodiment, a gaming device encourages players to surrender by offering them cash or other benefits to surrender.

In many embodiments, the casino acts as the intermediary in transactions between a player and the insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records (FIG. 8) of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player (FIG. 8). The gaming device may then pay the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, the casino may simply keep the player's winnings in a player account at a casino, to be accessed by the player next time he visits the casino. The winnings may, in the mean time, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

In one embodiment, payouts won by a player under a contract may be accumulated or summed for purposes of determining an amount of government taxes owed by the player. For example, a sum of payouts won by the player while executing the contract may be determined, and a tax reporting form may be provided to the player if the sum is equal to or greater than a predetermined amount. In one embodiment, such a sum may be reported by the casino to the government and on behalf of the player if the sum equals or exceeds the predetermined amount.

In one embodiment, a player may be halfway through a contract and have negative 200 accumulated credits. The player might therefore lose all hope of winning enough to overcome the 200-credit deficit, and so lose interest in the contract. Therefore, in one embodiment, a player who is well below a threshold number of accumulated credits for winning may play for an altered pay table. Low paying outcomes may be eliminated, while the likelihood of achieving high paying outcomes may increase. This is because a player with a 200-credit deficit probably doesn't care about a win of ten credits, but does care about a win of 500 credits. The overall hold percentage of the machine may remain constant. In some embodiments, the alteration of the pay tables is an automatic function of the number of pulls remaining and the credit deficit of the player. In other embodiments, the player must request an alteration of the pay tables. As an example, a player may select an option that says, "Let me play just for the jackpot. Eliminate everything else and make the jackpot more likely." The player may or may not have to pay for an alteration of the pay tables. In a more general sense, the pay tables may change such that the standard deviation of the payout for a particular handle pull changes even as hold percentage may remain constant.

In one embodiment, a player in the midst of executing a contract who has a negative credit balance may be allowed to provide a payment in exchange for increasing the credit meter balance (e.g., to zero or to a negative number of credits that is less below zero than the current negative number of credits).

A player might purchase a contract at a casino desk and receive a token that indicates the type of contract. The player might then deposit the token into a gaming device. The gaming device would then recognize the token and be able to execute the contract.

A player may have the privilege of entering into favorable contracts after a fixed amount of initial betting. For example, if the player wagers for an hour, he may be able to enter into a contract where each pull is at true odds. That is each pull pays back, on average, the same amount that was put in. Typically the pull pays back less.

A player may receive better odds on contract play when he is recommended to the casino by a friend.

Certain results of a pull may terminate a contract early. For example, if a player hits the jackpot, the contract may terminate.

A player's accumulated credits can be displayed to a player as a function of time in the form of a graph. The graph may look much like graphs used to plot the price of a stock market index as a function of time. In some embodiments, a player wins money or some other prize if the graph takes on a certain shape. For example, if the line of the graph is such that it slips between several sets of markers (much like a skier on a slalom course), then the player may win a large prize.

In some embodiments, a player's winnings on each pull of the contract are reinvested into the contract, whereas in other embodiments they are not. In one example, a player purchases a contract for $100. The player instructs the gaming device to gamble the $100 until it is all gone. However, any winnings are not to be used to gamble, they are to be sent directly to the player. In a second example, the player purchases a contract for $100 and instructs the gaming device to gamble the $100 until it is gone or until it has become $200. Here, the player elects to reinvest winnings, using the winnings to pay for new handle pulls even after $100 worth of handle pulls have been made already.

A contract may reward a player based on any second order data, or meta-data about one or more outcomes. Examples include rewarding the player if three like outcomes occur in a row, if 20 cherries come up in 10 sequential spins, if the players accumulated credits ever reach 100, etc. An example previously described is rewarding a player based on the pattern of a graph of accumulated winnings as a function of time. A player might choose the "meta-outcomes" on which he desires to be rewarded, and the gaming device may figure the corresponding odds and the size of the reward should the meta-outcome occur.

A player may be rewarded with the downside a sequence of outcomes much as buying insurance gives him the upside. For example, a player pays a fixed sum of money, and collects winnings for every dollar in the negative the contract ends up. Thus, if a contract ends with the player having minus 20 accumulated credits, then the player collects 20 credits.

A contract may apply to a "best 100" sequence of a larger sequence of pulls. For example, the player pays $100 for a contract of 1000 pulls. From those 1000 pulls, the player gets to choose any 100 consecutive outcomes to determine his winnings, and can disregard the rest of the outcomes. So the player can say he wants to use outcomes 506 through 605. Perhaps there was a hot streak during that sequence. The player's winnings are then determined solely based on what happened between pulls 506 and 605. This might result in winnings of $200, whereas having counted all 1000 pulls would have resulted in a net loss for the player. Of course, the gaming device may automatically choose the most favorable sequence for the player.

A player may choose his favorite outcome and receive higher payouts for that outcome, special privileges for receiving that outcome (e.g. the ability to terminate a contract), etc.

In some types of contracts, the pay table for the gaming device changes based on the player's credit balance. For example, the pay table may change to provide a lower payback percentage once a player's credit balance exceeds a certain threshold. The pay table may or may not revert if the player's balance then goes below the threshold. In one embodiment, completely different pay tables are used depending on whether the player's credit balance is above or below a certain level.

A contract could provide extra bonuses to the player if the player gets his credit balance to a certain level. For example, a player might begin with a credit balance of 50. If he can get his credit balance to 100, he may receive $500 at the end of the contract, or he might receive 500 credits in the context of the contract. A player might also receive a bonus for getting his credit balance to zero from 50.

An exemplary process according to one embodiment is described immediately below. This description is provided solely as an example of one embodiment. A player with a group of her friends planned to spend four hours at a casino before leaving. However, the player began playing a slot machine with a losing streak, and after two hours, she was down to her last $20. Meanwhile, her friends were doing fairly well, so it seemed that the player would have to spend her next two hours in the casino doing nothing but waiting for her friends.

Instead, the player decided to purchase a gaming contract in order to guarantee that her $20 would last for the next two hours. The player sat down at a dollar slot machine. The slot machine had a touch screen displaying an initial menu. One of the menu choices was "contract play," while another choice was "regular play." She pressed the "contract play" choice and received a second menu that presented several contract options. One option was "1½ hours of play for $20 at 6 pulls per minute." The player chose that option because it would fill most of the rest of her time at the casino for $20, all she could afford. The screen on the slot machine then directed her to insert $20 into the slot machine in order to begin play, and the player did so.

The slot machine then presented the player with a final screen showing the main terms of the contract. According to the terms, the player would begin with a balance of zero credits. The player's balance would go down by one credit anytime she initiated a handle pull of the slot machine. In fact, the player would be able to keep playing even if her credit balance were negative. Her credit balance would also increase on any handle pull where she achieved a winning outcome. At the end of her gaming session, the player would keep the amount of any positive credit balance. However, if her credit balance ended up negative, she would win nothing, though she would also not be responsible for repaying any portion of the negative balance. Another term was that the player was not allowed to make less than six pulls per minute during the execution of the gaming session of the contract. If the player tried to pull too slowly, then the slot machine would initiate pulls for her automatically.

The player agreed to proceed and was soon busy gambling. She watched as her credit balance rose and fell. Near the end of her contract number of pulls, the player's credit balance stood at minus 10. But immediately after that, on the next pull, she won a payout of 30 credits, putting her balance at 20 credits (positive). In the end, after 1½ hours of play, the player ended up with 17 credits. She received $17. Although she had lost $3 ($20−$17), she had been able to play for 1½ hours, and had a good time doing so. When she had finished with the contract, her friends were also finishing up and getting ready to depart.

Although the present invention has been described with respect to a preferred embodiment thereof, those skilled in the art will note that various substitutions may be made to those embodiments without departing from the spirit and scope of the present invention.

What is claimed is:

1. A method for facilitating play at a gaming device, comprising:

receiving, via an input component of a computing device and from a player, a selection of a contract for a plurality of game plays to be played on a gaming device during which plurality of game plays the gaming device operates under a contract play configuration rather than a default configuration, wherein the contract defines a price for the plurality of game plays and a duration of the contract;

receiving, prior to allowing play of the gaming device under terms of the contract, a payment of the price for the contract;

causing, in exchange for the payment of the price, the gaming device to be reconfigured to the contract play configuration for the plurality of game plays;

allowing play of the gaming device under the terms of the contract, wherein play of the gaming device includes executing the plurality of game plays;

causing a spin meter display of the gaming device to be updated such that it displays a countdown of the plurality of game plays;

for each game play initiated under the terms of the contract:

(i) updating the spin meter display by decrementing it by one; and (ii) decrementing a credit meter balance by a wager amount corresponding to the game play;

determining a termination of the contract under the terms of the contract;

determining a number of credits reflected in the credit meter balance of the gaming device upon the termination of the contract;

determining whether the number is a positive number or a negative number;

if the number is a positive number, providing an amount of money based on the number and if the number is a negative number, requiring no further payment based on the negative number; and causing, upon determining the termination of the contract, the gaming device to be reconfigured from the contract play configuration to the default configuration.

2. The method of claim 1, wherein each game play of the plurality of game plays has a wager amount associated therewith, and further wherein the price is less than a sum of the wager amounts.

3. The method of claim 1, further comprising:

determining, for at least one outcome corresponding to at least one of the plurality of game plays, that the at least one outcome comprises a number of credits to be subtracted from the credit meter balance; and subtracting the number of credits from the credit meter balance.

4. The method of claim 1, wherein the plurality of game plays is defined by a period of time and further wherein the period of time ends once a predetermined amount of time passes after a beginning time at which the play under the terms of the contract commences.

5. The method of claim 1, wherein the plurality of game plays is defined by a period of time and further wherein the period of time ends once a predetermined number of game plays have been executed after a beginning time at which the play under the terms of the contract commences.

6. The method of claim 1, further comprising:

receiving a request to terminate the contract prior to an end of the duration of the contract;

determining a penalty for terminating the contract prior to the end of the duration of the contract; and applying the penalty in exchange for allowing the termination of the contract.

7. The method of claim 1, wherein the gaming device comprises a video poker device and wherein allowing play of the gaming device comprises allowing play of a video poker game on the video poker device.

8. The method of claim 1, wherein receiving a selection of a contract comprises:

determining that a button of a plurality of buttons of the gaming device has been actuated, each of the buttons being associated with one of a plurality of contracts.

9. The method of claim 8, wherein the button comprises an area of a touch screen.

10. The method of claim 8, wherein the button comprises an electromechanical button of a player interface of the gaming device.

11. The method of claim 1, further comprising:

determining, for at least one outcome corresponding to at least one of the plurality of game plays, that the at least one outcome comprises a number of game plays to be subtracted from the plurality of game plays remaining as available for play under the terms of the contract; and subtracting the number of game plays from the spin meter balance.

12. The method of claim 1, wherein causing the gaming device to be reconfigured to the contract play configuration comprises causing a value of a parameter governing play of the gaming device to be changed from a first value that is less favorable to the player to a second value that is more favorable to the player.

13. The method of claim 12, wherein the parameter governing play of the gaming device comprises at least one of a magnitude of payouts available to be won, a frequency of payouts to be won, a payback percentage of the gaming device and a multiplier greater than one to be applied to any payout won.

14. An apparatus operable to facilitate play of a wagering game, the apparatus comprising:

a processor, a memory storing a program for directing the processor, the processor being operable with the memory to cause the processor to perform a method comprising:

receiving from a player a selection of a contract for a plurality of game plays to be played on a gaming device during which plurality of game plays the gaming device operates under a contract play configuration rather than a default configuration, wherein the contract defines a price for the plurality of game plays and a duration of the contract;

receiving, prior to allowing play of the gaming device under terms of the contract, a payment of the price for the contract;

causing, in exchange for the payment of the price, the gaming device to be reconfigured to the contract play configuration for the plurality of game plays;

allowing play of the gaming device under terms of the contract, wherein play of the gaming device includes executing the plurality of game plays;

causing a spin meter display of the gaming device to be updated such that it displays a countdown of the plurality of game plays;

for each game play initiated under the terms of the contract:

(i) updating the spin meter display by decrementing it by one; and (ii) decrementing a credit meter balance by a wager amount corresponding to the game play;

determining a termination of the contract under the terms of the contract;

determining a number of credits reflected in the credit meter balance of the gaming device upon the termination of the contract;

determining whether the number is a positive number or a negative number;

if the number is a positive number, providing an amount of money based on the number and if the number is a negative number, requiring no further payment based on the negative number; and causing, upon determining the termination of the contract, the gaming device to be reconfigured from the contract play configuration to the default configuration.

15. A non-transitory computer readable medium storing instructions for directing a computing device to perform a method comprising:

receiving from a player a selection of a contract for a plurality of game plays to be played on a gaming device during which plurality of game plays the gaming device operates under a contract play configuration rather than a default configuration, wherein the contract defines a price for the plurality of game plays and a duration of the contract;

receiving, prior to allowing play of the gaming device under terms of the contract, a payment of the price for the contract;

causing, in exchange for the payment of the price, the gaming device to be reconfigured to the contract play configuration for the plurality of game plays;

allowing play of the gaming device under terms of the contract, wherein play of the gaming device includes executing the plurality of game plays;

causing a spin meter display of the gaming device to be updated such that it displays a countdown of the plurality of game plays;

for each game play initiated under the terms of the contract:

(iii) updating a spin meter display by decrementing it by one; and (iv) decrementing the credit meter balance by a wager amount corresponding to the game play;

determining a termination of the contract under the terms of the contract;

determining a number of credits reflected in the credit meter balance of the gaming device upon the termination of the contract;

determining whether the number is a positive number or a negative number;

if the number is a positive number, providing an amount of money based on the number and if the number is a negative number, requiring no further payment based on the negative number; and causing, upon determining the termination of the contract, the gaming device to be reconfigured from the contract play configuration to the default configuration.

* * * * *